(12) United States Patent
Mitasaki et al.

(10) Patent No.: US 8,018,636 B2
(45) Date of Patent: Sep. 13, 2011

(54) LAMINATED HOLOGRAPHIC MEDIUM, RECORDING APPARATUS/METHOD, REPRODUCTION APPARATUS/METHOD FOR THE SAME AND DESIGN METHOD OF LAMINATED HOLOGRAM MEDIUM

(75) Inventors: Tokinobu Mitasaki, Tokyo (JP); Masakatsu Senda, Mito (JP); Masahiro Ueno, Iruma (JP); Takaya Tanabe, Hitachinaka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 208 days.

(21) Appl. No.: 10/579,115

(22) PCT Filed: Dec. 9, 2004

(86) PCT No.: PCT/JP2004/018400
§ 371 (c)(1),
(2), (4) Date: May 11, 2006

(87) PCT Pub. No.: WO2005/057297
PCT Pub. Date: Jun. 23, 2005

(65) Prior Publication Data
US 2007/0146843 A1    Jun. 28, 2007

(30) Foreign Application Priority Data

| Dec. 10, 2003 | (JP) | 2003-412396 |
| Apr. 5, 2004 | (JP) | 2004-110872 |
| Apr. 16, 2004 | (JP) | 2004-121721 |
| Sep. 9, 2004 | (JP) | 2004-262330 |
| Oct. 5, 2004 | (JP) | 2004-292429 |

(51) Int. Cl.
G03H 1/00 (2006.01)
G03H 1/04 (2006.01)
(52) U.S. Cl. .......... 359/2; 359/15; 359/34; 359/35
(58) Field of Classification Search .......... 359/2–7, 359/15, 34, 35
See application file for complete search history.

(56) References Cited

U.S. PATENT DOCUMENTS
5,856,048 A    1/1999    Tahara et al.
(Continued)

FOREIGN PATENT DOCUMENTS
CN    1284713 A    2/2001
(Continued)

OTHER PUBLICATIONS

Office Action issued on Mar. 21, 2008 on counterpart Chinese Patent Application No. 200480033152.6.

*Primary Examiner* — Audrey Y Chang
(74) *Attorney, Agent, or Firm* — Harness, Dickey & Pierce, P.L.C.

(57) ABSTRACT

A medium 1, that is a laminated holographic medium of the present invention is composed of two or more core layers 2; 3 or more cladding layers 3 set so as to bind the core layers 2; one or more diffraction grating layers 4 storing information data and set at a boundary between a portion of the core layers 2 and the cladding layers 3 binding the core layers 2 or set inside the core layers 2; and one or more recording layers 42 storing information data as forms or a refractive index distribution and set at a boundary between a portion of the core layers 2 and the cladding layers 3 binding the core layers 2 or inside the core layers 2 through or without a gap layer.

5 Claims, 45 Drawing Sheets

U.S. PATENT DOCUMENTS 6,400,666 B1    6/2002   Yoo et al.
6,654,532 B1 * 11/2003   Tomaru et al. ................ 385/129
6,801,348 B2 * 10/2004   Ramapujam et al. ........... 359/34

FOREIGN PATENT DOCUMENTS

| JP | 11-345419      | 12/1999 |
| JP | 2000-030293 A  | 1/2000  |
| JP | 2001-228783 A  | 8/2001  |
| JP | 2002-019338    | 1/2002  |
| JP | 2003-007072 A  | 1/2003  |
| JP | 2003-050534 A  | 2/2003  |
| WO | 01/57602 A1    | 8/2001  |
| WO | 0200446 A      | 1/2002  |
| WO | 02/089072 A1   | 11/2002 |

* cited by examiner

FIG. 3
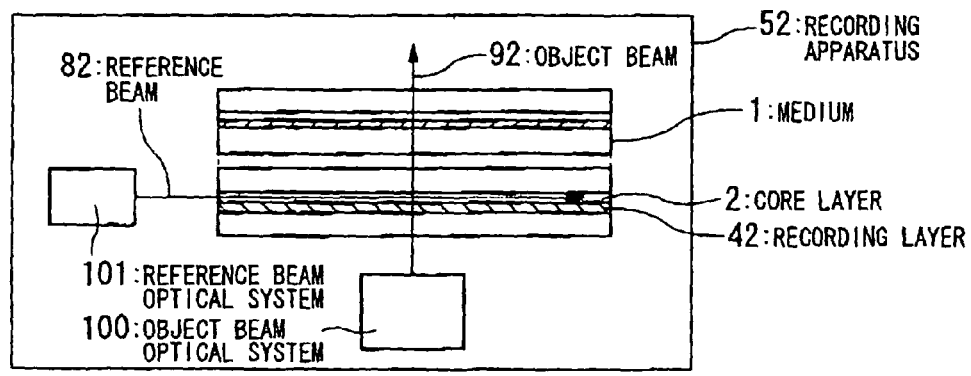
(a)
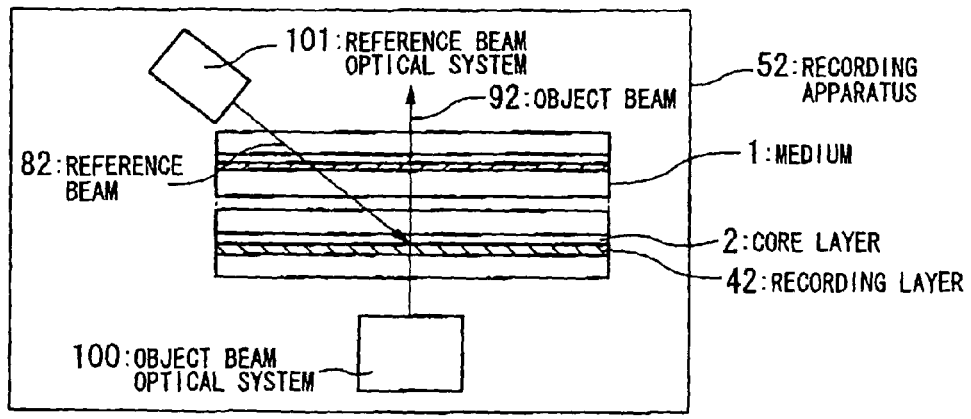
(b)
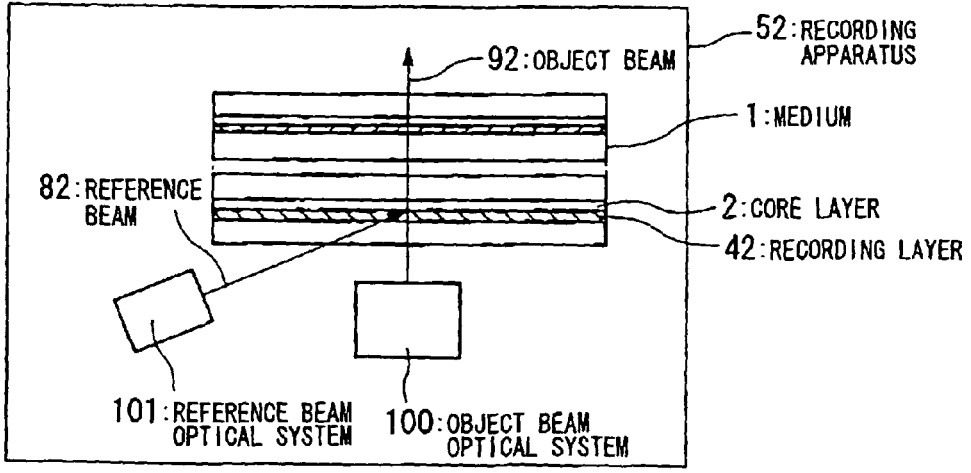
(c)

FIG. 29
(a)
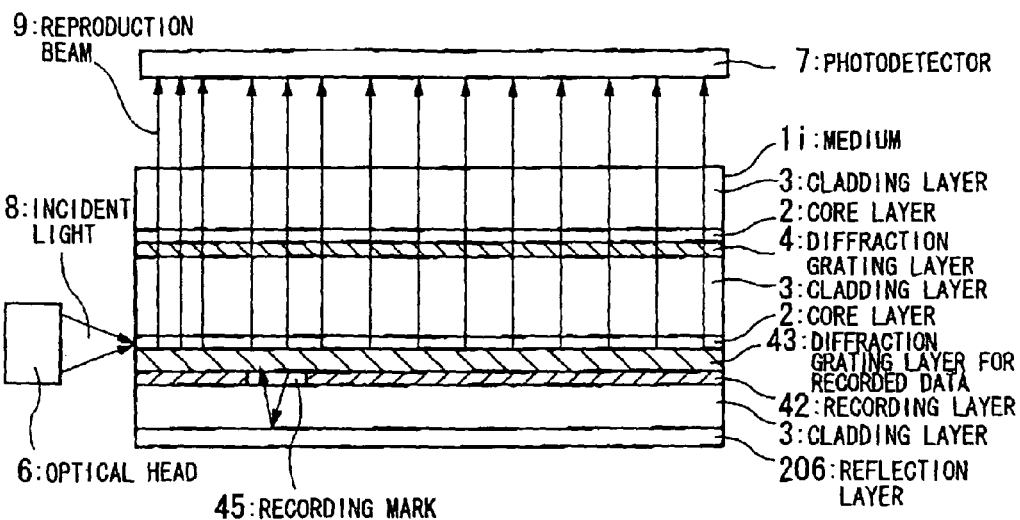
(b)
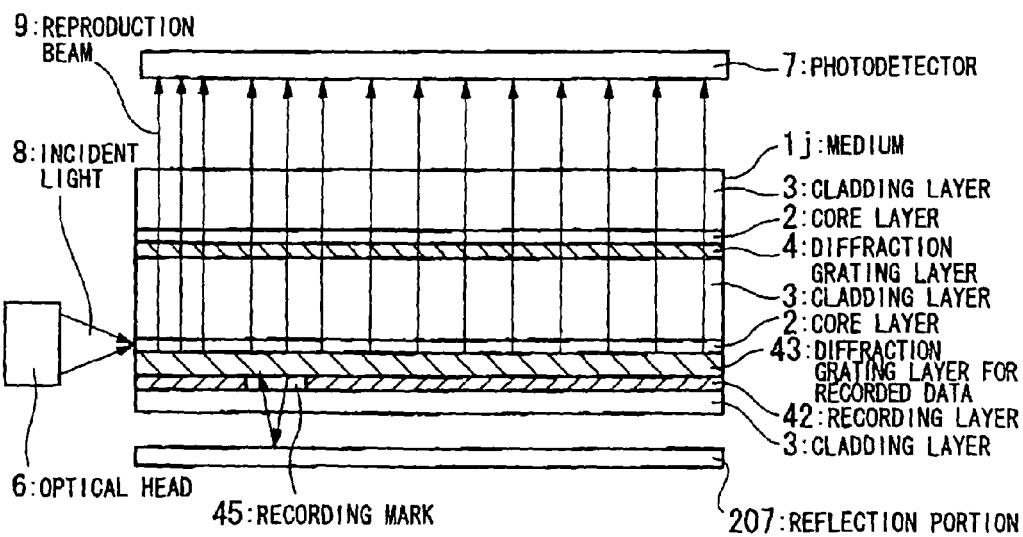

LAMINATED HOLOGRAPHIC MEDIUM, RECORDING APPARATUS/METHOD, REPRODUCTION APPARATUS/METHOD FOR THE SAME AND DESIGN METHOD OF LAMINATED HOLOGRAM MEDIUM

TECHNICAL FIELD

The present invention relates to a laminated holographic medium on which data can be recorded, a recording apparatus and method for it, a reproduction apparatus and method for it, and a design method of the laminated holographic medium.
Priority is claimed on Japanese Patent Application No. 2003-412396, filed Dec. 10, 2003, the content of which is incorporated herein by reference.
Priority is claimed on Japanese Patent Application No. 2004-110872, filed Apr. 5, 2004, the content of which is incorporated herein by reference.
Priority is claimed on Japanese Patent Application No. 2004-121721, filed Apr. 16, 2004, the content of which is incorporated herein by reference.
Priority is claimed on Japanese Patent Application No. 2004-262330, filed Sep. 9, 2004, the content of which is incorporated herein by reference.
Priority is claimed on Japanese Patent Application No. 2004-292429, filed Oct. 5, 2004, the content of which is incorporated herein by reference.

BACKGROUND ART

A medium and a reproduction apparatus for it using a laminated hologram ROM (Read Only Memory) in the prior art is explained below.

FIG. 43 is a figure showing a side face (cross section) of a medium 1', and shows a structure made by laminating a core layer 2' and a cladding layer 3' alternately in which a diffraction grating layer 4' is provided at a boundary between the core layer 2' and the cladding liver 3'. The diffractive grating layer 4' has, for example, a bumpy form (a form of alternate lands and grooves) and is recorded or stores information data.

FIG. 44 is a figure showing a side face of a reproduction apparatus 5' which reproduces data on the medium 1', and it is composed of an optical head 6' and a photodetector 7'. The optical head 6' has a function of emitting incident light 8' to the requested core layer 2' of the medium 1'. A reproducing method is described below. Upon emitting the incident light 8' to the core layer 2' that is selected or requested, of the medium 1' by the optical head 6', the light is diffracted in accordance with the information data (holographic data) recorded or stored by the diffractive grating layer 4' and a reproduction light 9' goes out from a top surface of the medium 1'.
By detecting this with the photodetector 7', it is possible to reproduce the information data recorded or stored on the medium 1'.

The medium 1 can be small and can have a large storage area, and the reproduction apparatus 5' can be small because it has a simple structure and construction. The laminated hologram ROM is expected to be small size memory for content distribution with a large capacity. Moreover, by applying the medium 1' above as an authentication (authorization, certification or guarantee) sheet, it is possible to make the authentication sheet small and having a large capacity, and the reproduction apparatus 5' can be small because it has a simple structure and construction (see Japanese Patent Application, First Publication No. 2002-19338). This technology is expected to be applied to a authentication sheet such as memory, keys, seals for guarantees, a sticker for packaging, tags, and the like that record a specific identification number.

On the other hand, in recent years, in order to protect the copyrighted contents from illegal copying, counterfeiting and the like, there is a need to append an identification (hereinafter, ID) to a medium of ROM type. In order to satisfy such a need, it is required to record different information data on each medium, and moreover, to reproduce the information data with a reproduction apparatus if possible.

However, in the prior art described above, the medium 1' is, for example, manufactured in accordance with a stamping technique using an original print, and therefore, it is appropriate to the manufacture of many mediums having the same information data, but it is not suitable to the production of mediums having different information data because in this case productivity and cost do not go together favorably.

Moreover, the medium 1' is a medium only for ROM, and therefore, it is impossible to write the information data after producing the medium. As explained above, in the prior art, there is a problem that it is impossible to record different information data onto each medium.

Moreover, in the field of applying the authentication sheet above, by storing unique information data on each authentication sheet, it is made possible for each authentication sheet to be authenticated independently, therefore, and there is an advantage in that the application range and fields are expanded.

However, the authentication sheet of the prior art above is produced in accordance with, for example, the stamping technique using the original print the same as the ROM medium above, and therefore, it is appropriate to the production of the authentication sheets storing completely the same information data.

On the other hand, it is not suitable to the production of authentication sheets having different information data because in this case productivity and cost do not go together favorably. Accordingly, in the prior art, there is a problem in that it is impossible to record different information data on each authentication sheet easily.

The present invention is proposed in order to solve the problems above, and an objective thereof is to provide a laminated holographic medium to which data can be recorded, a recording apparatus and method, a reproduction apparatus/method, and a design method of the laminated holographic medium which enable the recording of information data such as an ID even after production of the medium, and which enables reproduction of the ID using a reproduction apparatus for a ROM medium.

DISCLOSURE OF INVENTION

A laminated holographic medium of the present invention includes: one or more first core layers; one or more diffraction grating layers for recording data provided upon, under or in the first core layer, formed with respect to a form or a refractive index distribution and from which a reproduction beam goes out; and one or more recording layers provided adjacent to the first core layer or the diffraction grating layer for recording data or provided while binding a gap layer between the recording layer itself and the core layer or the diffraction grating layer for recording data, and to which information data is recorded as a recording mark having transmittance or non-transmittance of a light indicating the information data in accordance with a presence of a hole or a degree of transmittance of the light.

The laminated holographic medium of the present invention described above includes: wherein when the reproduction beam is transmitted through the recording layer, a presence of brightness/darkness and a position of light indicate the presence and a position of the recording mark by forming the diffraction grating layer for recording data.

The laminated holographic medium of the present invention described above, wherein the diffraction grating layer for recording data includes a function of a hologram.

The laminated holographic medium of the present invention described above, further including: a reflection layer provided at an opposite side of the recording layer against the first core layer and the diffraction grating layer for recording data and which reflects the light transmitted through the recording layer.

The laminated holographic medium of the present invention including: one or more first core layers; and one or more diffraction grating layers for recording data provided upon under or in the first core layer, formed with respect to a form or a refractive index distribution and from which a reproduction beam goes out, wherein in the diffraction grating layer for recording data, the information data is indicated by a presence of the outgoing reproduction beam in accordance with a recording mark that is a shape, changes of a refractive index or a removal of the diffraction grating layers for recording data.

The laminated holographic medium of the present invention described above, further including: one or more second core layers provided on or under the first core layer; a cladding layer provided between the first core layer and the second core layer; and a diffraction grating layer provided on, under or in the second core layer in which the information data is recorded as a shape or changes of a refractive index distribution.

The laminated holographic medium of the present invention including: one or more recording layers in which information data is recorded as a recording mark having transmittance or non-transmittance of a light indicating information in accordance with a presence of a hole or a degree of transmittance of the light.

The laminated holographic medium of the present invention described above, further including: a diffraction grating layer for recording data formed with respect to a form or a refractive index distribution and which forms an image from the light transmitted via the recording layer on a predetermined position.

The laminated holographic medium of the present invention described above, further including: one or more second core layers provided adjacent to the recording layer or binding the recording layer between the second core layers and a gap layer; and one or more diffraction grating layers for recording data provided upon, under or in the second core layer, and to which the information data is recorded as a form or a refractive index distribution.

A reproduction apparatus of the present invention reproduces information data recorded on the above described laminated holographic medium, including: an optical head radiates an incident light into the first core layer; and a photodetector detects a light transmitted through the recording layer.

The reproduction apparatus described above, further including: a reflection portion reflecting the light transmitted through the recording layer, wherein the photodetector detects the light transmitted from the recording layer via the reflection layer.

The reproduction apparatus reproduces information data recorded on the laminated holographic medium described above, including: an optical head radiates an incident light into the first core layer; and a photodetector detects a light transmitted through the recording layer.

A reproduction apparatus reproduces information data recorded on the laminated holographic medium described above, including: a light source radiates a light on the recording layer; and a photodetector detects a light transmitted through the recording layer.

A reproduction apparatus reproduces information data recorded on a laminated holographic medium which includes: two or more cladding layers binding one or more first core layers; and one or more recording layers provided at a boundary between the first core layer and the cladding layer binding the first core layer or at a position apart from the first core layer and recorded the information data as a form or a refractive index distribution, including a light source emitting a light onto the recording layer; an image formation optical system reflecting and forming the light reflected by the recording layer; and a photodetector detecting the light formed by the image formation optical system.

A reproduction method of the present invention for reproducing information data recorded on the laminated holographic medium described above, including steps of radiating the incident light into the first core layer: detecting the reproduction beam outgoing from the diffraction grating layer for recording data via the recording layer: and reproducing the information data recorded on the recording layer in accordance with a brightness/darkness pattern corresponding to the presence of the recording mark in the recording layer.

A reproduction method of the present invention for reproducing information data recorded on the laminated holographic medium described above, including steps of radiating the incident light into the first core layer detecting the reproduction beam outgoing from the diffraction grating layer for recording data: and reproducing the information data recorded on the diffraction grating layer for recording data in accordance with a brightness/darkness pattern corresponding to the presence of the recording mark in the recording layer.

A reproduction method of the present invention for reproducing information data recorded on the laminated holographic medium described above, including steps of: radiating the light into the recording layer; detecting the light via the recording layer; and reproducing the information data recorded on the recording layer in accordance with a brightness/darkness pattern corresponding to the presence of the recording mark in the recording layer.

A reproduction method of the present invention for reproducing information data recorded on the laminated holographic medium described above, including steps of radiating the light into the recording layer; detecting the light reflected by the recording layer; and reproducing the information data recorded on the recording layer in accordance with a brightness/darkness pattern corresponding to the presence of the recording mark in the recording layer.

A recording apparatus of the present invention for recording information data recorded to the laminated holographic medium described above, including at least: a beam radiation system radiating a beam to the recording layer and drawing or projecting the information data as a whole, or an electron beam radiation system radiating an electron beam onto the recording layer and drawing or projecting the information data as a whole.

A recording method of the present invention for recording information data to the laminated holographic medium described above, including steps of recording the information data as the recording mark having transmittance or non-transmittance of the light by using a light, heat, or a electron beam on the recording layer of the laminated holographic medium by drawing or projecting the information data as a whole using a beam or an electron beam.

A recording method of the present invention for recording information data to the laminated holographic medium described above, including steps of exposing the recording layer; recording the information data on the recording layer; and forming by adhering other layer independently produced.

The reproduction apparatus or the present invention for reproducing information data recorded on a laminated holographic medium which includes: one or more first core layers; one or more diffraction grating layers for recording data provided upon, under or in the first core layer and at a predetermined position, formed with respect to a form or a refractive index distribution and from which a reproduction beam goes out; and one or more recording layers provided adjacent to the first core layer or the diffraction grating layer for recording data or provided while binding a gap layer between the recording layer itself and the core layer or the diffraction grating layer for recording data at a predetermined position, and to which information data is recorded as a recording mark having transmittance or non-transmittance of a light indicating the information data in accordance with a presence of a hole or a degree of transmittance of the light, including: an optical head radiating the incident light into the first core layer upon detecting attachment of the laminated holographic medium or turning on; and a photodetector detecting the light transmitted through the diffraction grating layer for recording data, wherein the information data recorded on the laminated holographic medium included in the reproduction beam is detected by the photodetector is obtained and decoded.

A reproduction method of the present invention for reproducing information data recorded on the laminated holographic medium described above, including steps of: radiating the incident light into the first core layer upon detecting attachment of the laminated holographic medium or turning on; detecting the light transmitted through the diffraction grating layer for recording data; obtaining the information data recorded on the laminated holographic medium included in the reproduction beam; and decoding the reproduction beam.

A laminated holographic medium of a laminated holographic memory system in the present invention, wherein the laminated holographic memory system including: the laminated holographic medium including: a core layer to which an incident light comes in: and a diffraction grating layer formed with respect to a form or a refractive index distribution and from which a reproduction beam goes out; and a reproduction apparatus including an aperture mask separating and reproducing recorded information, that is multiplexed, by shading a portion of the reproduction beam, wherein the reproduction apparatus radiates the incident light and detects the reproduction beam, and the laminated holographic medium including: a recording layer including a recording mark provided at a position where an aperture gap of the aperture mask does not overlap, indicating information by comprising a presence of a hole in order to transmit or shade a light or by comprising a degree of transmittance of the reproduction beam, wherein a diffraction grating layer for recording data is formed to indicate the presence and a position of the recording mark on a recording layer by a presence of brightness/darkness and a position of light upon reproducing with the reproduction apparatus.

A laminated holographic medium of a laminated holographic memory system in the present invention, wherein the laminated holographic memory system including: the laminated holographic medium including: a core layer to which an incident light comes in: and a diffraction grating layer formed with respect to a form or a refractive index distribution and from which a reproduction beam goes out; and a reproduction apparatus radiating the incident light and detecting the reproduction beam, and the laminated holographic medium including: a recording layer including: a shading portion partly made from a colored material shading the reproduction beam; and a recording mark that expresses information by a presence of a hole for transmitting or shading the reproduction beam except for position of the shading portion, or by a degree of transmissivity of the reproduction beam; and a diffraction grating layer for recording data is formed to indicate the presence and a position of the recording mark on a recording layer by a presence of brightness/darkness and a position of light upon reproducing with the reproduction apparatus.

A laminated holographic medium of a laminated holographic memory system in the present invention, wherein the laminated holographic memory system including: the laminated holographic medium including: a core layer to which an incident light comes in: and a diffraction grating layer formed with respect to a form or a refractive index distribution and from which a reproduction beam goes out; and a reproduction apparatus radiating the incident light and detecting the reproduction beam, and a recording layer including a recording mark provided at a position transformed based on a presence of brightness/darkness and a position of the reproduction beam on the reproduction apparatus determined beforehand and in accordance with a predetermined regulation, indicating information by including a presence of a hole in order to transmit or shade a light or by including a degree of transmittance of the reproduction beam, wherein a diffraction grating layer for recording data is formed to indicate the presence and a position of the recording mark on a recording layer by the presence of brightness/darkness and the position of the reproduction beam determined beforehand upon reproducing with the reproduction apparatus.

The laminated holographic medium described above, wherein the predetermined regulation is a regulation of reversing the brightness/darkness from the reproduction beam, reversing a position upside down, or right and left, reversing presence, or shifting the recording mark for a predetermined distance up, dawn, left or right.

The laminated holographic medium described above, wherein the predetermined regulation is a regulation of arranging the presence and the position of the recording mark on the recording layer to have a relationship with a brightness/darkness and a position of the reproduction beam to be one-to-many, many-to-many, or many-to-one.

A design method of producing a laminated holographic medium of a laminated holographic memory system in the present invention, wherein the laminated holographic memory system including: the laminated holographic medium including: a core layer to which an incident light comes in: and a diffraction grating layer formed with respect to a form or a refractive index distribution and from which a reproduction beam goes out: and a recording layer including a recording mark indicating information by including a presence of a hole in order to transmit or shade a light or by including a degree of transmittance of the reproduction beam; and a reproduction apparatus including an aperture mask separating and reproducing recorded information, that is multiplexed, by shading a portion of the reproduction beam, wherein the reproduction apparatus radiates the incident light and detects the reproduction beam, and the design method of producing the laminated holographic medium of the laminated holographic memory system including steps of: providing the recording mark at a position that does not overlap an aperture gap of the aperture mask; forming a diffraction grating layer for recording data in order to indicate the presence and a position of the recording mark on a recording layer by a presence of brightness/darkness and a position of light upon reproducing with the reproduction apparatus.

A design method of producing a laminated holographic medium of a laminated holographic memory system in the present invention, wherein the laminated holographic memory system including: the laminated holographic medium including: a core layer to which an incident light comes in; a diffraction grating layer formed with respect to a form or a refractive index distribution and from which a reproduction beam goes out; and a recording layer including: a shading portion partly made from a colored material shading the reproduction beam; and a recording mark that expresses information by a presence of a hole for transmitting or shading the reproduction beam except for position of the shading portion, or by a degree of transmissivity of the reproduction beam, and a reproduction apparatus radiating the incident light and detecting the reproduction beam, and the design method of producing the laminated holographic medium of the laminated holographic memory system including steps of providing the recording mark at a position that does not overlap the shading portion; and forming a diffraction grating layer for recording data in order to indicate the presence and a position of the recording mark on a recording layer by a presence of brightness/darkness and a position of light upon reproducing with the reproduction apparatus.

A design method of producing a laminated holographic medium of a laminated holographic memory system in the present invention, wherein the laminated holographic memory system including: the laminated holographic medium including: a core layer to which an incident light comes in a diffraction grating layer formed with respect to a form or a refractive index distribution and from which a reproduction beam goes out; and a recording layer including a recording mark indicating information by including a presence of a hole in order to transmit or shade a light or by including a degree of transmittance of the reproduction beam, and a reproduction apparatus radiating the incident light and detecting the reproduction beam, and the design method of producing the laminated holographic medium of the laminated holographic memory system including steps of: providing the recording mark at a position transformed based on a presence of brightness/darkness and a position of the reproduction beam on the reproduction apparatus determined beforehand and in accordance with a predetermined regulation, forming a diffraction grating layer for recording data in order to indicate the presence and a position of the recording mark on a recording layer by the presence of brightness/darkness and the position of the reproduction beam determined beforehand upon reproducing with the reproduction apparatus.

An authentication sheet of the present invention including: one or more first core layers; one or more diffraction grating layers for recording data provided upon, under or in the first core layer, formed with respect to a form or a refractive index distribution and from which a reproduction beam goes out; and one or more recording layers provided adjacent to the first core layer or the diffraction grating layer for recording data or provided while binding a gap layer between the recording layer it self and the core layer or the diffraction grating layer for recording data, and to which information data is recorded as a recording mark having transmittance or non-transmittance of a light indicating the information data in accordance with a presence of a hole or a degree of transmittance of the light.

The authentication sheet described above, wherein when the reproduction beam is transmitted through the recording layer, a presence of brightness/darkness and a position of light indicate the presence and a position of the recording mark by forming the diffraction grating layer for recording data.

A reproduction apparatus of the present invention for reproducing information data recorded on the laminated holographic medium described above, including: an optical head radiates an incident light into the first core layer; and a photodetector detects a light transmitted through the recording layer.

A reproduction method for reproducing information data recorded on the authentication sheet described above, including steps of radiating the incident light into the first core layer: detecting the reproduction beam outgoing from the diffraction grating layer for recording data via the recording layer: and reproducing the information data recorded on the recording layer in accordance with a brightness/darkness pattern corresponding to the presence of the recording mark in the recording layer.

A recording apparatus for recording information data to the authentication sheet described above, including: a beam radiation system radiating a beam onto the recording layer and drawing or projecting the information data as a whole, or an electron beam radiation system radiating an electron beam onto the recording layer and drawing or projecting the information data as a whole.

A recording method for recording information data to the authentication sheet described above using a recording apparatus including at least a beam radiation system or an electron radiation system, including apparatus and the reproduction method of the present invention.

Therefore, there are effects that it is possible to record and reproduce the information data specific to each authentication sheet, it is possible to manage the authentication sheet and each of them the authentication sheet is adhered, and it is possible to use in various fields of application explained below.

In accordance with the present invention, in the laminated holographic medium, the recording layer has a structure that a recording mark is provided at a position that does not shade a transmitting reproduction beam before it is accepted by the reproduction apparatus. Therefore, it is possible to detect the reproduction beam at the reproduction apparatus accurately, and it is possible to recognize information read from the reproduction beam accurately.

In accordance with the present invention, in the laminated holographic medium, the recording layer has a structure of having the recording mark at a position that does not overlap an aperture gap of an aperture mask of the reproduction apparatus. Therefore, the transmitting reproduction beam is not shaded before it is accepted by the reproduction apparatus and it is possible to detect the reproduction beam at the reproduction apparatus accurately. Therefore, it is possible to recognize information read from the reproduction beam accurately.

In accordance with the present invention, in the laminated holographic medium, the recording layer has a structure of providing a shading portion that is partly made from a colored material shading the reproduction beam and the recording mark that expresses information by presence of a hole for transmitting or shading the reproduction beam except for position of the shading portion, or by a difference of transmissivity of the reproduction beam. Therefore, the reproduction beam is not shaded by a display portion before it is accepted bay the reproduction apparatus and it is steps of recording the information data corresponding to a presence of the recording mark having transmittance or non-transmittance on the recording layer by drawing or projecting the information data as a whole using a beam or an electron beam from the beam radiation system or the electron radiation system.

In accordance with the present invention, after or during producing the laminated holographic medium, it is possible to record information data easily.

In accordance with the present invention, using the reproduction apparatus and the reproduction method, it is possible to reproduce the recorded information data easily.

In accordance with the present invention, after writing the specific information data for each laminated holographic medium such as an identification number and the like onto the recording layer, the recording layer made from the diffraction grating layer in which the data of contents information is written at the upper portion is formed by adhering and the like, therefore, it is possible to write the information data onto the recording layer easily and it extends the degree of freedom for the material applied to the recording layer and processing.

Therefore, it is possible to record the information data specific to the each medium, it is possible to manage each of medium, and it is effective to protect the copy right of the contents recorded or stored in the medium from illegal copying, counterfeiting and the like.

In accordance with the present invention, upon producing the authentication sheet of the present invention, using the medium and the recording method of the present invention, it is possible to record the information data on the authentication above easily. Moreover, it is possible to reproduce the recorded information data easily by using the reproduction possible for the reproduction apparatus to detect the reproduction beam accurately. Therefore, for example in a case that the laminated holographic medium stores contents and the like and the shading portion is provided on the display portion, that is, a design such as a title of the content is drawn, it is possible to avoid limitations for the design because of it, and it is possible to use it as a part of the design.

In accordance with the present invention the laminated holographic medium expresses information by presence of the hole that transmits or shades the reproduction beam, and has a structure of providing the recording layer having a recording mark set at a position transformed in accordance with a predetermined rule based on a predetermined presence and position of brightness/darkness of the reproduction beam on the reproduction apparatus, a diffraction grating for recorded data formed in a manner such that presence and position of the recording mark on the recording layer are corresponding to the predetermined presence and position of brightness/darkness of the reproduction beam that are reproduced by the reproduction apparatus.

Therefore, it is possible to prevent recognizing information of the recording mark by eyes when a predetermined rule is applied such as providing the recording mark to which the brightness/darkness is reverted from the reproduction beam and position is reversed up and down, or right and left, reversing presence, or shifting the recording mark for a predetermined distance up, down, left or right. Similarly it is possible to make it difficult to recognize information of the recording mark by transforming the presence and position of the recording mark to have a relationship with the brightness/darkness and position of the beam so as to be one-to-many, many-to-many, or many-to-one. Therefore, it is possible to make the security of the information recorded in the laminated holographic medium higher.

BRIEF DESCRIPTION OF THE DRAWINGS

FIG. 3 is a figure showing structures of the laminated holographic medium and a recording apparatus thereof of an embodiment of the present invention.

FIG. 26 is a side figure showing a structure of the laminated holographic medium of a sixth embodiment of the present invention.

FIG. 29 is a side figure showing a structure of the laminated holographic medium and a structure of the reproduction apparatus of tenth and eleventh embodiments in the present invention.

BEST MODE FOR CARRYING OUT THE INVENTION

Hereinafter, referring to the figures, preferred embodiments of the present invention are explained. It should be noted that the scope of the present invention is not limited by the embodiments below, and for example, it is appropriate to combine the construction units below.

First and Second Embodiment of a Medium

The medium of the present invention is characterized by being composed of two or more core layers; 3 or more cladding layers bound to the core layers; one or more diffraction grating layers storing information data and set at a boundary between a portion of the core layers and the cladding layers binding the core layers or set inside the core layers; and one or more recording layers storing information data as forms or a refractive index distribution and set at a boundary between a portion of the core layers and the cladding layers binding the core layers or inside the core layers through or without a gap layer.

Figure 1:
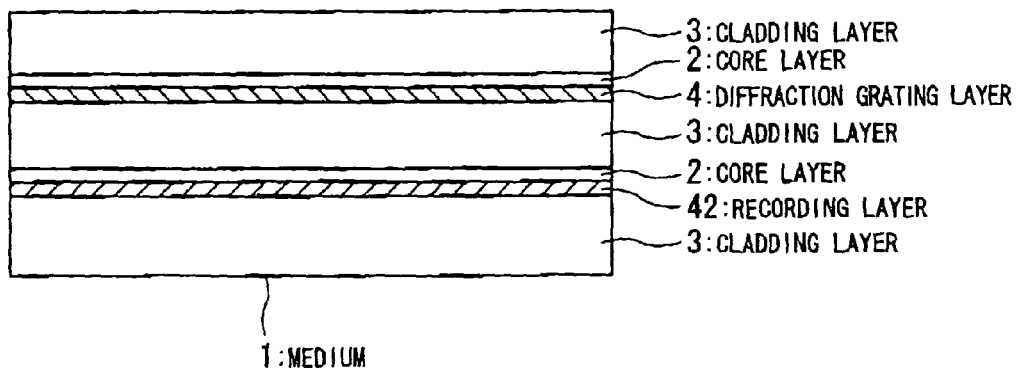
FIG. 1 is a aide figure showing a structure of the laminated holographic medium of a first embodiment of the present invention.

FIG. 1 is a side figure (cross-section) showing a medium 1 of the first embodiment of the present invention. It is composed of two core layers 2; 3 cladding layers 3 bound to the core layers 2; a diffraction grating layer 4 set at a boundary between one of the core layers 2 and the cladding layers 3 bound to the core layer 2, or set inside the core layer 2; and a recording layer 42 set at a boundary between another core layer 2 and the cladding layers 3 bound to the core layer 2, or inside the core layer 2.

Figure 2:
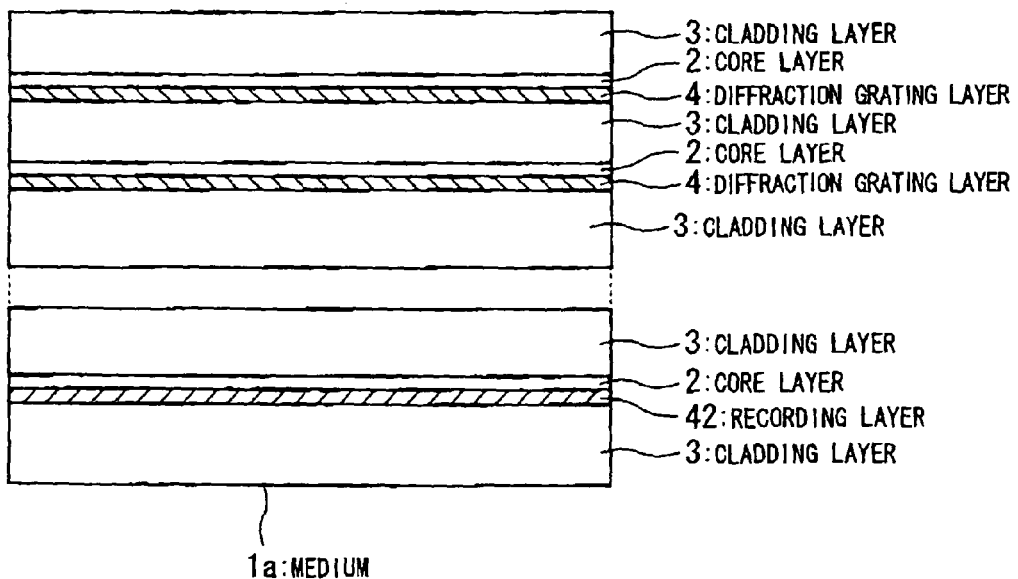
FIG. 2 is a side figure showing a structure of the laminated holographic medium of a second embodiment of the present invention.

FIG. 2 is a side figure (cross-section) showing a medium 1$a$ of the second embodiment of the present invention. It is composed of three or more core layers 2; multiple cladding layers 3 bound to the core layers 2; multiple diffraction grating layers 4 set at boundaries between the core layers 2 and the cladding layers 3 or set inside the core layers 2; and a recording layer 42 set at a boundary between one specific core layer 2 and the cladding layers bound to the core layer or inside the core layer 2. There is an advantage in FIG. 2 compared to FIG. 1 in that the storage capacity can be larger.

The diffraction grating layer 4 stores information data in a bumpy form or as a refractive index distribution. FIG. 2 shows only a case of one recording layer 42, but, the same effects can be obtained in a case of multiple layers. The same effects can be obtained not only by providing the diffraction grating layers 4 and the recording layer 42 directly contacting to the core layers 2, but also by inserting the gap layers in between. Materials having similar characteristics can be used for the gap layer and the cladding layer 3. The core layers 2 have a thickness of substantially 1 $\mu$m and the cladding layers 3 have a thickness of substantially 10 $\mu$m. It is appropriate to provide two diffraction grating layers 4 on and under the core layers 2, and there is an advantageous point in that it can increase the storage capacity by providing many diffraction grating layers 4 (in other embodiments too).

The recording layer 42 is made from materials with photosensitivity or thermosensitivity, and has a characteristic that a form or a refractive index of it changes upon exposure to light (including infrared rays, visible rays, ultraviolet rays, laser, X-rays and electron beams) or heat. For example, it can be a metal (aluminum, chrome or the like), an alloy, a semiconductor (antimony or the like), a phase change material (Ge—Sb—Te system, Ag—In—Sn—Te system), a coloring matter (phthalocyanine system, alloy azo system, cyanine system), a photorefractive material (LN, SBN), a photochromic material (thermochromic material, photopolymer), an oxide (chrome oxide, silver oxide or the like) and a resin (UV curing resin, thermoset resin or the like, or fullerene or coloring matter is doped to the resin).

<Recording Apparatus and First Recording Method of First Embodiment>

The recording apparatus of the present invention in the first embodiment is an apparatus for recording information data on the medium of the first embodiment that is characterized by being composed from at least an object beam emission system having a function of emitting an object beam including information data to be recorded; and a reference beam emission system having a function of emitting a reference beam onto the recording layer.

The first embodiment of the present invention is a method of recording the information data on the medium of the first embodiment (FIG. 1) by using the recording apparatus, characterized by causing an object beam and a reference beam and recording the information data as holographic data on the recording layer using light, heat or an electron by emitting a beam (laser) or an electron beam.

FIG. 3 is a figure of a Bide face of the recording apparatus 52 of the embodiment of the present invention. The recording apparatus 52 is composed of an object beam optical system 100 having a function of radiating an object beam 92 including information data to be recorded onto the recording layer 42, a reference beam optical system 101 having a function of radiating a reference beam 82 onto the recording layer 42. At the recording layer 42, the object beam 92 and the reference beam 82 cross and interference fringes including a concentration distribution of heat or light intensity are generated. As a result, at the recording layer 42, interference fringes formed as a form (pattern) or a change (variations) of refractive index are recorded as holographic data (a thermal hologram recording or an optical hologram recording).

The recording layer 42 is radiated by an incident of the reference beam 82 into the core layer 2 in FIG. 3($a$), by radiating from an upper side of the medium 1 in FIG. 3($b$), and by radiating from a lower side of the medium 1 in FIG. 3($c$). In each case, there is a method of radiating the reference beam 82 as ordinary light or as a near field light having a similar advantage.

The object beam optical system 100 can carry information data included in the object beam 92, for example, by use of a spatial light modulator (by transmitting light through the spatial light modulator displaying information data to be recorded), and therefore, it is appropriate to have a lens, a collimator, various optical components and the like as components, if necessary.

The reference beam optical system 101 can have a lens, a collimator, various optical components and the like as components, if necessary. The object beam optical system 100 and the object beam 92 needs to have a light source. In order to have interference between the object beam 92 and the reference beam 82 and effect a hologram recording, the object beam 92 and the reference beam 82 must be caused to have high coherence and it is preferable that they be light from the same light source.

It is appropriate to change the positions and angles of the object beam optical system 100, the object beam 92 and the medium 1 relatively if necessary, and therefore, it is appropriate that a mechanism or a function for driving in one dimension, two dimensions or three dimensions be provided. Moreover, in order for it to be possible to check the reproduction light, it is appropriate that the recording apparatus 52 provide an optical head 6 and a photodetector 7 (see FIG. 4) and have a component or a function such as a shading mask and a medium supporting portion provided by the reproduction apparatus 5 (FIG. 4) described below, if necessary.

<Reconstruction Apparatus and Reproduction Method of First Embodiment>

The first embodiment of the reproduction apparatus in the present invention is a reproduction apparatus which reproduces information data recorded on the medium of the first embodiment (FIG. 1), and is characterized in that it is composed of, at least an optical head having a function of radiating incident light onto the medium, and a photodetector having a function of detecting reproduction light coming back from the medium.

The reproduction method of the present invention in the first embodiment is a method of reproducing using the reproduction apparatus optical connection portion, a mirror surface or the like at the medium 1.

The optical head 6 has a source for generating the incident light 8, and for example, various laser light sources can be applied to the source. The optical head 6 is, for example, constructed by combining a mirror leading the light, optical components such as a collimator, a condenser lens having a function of focusing (condensing) the incident light 8 on the core layer 2, an actuator having a function (mechanism, servo function, or the like) of radiating the incident light 8 to a desired position of the core layer 2 at a desired angle, and the like. It is appropriate for the reproduction apparatus 5 to have a photodetector for the servo if necessary.

The photodetector 7 has a function of detecting the reproduction beam 9 coming out from the medium 1. It is appropriate for it to have a mechanism for shifting (movement). It should be noted that it is necessary to shift (move) the photodetector 7 and the medium 1 relatively, and therefore, it is appropriate that the medium 1 side have a mechanism for shifting (movement). There are examples such as a two dimensional photodetector like a CCD (Charge-Coupled Devices), a CMOS (Complementary Metal-Oxide Semiconductor) or the like, a one dimensional photodetector such as a line sensor, and a photodiode. The reproduction beam 9 comes out as two dimensional data, and therefore, a one dimensional photodetector, or preferably a two dimensional photodetector, has an advantage in that it can detect it in a shorter time.

It is appropriate that the reproduction apparatus 5 have an aperture mask if necessary, the aperture mask being provided on an optical path of the reproduction beam 9 outgoing from the medium 1 before it is accepted by the photodetector 7, and it has a function of separating (splitting or dividing) and reproducing the reproduction beam 9 outgoing from each diffraction grating layer 4 if multiplex information data is recorded on the diffraction grating layers 4. Using the aperture mask, it is possible to reproduce the with the medium of the first embodiment, and is characterized by radiating the incident light from the optical head onto the core layer neighboring to the recording layer, diffraction of the incident light as a reproduction beam including the information data because of the holographic data recorded on the recording layer, detecting and reproducing the reproduction beam using the photodetector, and reproducing the information data recorded on the recording layer.

Figure 4:
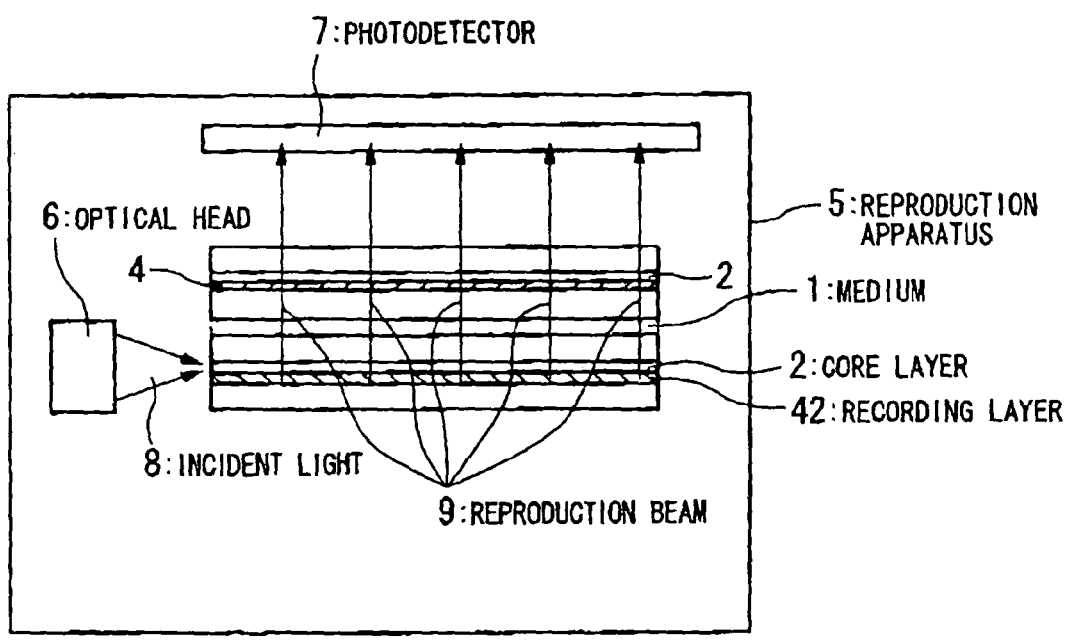
FIG. 4 is a figure showing structures of a medium and its reproduction apparatus of an embodiment of the present invention.

FIG. 4 is a figure of a side face showing the reproduction apparatus of the embodiment of the present invention, and is an apparatus for reproducing the information data recorded on the recording layer 42 of the medium 1 (FIG. 1). The reproduction apparatus shown in FIG. 4 is composed of an optical head 6 and a photodetector 7, and the optical head 6 has a function of radiating incident light 8 into the desired core layer 2 of the medium 1. When the optical head 6 radiates the incident light 8 into the core layer 2 neighboring the recording layer 42, the light is diffracted in accordance with the holographic data (form or change of refractive index) recorded on the recording layer 42, and the reproduction beam 9 goes out of the surface of the medium 1. It is possible to reproduce the information data recorded on the recording layer 42 by detecting it with the photodetector 7. It is as same as the prior arts that it is possible to read the information data recorded on each diffraction grating layer 4 by radiating incident light 8 into the desired core layer 2.

There are methods for incidence of the incident light 8 onto the core layer 2, such as a method of radiating from edge faces of the medium 1, a method of providing an optical connection portion at the core layer 2 and radiating from above or below the medium 1, and a method of providing a mirror surface at each core layer 2 and radiating from above or below of the medium 1. These methods have the same effects. The method of radiating from the edge face has an advantage in that it does not need to provide an information data of multiple screens of the photodetector 7 from one diffraction grating layer 4, and therefore, it is possible to increase the storage capacity of the medium 1 without limitation in accordance with a number of pixels of the photodetector 7. In other words, there is an advantage in that it is possible to increase storage capacity because multiplex recording and the multiplex reproduction are possible. There are aperture masks such that it is made from liquid crystal devices which can electrically change the position of aperture, or which have a fixed aperture and wherein the mask is shifted. The former does not need a mechanical shifting, and therefore, it is advantageous. It is appropriate that a number of the apertures being opened at a time be either one or more than one (the same in other embodiments).

Numbers of elements, such as of the optical components or the electromechanical components, of the recording apparatus 52 and the reproduction apparatus 5 can be one or more than one, and the same effects can be obtained (in other embodiments too).

It is appropriate that as the compositional elements of the recording apparatus 52 and the reproduction apparatus 5, a medium loading entrance (or aperture) that is an entrance for loading the medium 1, a medium loading space that is a space for loading the medium 1, a medium loading table having a function of fixing, loading, holding and ejecting the medium 1 are provided. They have an advantage in that it is easy to load the medium 1 stably. There is a compositional element of the recording apparatus 52 and the reproduction apparatus 6 such as a logic/control circuit. The logic/control circuit is a circuit having functions of operating digital signals and operating activation of an active device explained in this specification.

The recording apparatus 52 and the reproduction apparatus 5 are just typical embodiments in the present invention, and by changing position of the compositional elements, combining the embodiments or mixing the embodiments, the same advantages can be obtained and such variations are included in the scope of the present invention.

<Second and Third Embodiments of Recording Apparatus and Recording Method>

The second and the third embodiments of the recording apparatus in the present invention are apparatuses which record information data on the medium of the first embodiment (FIG. 1), and are characterized by being composed of, at least, a beam radiation system having a function of radiating a beam onto the recording layer and drawing (writing, tracing or pointing) or projecting (printing, copying, radiating or reflecting) the information data as a whole (integrally, overall, totally, collectively or in one time) and an electron beam radiation system having functions of radiating an electron beam onto the recording layer and drawing or projecting as a whole the information data.

The second and the third embodiments of the recording methods in the present invention are recording methods for recording the information data on the medium of the first embodiment using the recording apparatus above, and are characterized by recording of information data obtained from a CGH (Computer Generated Hologram) by drawing or projecting collectively the holographic data to the recording layer using the light or the heat from radiation of the beam (laser) or the electron beam.

Figure 5:
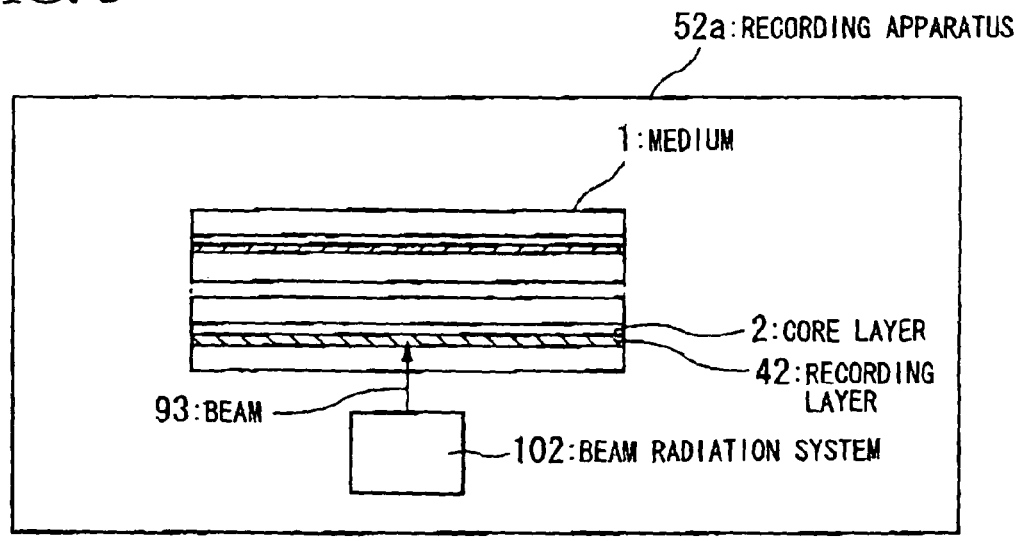
FIG. 5 is a figure showing the medium and a recording apparatus of an embodiment of the present invention.
Figure 6:
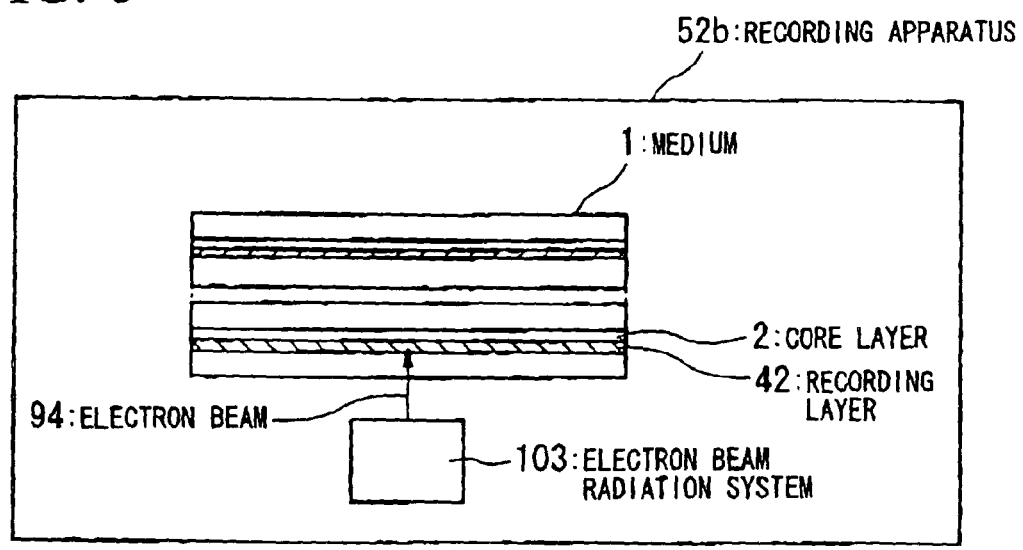
FIG. 6 is a figure showing structures of the medium and a recording apparatus of an embodiment of the present invention.

FIG. 5 is a side face of the recording apparatus 52a of the second embodiment, which is an apparatus which records information data onto the medium of the first embodiment (FIG. 1). The recording apparatus 52a in FIG. 5 is composed of a beam radiation system 102 having a function of radiating a beam 93 onto the recording layer 42. FIG. 6 is a side face of the recording apparatus 52b of the third embodiment, and it is an apparatus which records the information data on the medium of the first embodiment. The recording apparatus 52b in FIG. 6 is composed of an electron beam radiation system 103 having a function of radiating an electron beam 94 onto the recording layer 42.

As described in the embodiment above, there is a mechanism or a method in order to achieve high accuracy with respect to a form and a position of a processing spot, and therefore, it is possible to operate forming and positioning of the spot with high accuracy by observing the surface being processed from the down side of a sample (medium) while processing.

In each embodiment above, the holographic data obtained from the CGH is drawn as a form (pattern) or a change of refractive index (variations in refractive index) to the recording layer 42 and recorded by using the beam 93 or the electron beam 94. This holographic data is equivalent to the holographic data in FIG. 3 obtained by the thermal hologram or the optical hologram.

There is another recording method of recording the holographic data onto the recording layer 42 such that the holographic data from the CGH is shown on a spatial light modulator, a photomask and/or the like, the beam 93 or the electron beam 94 passes through them and gets the hologram information, and the holographic data is projected collectively and recorded on the recording layer 42 (records on the recording layer 42 as the form or the refractive index changes) via a zooming lens system. By projecting collectively, there is an advantage in that it is possible to record faster than drawing.

As the beam, infrared light, ultraviolet light, a laser, X-rays, or the like can be applied. It is appropriate that the beam radiation system 102 and the electron beam radiation system 103 have compositional elements such as a lens, a collimator and the like if necessary. It is appropriate that the beam radiation system 102, the electron beam radiation system 103 and the medium 1 change their angles and positions relatively if necessary, and therefore, it is appropriate that they have shifting mechanism or functions in one, two or three dimensions. Moreover, it is appropriate that the recording apparatus 52a and 62b have the optical head 6 and photodetector 7, and have compositional elements or functions that the reproduction apparatus 5 has such as a shading mask, a medium supporting portion if necessary. Other points, such as compositional elements or functions that can be added are the same as for the recording apparatus in FIG. 3.

A reproduction apparatus and a reproduction method of the information data recorded on the recording layer 42 are same as the reproduction apparatus and the reproduction method in FIG. 4. In other words, the reproduction apparatus is an apparatus reproduces information data recorded on the medium of the first embodiment, and is composed of, at least, an optical head having a function of radiating the incident light into the medium, a photodetector having a function of detecting a reproduction light outgoing from the medium.

The reproduction method radiates the incident light from the optical head into the core layer neighboring to the recording layer, diffracts the incident light as the reproduction beam including the information data because of the holographic data recorded on the recording layer, detects and reproduces the reproduction beam using the photodetector, and reproduces the information data recorded on the recording layer.

<A Third and Fourth Embodiments of the Medium>

The third and fourth embodiments of the medium in the present invention are characterized by being composed of two or more core layers, three or more cladding layers set to bind the core layers, one or more diffraction grating layers to which information data is recorded and set at a boundary between some of the core layers and the cladding layers binding the core layers or set inside the core layer, one or more recorded data diffraction grating layers set at a boundary between the core layer and the cladding layers binding it or set inside the core layer from which the reproduction beam goes out, and one or more recording layers to which the information data is recorded as presence of recording marks with or without transmittance of the light and set adjacent to the core layer, set close to the core layer while binding a gap layer between it and the core layer or set apart from the core layer.

Moreover, it is characterized by the record data diffraction grating layer formed to have the recording marks on the recording layer that their presence and positions appear as brightness/darkness and positions of the light. For example, the record data diffraction grating layer is formed to have the recording marks on the recording layer and their presence and positions are corresponding to brightness/darkness and positions of the light on the photodetector.

Figure 7:
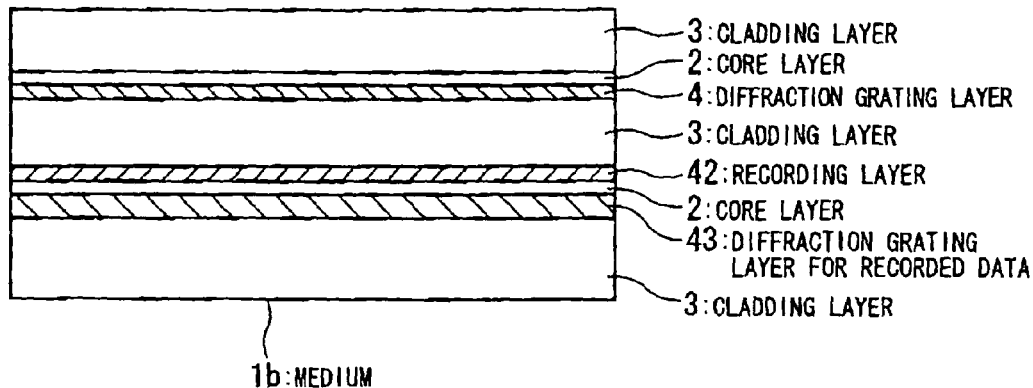
FIG. 7 is a side figure showing a structure of the laminated holographic medium of a third embodiment of the present invention.

FIG. 7 is a side face (cross-section) showing the medium of the third embodiment of the present invention. The medium 1b is composed of two core layers 2, three cladding layers 3 set to bind the core layers 2, one diffraction grating layer 4 set at a boundary between one of the core layers 2 and the cladding layers 3 binding it or set inside the core layer 2, one recorded data diffraction grating layer 43 set at a boundary between another core layer 2 and the cladding layers 3 binding it or set inside the core layer 2, and one recording layer 42 set adjacent to another core layer 2.

Figure 8:
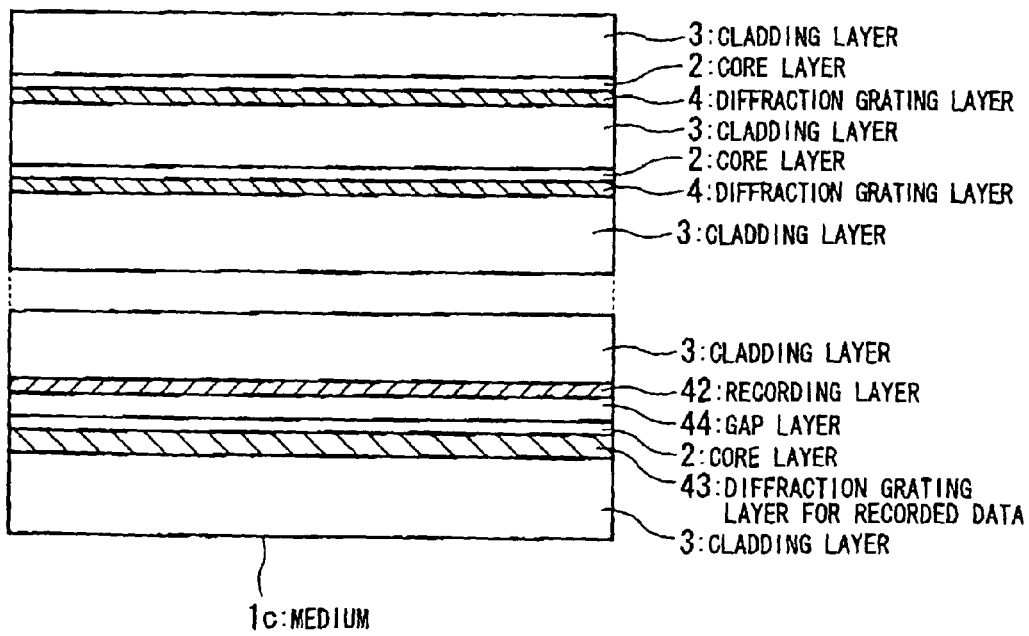
FIG. 8 is a side figure showing a structure of the laminated holographic medium of a fourth embodiment of the present invention.

FIG. 8 is a side face (cross-section) showing the medium of the fourth embodiment of the present invention. The medium 1c is composed of three or more core layers 2, multiple cladding layers 3 set to bind the core layers 2, multiple diffraction grating layer 4 set at a boundary between the core layers 2 and the cladding layers 3 or set inside the core layers 2, one recorded data diffraction grating layer 43 set at a boundary between one specific core layer 2 and the cladding layer 3 binding it or set inside the core layer 2, and a recording layer 42 set close to other core layer 2 binding a gap layer 44 between it and the core layer 2. In FIG. 8, there is an advantage in that it is possible to increase the storage capacity because it has more diffraction grating layers storing the information data.

At the diffraction grating layer 4, the information data is stored as, for example, a bumpy form or a refractive index distribution (and as the holographic data). Multiple recording layers 42 have the same effects.

There is the same effect not only in a case that the diffraction grating layer 4 and the recording layer 42 are directly adjacent to the core layer 2, but also in a case that the gap layer 44 is provided. The compositional elements are same as in FIGS. 1 and 2. A resin, a glass, an optical crystal and the like can be used for materials of the core layer 2 and the cladding layer 3, and for the gap layer 44, the materials having the same characteristics (the resin, the glass, the optical crystal and the like) can be used. The core layer 2 has a thickness of substantially 1 μm and the cladding layer 3 has a thickness of substantially 10 μm. The diffraction grating layers 4 can be set at two points that are on and under the core layer 2, there is an advantage in that it is possible to increase the storage capacity upon having many diffraction grating layers 4.

The recording layer 42 is same as shown in FIGS. 1 and 2, and the materials having functions of changing the optical characteristics such as the form, the refractive index and the like upon receiving the light (including infrared light, visible ray, ultraviolet light, laser, X-ray, electron beam and the like) or the heat and as a result, changing to have or not to have transmittance of the light (including changes such as transmittance/non-transmittance (opaque), with/without holes and the like), can be used. For example, a material having characteristics of changing from non-transmittance (opaque) to transmittance (or the converse), disappearing by changes of the form/sublimation (having an aperture or a hole) can be used (a mark made on the recording layer in such manner is called recording mark 45). It is appropriate to define the transmittal part as the recording mark or the non-transmittance part.

In this document, many descriptions are using the transmittal part as a recording mark however the same effects can be obtained if the non-transmittance part is used. In this case, the description of this document should be changed appropriately such as changing brightness/darkness of bright and dark dots, and they are included in the scope of the embodiment (same in all the embodiments). The concrete materials used for the recording layer 42 are a metal (aluminum, chrome and so on), an oxide (chrome oxide, silver oxide and the like), a semiconductor (antimony and the like), a resin (UV curing resin, thermoset resin and the like, or fullerene or coloring matter is doped to the resin), an ink, a paint, paper and the like.

FIG. 7 shows an example without the gap layer 44 and FIG. 8 shows an example with the gap layer 44, and both examples have the same effects, therefore, it is not affected whether or not the gap layer 44 is provided. It is appropriate that the recording layer 42 is set at a side of the recording data diffraction grating layer 43 from which the reproduction beam goes out (a side to which the photodetector 7 is set with respect to the medium 1), and it is not affected by providing a layer except for the gap layer 44 between the recording layer 42 and the recording data diffraction grating layer 43, for example, the core layer 2 or the cladding layer 3.

It should be noted that, in ordinary cases, the information data is stored at the diffraction grating layer 4 therefore, in order to reproduce it, it is better not to set the diffraction grating layer 4 between the recording layer 42 and the recording data diffraction grating layer 43 (because the recording layer 42 and the recording data diffraction grating layer 43 shade the reproduction beam 9 from the diffraction grating layer 4 and it is impossible to reproduce the information data included in the diffraction grating layer 4).

The recording data diffraction grating layer 43 has the same characteristics as the diffraction grating layer 4, and the incident light 8 came into the adjacent core layer 2 goes out as the reproduction beam 9 because of the bumpy form or the refractive index distribution. An angle of the outgoing reproduction beam 9 can be, for example, right above, that is both forward against the incident light 8 from the optical head 6 and backward with against the incident light 8 from the optical head 6, or it can be a parallel beam or can be a mixture of beams with various angles.

It should be noted if the reproduction beam 9 goes out right above and is the parallel beam, then there are advantages such as implementing the recording apparatus 52 and the reproduction apparatus 5 smaller and keeping the reproduction beam 9 from the recording data diffraction grating layer 43 parallel (as is described below, when the reproduction beam 9 from the recording data diffraction grating layer 43 does not spread, more information can be recorded on the recording layer 42 and is reproduced).

As shown in the reproduction apparatus and the reproduction method explained below, it is appropriate that the recording data diffraction grating layer 43 is formed so as that the presence and the position of the recording mark 45 on the recording layer 42 correspond to the brightness/darkness and the position of the light on the photodetector 7. It is appropriate that the presence and the position of the recording mark 45 on the recording layer 42 correspond to the brightness/darkness and the position of the light on the photodetector 7 with one-to-one relationship or without one-to-one relationship necessarily.

In other words, it is appropriate that the recording data refractive grating 43 is formed so as that one dot of brightness/darkness on the photodetector 7 corresponds to one recording mark 45, multiple dots of brightness/darkness on the photodetector 7 correspond to one recording mark 45, one dot of brightness/darkness on the photodetector 7 corresponds to multiple recording marks 45, or multiple dots of brightness/darkness on the photodetector 7 correspond to multiple recording marks 45.

The medium 1 can be produce by recording on the recording layer 43 after producing the medium 1 including the recording layer 42 as one united body, producing two bodies such as one portion including the recording layer 42 and another portion without the recording layer 42 and unifying at last by adhering another portion without the recording layer 42 to one portion including the recording layer 42 after recording on the recording layer 42, and recording on the recording layer 42 of a portion including the recording layer 42 and producing by adding on other portions without the recording portion 42. When the recording portion 42 includes holes (or apertures), it is easier to create holes if the recording layer 42 is exposed and in a production method of two bodies as described above.

With respect to the medium 1, there are an using method in its own form, an using method in a case such as a package or a cartridge, an using method in its own form adhering an label on one side (from which the reproduction beam does not outgo) and so on. It is appropriate that the compositional elements of the recording apparatus and the reproduction apparatus are provided as the compositional elements of the medium, the package or the cartridge (providing compositional elements conversely, or exchanging compositional elements each other), the same effects can be obtained.

It is appropriate in the structure of the medium 1 of the present invention that the gap layer, the cladding layer or a protection layer are inserted between the layers, and the same functions and effects can be obtained whether or not there is the cladding layer or the protection layer on an upper side or lower side surface.

<A First Embodiment of the Recording Apparatus and the Recording Method>

As the first embodiment of the recording apparatus corresponding to the medium of the third and the fourth embodiment, the recording apparatus 52*a* and 52*b* can be applied. The recording apparatus is an apparatus that records the information data on the medium of the third and the fourth embodiment, and is composed of, at least, a beam radiation system having functions of radiating a beam on the recording layer 42 and drawing or projecting as a whole the information data, or an electron beam radiation system having functions of radiating an electron beam on the recording layer 42 and drawing or projecting as a whole the information data.

Figure 9:
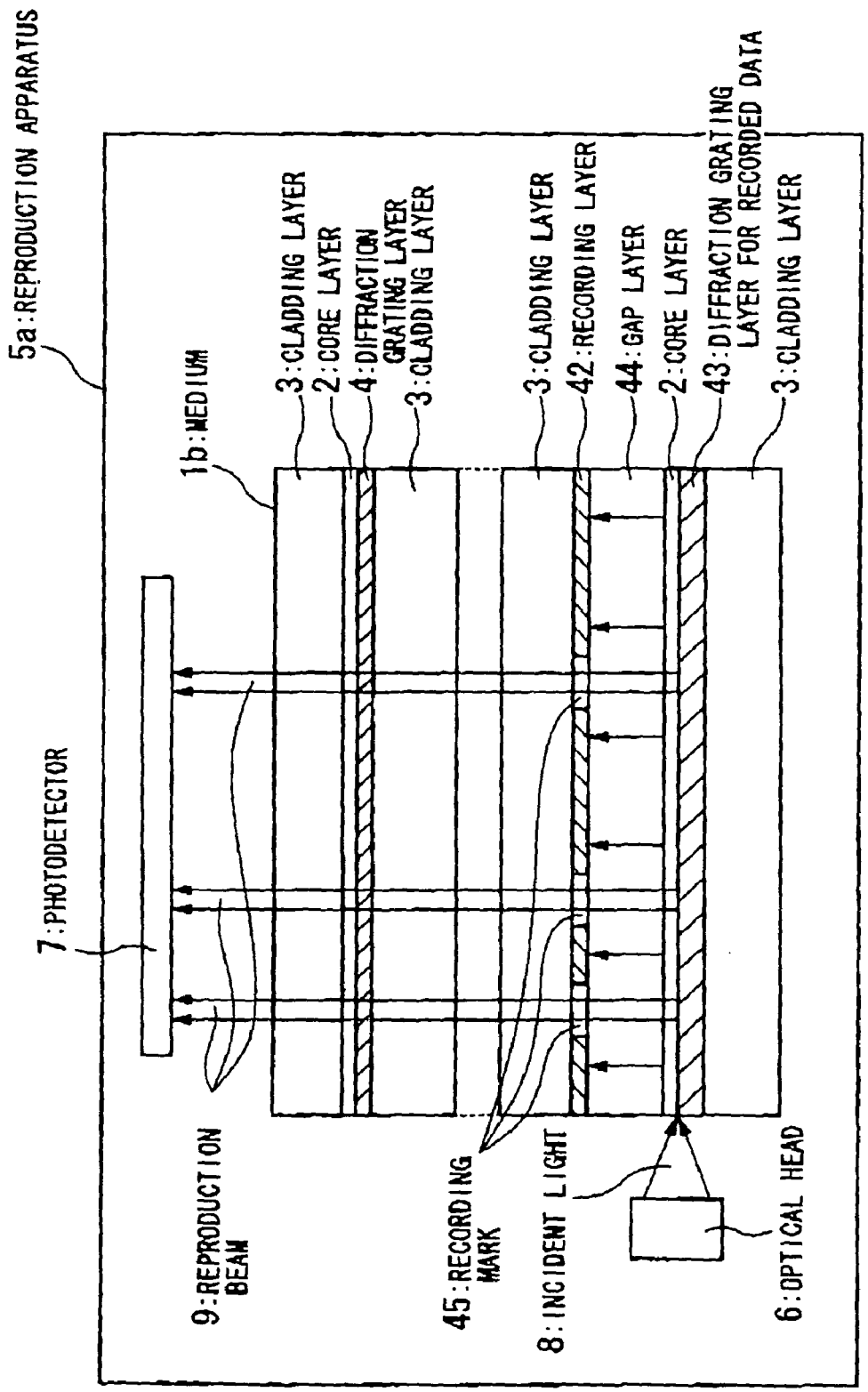
FIG. 9 is a figure showing structures of a medium and a reproduction apparatus of an embodiment of the present invention.

The recording apparatus of the present invention is an apparatus that records the information data on the medium of the third and the fourth embodiments using the recording apparatus above, and is characterized by drawing or projecting as a whole the information data on the recording layer corresponding to the presence of the recording mark having transmittance or non-transmittance of the light using the light, the heat or the electron because of radiation of the beam or the electron beam including the information data, that is, recording the information data using the beam or the electron beam. In other words, using the beam radiation system 102 (FIG. 5) and the electron beam radiation system 103 (FIG. 6), a position (the recording mark 45: FIG. 9) with (or without) transmittance of the beam or the electron beam is formed on the recording layer 42 by drawing or radiating as a whole using the special light modulator. It is possible to record the information data on the recording layer 42 as a position or the form (for example, by forming the recording mark 45 as a hole) of the recording mark 45.

Other than recording on the recording layer using the beam or the electron beam, it is possible to record on the recording layer by using an ion beam generated from the source of the ion beam. It is possible to record by printing an ink, a paint and the like in accordance with desired pattern on the medium using various printing techniques such as an inkjet printing, a laser printing, a screen printing and the like.

It is possible to use a method of adhering a label of paper or resin on the medium and printing a recording pattern on it, or a method of adhering the label to which the recording pattern is already printed on the medium.

By combining the methods above, for example, it is possible to apply a method of spraying the ink and the paint in accordance with the printing technique and recording with radiation of the beam, the electron beam or the like. There is a mechanism or a method in order to achieve high accuracy upon a form and a position of a processing spot, it is possible to operate the spot form and the spot position with high accuracy by processing while observing the surface being processed from the down side of a sample (medium). For example, when processing and recording with the beam (laser), there is a method of similarly observing the processing surface by monitoring reflections of the laser and operating the spot form and the spot position with high-accuracy. It should be noted that when observing by using the reflection, it requires an optical system to split the incident beam and the reflection beam, for example, a half mirror or beam splitter. However, upon using them, the incident beam decreases (in normal cases, less than half), and the power of the incident beam decreases, therefore, there is a problem that an ability of processing decreases. Comparing to this, when applying a method of observing from the down side (in this case, the transmitted beam is observed), there is an advantage in that it is theoretically possible to observe the processing surface without reducing the power of the incident beam.

<A Second Embodiment of the Recording Apparatus and the Recording Method>

The recording apparatus of the second embodiment of the present invention is an apparatus that records the information data on the medium providing at least the recording layer, and is characterized by providing at least a beam radiation system which radiates the beam on the recording layer and draws or projects as a whole the information data or an electron beam radiation system which radiates the electron beam on the recording layer and draws or projects as a whole the information data. As the medium, for example, the medium of the embodiment of the present invention can be used.

The recording method of the second embodiment of the present invention is a recording method of recording the information data to a medium providing at least the recording layer using a recording apparatus providing at least the beam radiation system or the electron beam radiation system, and is characterized by recording the information data by drawing or projecting as a whole on the recording layer corresponding to the presence of the recording mark having transmittance or non-transmittance of the light using the beam radiation system or the electron beam radiation system. As the medium, for example, the medium of this embodiment of present invention can be used. As the recording apparatus, for example, the recording apparatus of this embodiment of the present invention can be used.

Figure 10:
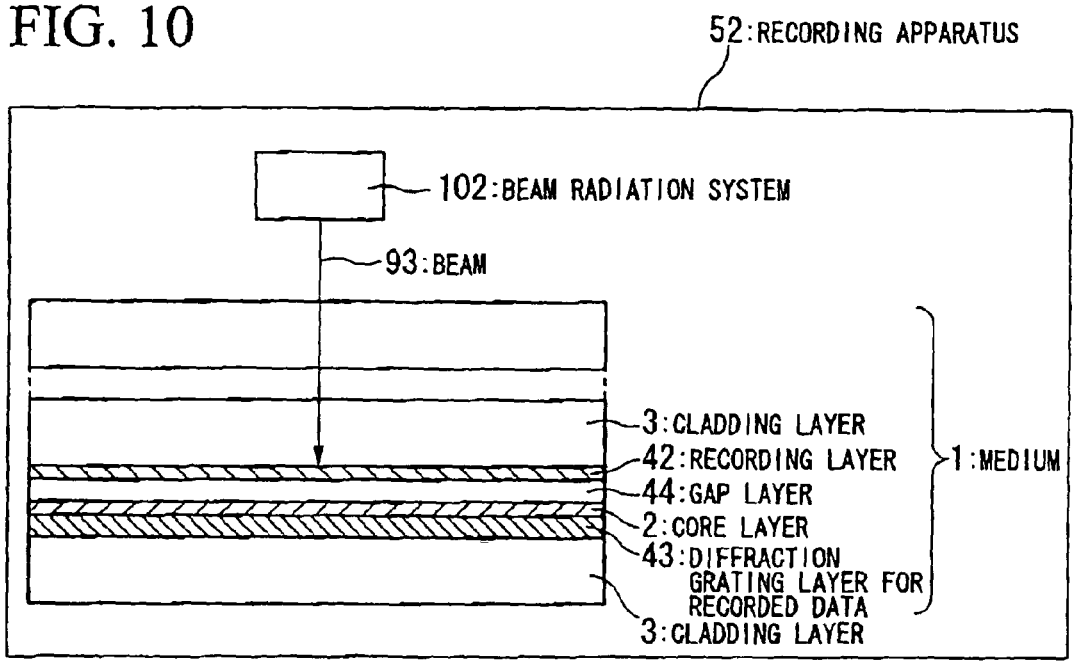
FIG. 10 is a figure showing structures of the medium and a recording apparatus therefore of an embodiment of the present invention.
Figure 11:
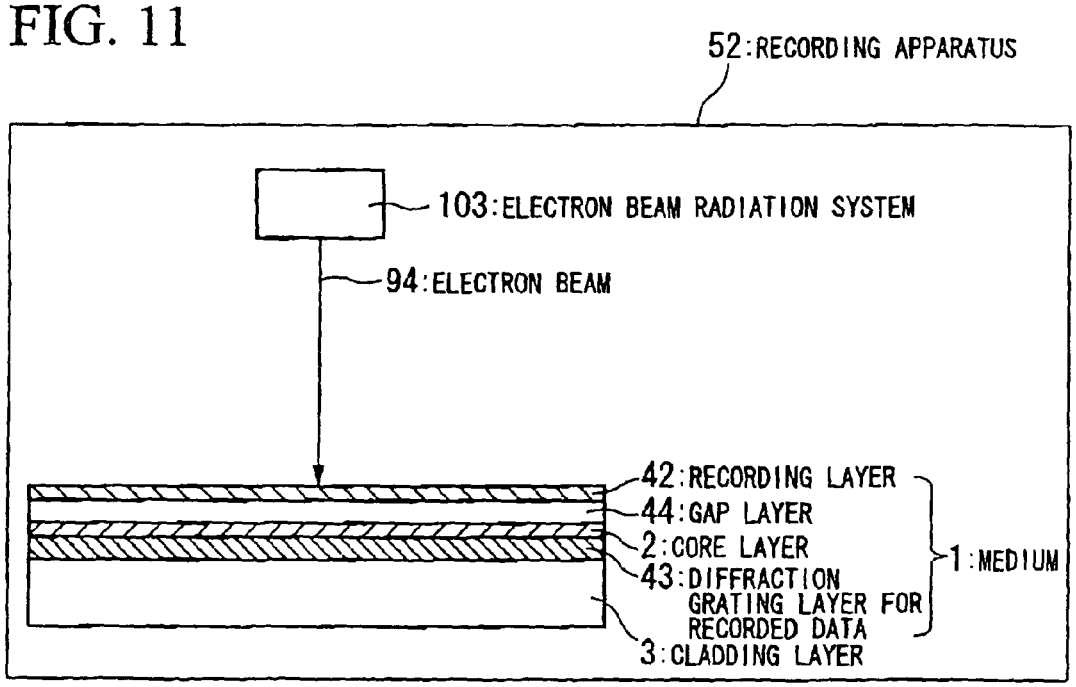
FIG. 11 is a figure showing structures of the medium and a reproduction apparatus therefore of an embodiment of the present invention.

FIGS. 10 and 11 show a structure (side face) of a recording apparatus 52 of this embodiment of the present invention. In FIG. 10, the recording apparatus 52 is composed of a beam radiation system 102 that radiates a beam 93 and draws on the recording layer 43, and in FIG. 11, the recording apparatus 52 is composed of an electron beam radiation system 103 that radiates an electron beam 94 and draws on the recording layer 43. FIG. 10 shows an example of recording on the medium 1 in which a portion including the recording layer 42 and a portion without the recording layer 42 are produced in one body. On the other hand, FIG. 11 shows an example in which the recording layer 42 is exposed and recorded, and in which the information data that is unique information such as an identification number is recorded on the recording layer 42, the portion including the recording layer 42 (an identification information recording portion) is formed, after that, a portion without the recording layer 42 (a ROM portion to which information of contents to be distributed is recorded on the multiple diffraction grating layers in accordance with a normal production step) is combined, and finally the medium 1 is formed in which the identification information recording portion and the ROM portion are in a structure of one body.

In other words, because the identification information recording portion and the ROM portion are produced independently and are combined afterward, a high productivity is kept because the ROM portion can be formed in accordance with the conventional production method, it is possible to record the record the information data specific to each medium on the recording layer easily upon forming the identification information recording portion, therefore, as a result, it is possible to produce the medium to which the unique information is recorded easily.

As described above, when the recording portion 42 includes holes, it is easier to create holes if the recording layer 42 is exposed In other words, it is possible to draw the recording mark indicating the information data directly on the recording layer 42 by radiating the laser or the electron beam because the processing face is exposed, therefore, it is possible to increase the accuracy or processing.

Moreover, if an hole is created by radiating the beam 93 on the recording layer 2 after combining the identification information recording portion and the ROM portion, it can cause a status like a blister because a volume change can be caused because of changes of the material of the recording layer 42 and lack of space for the material of the recording layer 42 to be sublimated, therefore, there is a possibility that the form of the medium is changed. Due to such changes of the form of the medium, it may be impossible to insert because the size of the medium exceeds the size to insert into the reproduction apparatus. Moreover, the memory surface may has a deformation because the form of the medium is changed, the incident light does not come into a predetermined position, the reproduction beam does not outgo accurately even when the incident light comes, and a fault may be caused such that it is impossible to reproduce the information data.

On the other hand, by changing the transmittance and creating the hole as the recording mark while being exposed, there is no change of volume because the sublimated material of the medium 42 is released to the air. For example, by generating the recording layer 42 as shown in FIG. 11 and operating processes on the recording mark while the recording layer 42 is exposed, it is possible to prevent causing the above described blister.

Even when the form of the recording layer 42 is changed, because of an adherence of an adhering layer upon combining two bodies of the identification information recording portion and the ROM portion it is possible to solve such changes, and it is possible to prevent reproduction fault due to faults of the incident light and the reflection light.

If a ROM layer independently produced from multiple diffraction grating layers recording the contents as the information data, the core layer and the cladding layer, is adhered, with respect to the material of the adhering layer (the adherence), a material having the same optical characteristic as the material of the cladding layer 3 (FIG. 9), the core layer 2 (FIG. 7) at the lower portion of the medium 42 or the gap layer 44 (FIG. 8), that is a material having the same optical consistency is used. As a result, it is possible to recover the defects on the surface of the core layer 2 (FIG. 7) or the gap layer 44 (FIG. 8) generated upon creating the hole as the recording mark on the recording layer 42 due to the heat because of radiating by the beam 93 or the electron beam 94. Even if the volume of the recording layer 42 is changed upon creating the hole by recording operation on the exposed recording layer 42, it is possible to solve the changes of the form to some degree upon adhering the ROM layer because of the adhering layer of the adherence and it is possible to apply materials which change their volume.

As described above, by using the adherence having the same optical characteristics as the layer to be adhered, it is possible to complement areas to which the recording mark (area of holes) or the recording layer (in a case of forming the recording layer partially as described later) are not formed by filling the adherence, therefore, it is possible to make the adhered surface (the adhered surface between two bodies) optically continuous. Therefore, for example, even when the gap layer 44 and the like are damaged with the laser (in a case of generating a hole) upon recording by creating the hole on the recording layer 42 with the laser, it is possible to complement by filling the hole as a damage with the adherence and it is possible to recover the damages because of recording and processing at the production step of combining two bodies into one body.

When the recording mark 45 is formed by changing the transmittance or the refractive index of the recording layer 42 with the beam 93 and the electron beam 94, it is physically possible to change the transmittance or the refractive index, however, it is needed to select the material that change its transmittance in a range that is possible to be detected by using a beam for process, and it is a difficult aspect to select the material.

To find or create a new material having a characteristic of changing its transmittance or refractive index by radiating a beam with a predetermined energy is very difficult because the material with characteristics above should satisfy following characteristics (i)-(iii).

(i) Upon working as the recording mark (transmitting the light), it is needed that the core layer and the cladding layer have approximately same refractive indices (for example, both of them have the refractive indices of approximately 1.5 and the core layer has little bit larger value).

(ii) It is needed that it satisfies a condition that the refractive index or the transmittance is changed by radiating the light upon recording however the refractive index or the transmittance is not changed by radiating the light upon reproducing (in other words, to change the wave length, that is the energy, of the light upon reading and writing). With respect to such condition, it is needed to find a material having a steep light wavelength selectivity or to find a chemical processing method (inactivation process) that satisfies such conditions.

(iii) With respect to the new material for the recording layer, it is needed to have an environmental resistance (thermal/chemical stability), and nonpoisonous/innocence, however it is needed to have no thermal expansion due to the energy of the light or to have the same coefficient of thermal expansion as the core layer and the cladding layer, that is, to have no change of volume before and after recording (that may cause changes of the refractive index or changes of transmittance by radiating the light).

On the other hand, with respect to the recording mark 45, when the information data is indicated by using the presence of the hole, it is possible to produce only the recording layer 42 as a single layer beforehand and to form by adhering the diffraction grating layer and the ROM layer, therefore, it is possible to increase freedom of selecting the material available for the recording layer 42 and to process with a lower cost.

In other words, by applying the presence of the hole on the recording layer as the recording mark, it is possible to use, for example, a paint as the material of the recording layer. It satisfies the condition that upon recording the information data by creating the hole with the laser, it is possible to create the hole efficiently because the laser is absorbed effectively, and upon reproducing, it shades the reproduction beam from the diffraction grating layer by the inside of the hole (the condition is easier than the material that changes its refractive index or transmittance). Therefore, the freedom of selecting the material is increased.

When the recording mark 45 is formed with a material by changing the transmittance, the transmittance of the material of the recording layer 42 changes gradually because of the incident light radiated upon reading the information data or time passing by, therefore, it can be assumed that the information data cannot be read correctly after using the recording layer for long time.

However, when the information data is indicated by the presence of the hole as the recording mark 45, the recording mark 45 does not change and it is possible to use for longer time than a case of recording the information data on the recording layer 42 by using the transmittance.

As described above, in a case of recording the information data by changing the optical characteristic of the recording layer except for recording the information data by creating the hole on the recording layer, if the information data is recorded by using the laser and the like after combining the identification information recording portion and the ROM portion into one body, the form of the medium 1 is changed upon changing the volume of the recording layer 42, therefore, same as described in a case of creating the hole on the recording layer 42, a problem such that the information data cannot be read correctly even though the information data is recorded.

On the other hand, in a case of producing two bodies of the identification information recording portion and the ROM portion independently, the independently produced two bodies are combined by using the adherence after the laser is radiated in order to record the information data on the recoding layer 42 in an exposed status of the identification information recording portion, therefore, because of the adhering layer of the adherence, it is possible to solve the change of volume of the recording layer 42 due to the radiated laser, that is the change of form of the recording layer 42, it is possible to prevent changing the form of the medium 1 as a whole, and it is possible to solve the problem that the information data cannot be read correctly.

In a case of producing two bodies of the identification information recording portion and the ROM portion independently, these two bodies are combined after the information data is recorded on the recoding layer 42, it is possible to apply the materials that have volume changes by writing the information data for the materials of the recording layer 42 to which the information data is recorded by radiating the laser, therefore, various materials can be applied and it is possible to develop a new material of the recording layer 42 easier.

In FIGS. 10 and 11, the same effects are obtained even when the beam 93 and the electron beam 94 are exchanged and the beam radiation system 102 and the electron beam radiation system 103 are exchanged.

Hereafter, a recording operation of the recording apparatus 52 is explained. Upon recording, using the beam radiation system 102 or the electron beam radiation system 103, positions having transmittance or non-transmittance with respect to the beam (laser) or the electron beam (the recording mark 45: including transmittance/non-transmittance, with/without holes and the like) are drawn or projected as a whole using the spatial light modulator on the recording layer 42.

In accordance with the presence of the recording mask 45 (number, position, shape and the like), it is possible to record the information data on the recording layer 42. The shape, the changes of the refractive index, removal (hole) and the like of the recording layer 42 have functions of the recording mark 45.

As the beam 93, infrared light, ultraviolet light, a laser, X rays, or the like can be applied. It is appropriate that the beam radiation system 102 and the electron beam radiation system 103 have compositional elements of the optical parts, parts for the electron beam and the like such as a lens, a collimator and the like if necessary. It is appropriate that the beam radiation system 102, the electron beam radiation system 103 and the medium 1 changes their angles and positions relatively if necessary, therefore, it is appropriate that they have shifting mechanism and functions in one, two or three dimension.

Moreover, it is appropriate that the recording apparatus 52 has the optical head 6, photodetector 7, and has compositional elements or functions that the reproduction apparatus 5 of the present invention such as an aperture mask, a reproduction optical system, a medium supporting portion if necessary.

Other than a method of recording on the recording layer 42 by using the beam 93, the electron beam 94 and the like, it is possible to record by printing an ink, a paint and the like in accordance with desired pattern on the medium 1 using various printing techniques such as an inkjet printing, a laser printing, a screen printing and the like.

It is possible to use a method of adhering a label of paper, ink or resin on the medium 1 and printing a recording pattern on it, or a method of adhering the label to which the recording pattern is already printed on the medium. This is included in the scope of the present invention too. Moreover, in addition to the beam 93, the beam radiation system 102, the electron beam 94 and the electron beam radiation system 103, the ion beam and the source of the ion beam are useful. They are, and the combinations of above described elements, for example, a method of spraying the ink or paint in accordance with the printing technology and recording by radiating the beam 93, the electron beam 94 or the like, are included in the scope of the present invention.

With respect to a medium and a recording method, there is a mechanism or a method in order to achieve high accuracy upon a form and a position of a processing spot of the recording mark 45, it is possible to operate the spot form and the spot position with high accuracy by applying the medium and the recording method of observing the surface being processed from the down side of a sample (medium 1) and it has an advantage.

Figure 12:
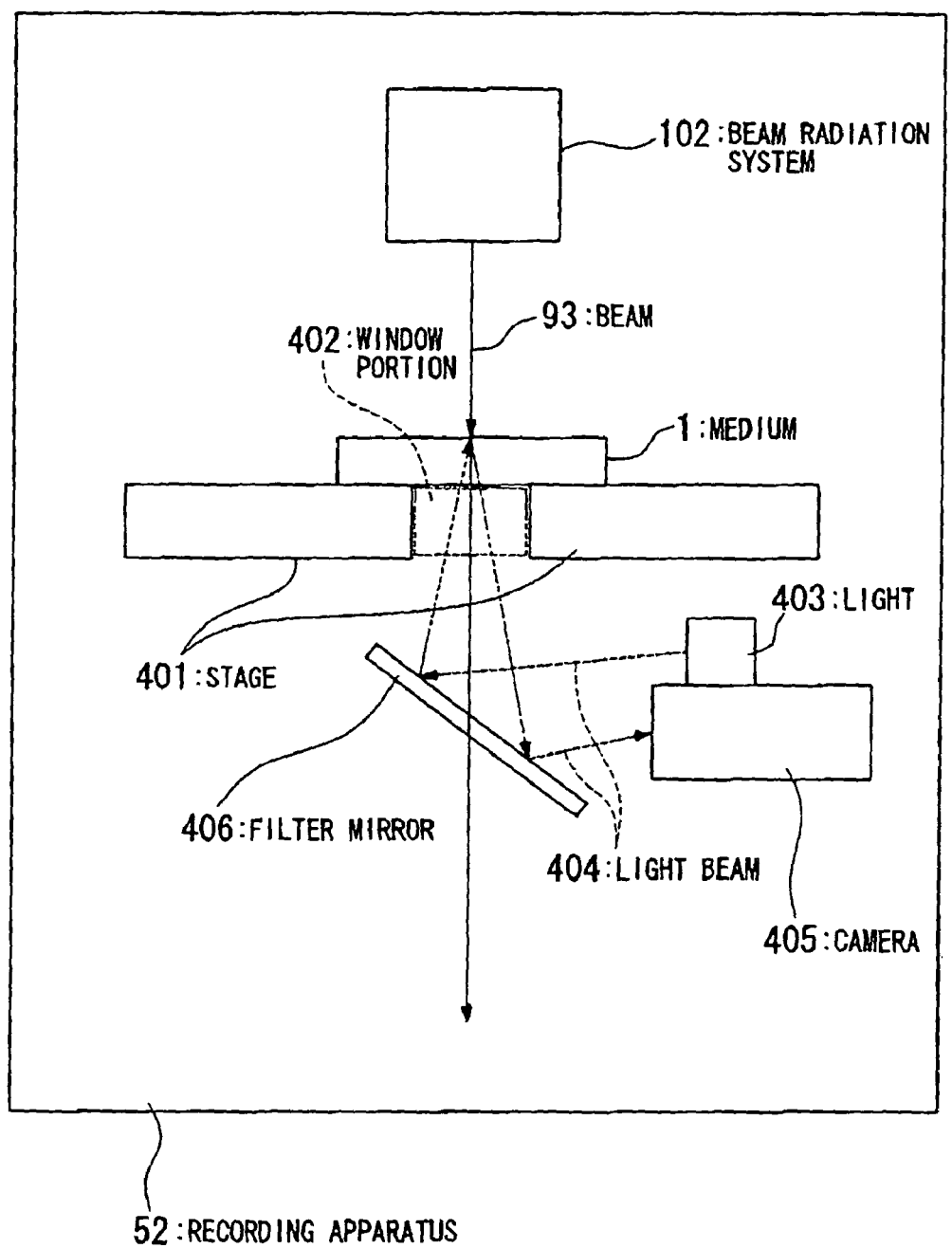
FIG. 12 is a figure for explaining a production method of a laminated holographic medium of an embodiment of the present invention

FIG. 12 shows another construction example of the recording apparatus. In this figure, the beam radiation system 102 (or the electron beam radiation system), for example, has a function of radiating the beam 93 and has a function of moving vertically (along with the optical axis of the beam) and scanning with the beam or the radiation system itself in one dimension or two dimension on the inside surface of the medium 1.

A stage 401 has a function of mounting the medium 1 stably and a stage portion close to the medium 1 has an aperture or has a window portion 402 made from a transmittance material.

A filter mirror 406 has a function of transmitting the beam 93 (the electron beam) and reflecting a light beam 404 from the light 403, and is, for example, set under the stage 401 having an angle of 45 degree with respect to the optical axis of the beam 93.

The light 403 has a function of radiating the light beam 404 and is set so as to have the light beam 404 goes into a camera 405 after being reflected by the filter mirror 406, reflected by the processing surface of the medium 1, and reflected by the filter mirror 406 again. The camera 405 is set at a position where the light beam 404 from the light 403 comes into and has a function of observing the processing surface of the medium 1 by the light beam 404.

For example, when a YAG (Nd doped, YVO4) laser as the beam, the wavelength is substantially 1,064 nm, and the light beam has the wavelength 100·600 nm, that is the visible light, therefore, it is possible to realize the embodiment above (FIG. 12) by applying the filter mirror having a characteristic of transmitting the light with the wavelength larger than several hundred nm and reflecting the light less than it.

In accordance with this embodiment, it is possible to observe the processing spot of the medium 1 on the optical axis, by feeding back the observation results to the beam radiation system or a control mechanism of the stage 401, it is possible to control the spot form and the spot position.

In the prior art, an observation method of the processing surface having a camera set at a diagonally upper position close from the processing surface has a problem that it is difficult to observe the spot position accurately because it is observed from the upper side.

In another method of the prior art, on the incoming side of the beam, by using a half mirror or the polarized beam splitter, the reflection beam from the processing surface is traced in an opposite direction against the incident direction of the beam and is observed by a camera. In accordance with this method, the camera can be set on the optical axis, therefore, the spot form and the position can be observed and can be operated accurately, however, the half mirror and the polarized beam splitter should be set on the optical path before the beam reaches to the medium, therefore, the beam is absorbed or reflected by the half mirror and the polarized beam splitter (in normal cases, less than half) and there is a problem that only a part of the optical power can be used for processing.

Comparing to these prior arts, in this embodiment, the camera 93 is provided on the optical axis, therefore, the spot form and the position can be observed and controlled accurately, and an observation system (the camera, the half mirror, the polarized beam splitter and the like) is not inserted between the beam radiation system 102 and the medium 1 and is provided afterward the processing, therefore, there is an advantage in that the power of the beam is not reduced.

The core layer, the cladding layer, the gap layer and the like of the medium 1 are transparent, therefore, the medium 1 transmits the beam 93. The medium 1 transmits the light beam 404 too and it is possible to observe the processing surface.

<A Second Embodiment of the Reproduction Apparatus and a Reproduction Method>

The second embodiment of the reproduction apparatus reproduces the information data recorded on the medium of the third and the fourth embodiments, and is characterized by composed of, at least, an optical head having a function of radiating incident light into the medium and a photodetector having a function of detecting a reproduction beam outgoing from the medium.

The second embodiment of the reproduction method is a method for reproducing the information data recorded on the medium of the third and the fourth embodiment by using the reproduction apparatus above, and is characterized by radiating incident light from an optical head into the core layer adjacent to the diffraction grating layer for recording data, and reproducing the information data recorded on the recording layer by detecting and reproducing a reproduction beam outgoing from the diffraction grating layer for recording data as patterns of brightness/darkness at a position of a photodetector corresponding to presence of recording marks.

FIG. 9 shows a structure of a reproduction apparatus 6*a* (corresponding to the medium of the third embodiment). Basically it is same as the reproduction apparatus in FIG. 4. A case in which a diffracted light (reproduction beam 9) goes out of the diffraction grating layer for recording data 43 as a parallel beam from right overhead. When an incident light 8 is radiated from an optical head 6 into a core layer 2 adjacent to the diffraction grating layer for recording data, the incident light incoming into the core layer 2 is diffracted at the diffraction grating layer for recording data 43 and goes out as the reproduction beam 9 right overhead as a parallel beam. The recording mark 45 is formed on the recording layer by the recording apparatus above. In the recording layer 45, for example, the reproduction beam 9 is transmitted at a point where the recording mark 45 is there, and is not transmitted at a point where the recording mark 45 in not there.

Therefore, a photodetector 7 detects a pattern of brightness/darkness corresponding to presence of the recording mark 45 on the recording layer 42. For example, when the information data which is specific to a medium 1*b* is recorded corresponding to the presence of the recording mark 45, then it is possible to detect and reproduce it with the photodetector 7.

In general, the reproduction beam transmitted via the recording mark 45 has been spread and its resolving power is reduced, therefore, it is not appropriate for recording and reproducing a huge amount of data in this embodiment. However, in this embodiment, several hundreds bytes is enough as a storage capacity of the medium 1*b* at most for a time, therefore, it has an advantage.

It should be noted that if the photodetector 7 is much smaller comparing to the medium 1*b*, then it is possible to detect all spots of reproduction beam from the recording mark 45 by moving both of them relatively and it has an advantage to achieve a huge data capacity.

<A Third Embodiment of a Reproduction Apparatus and a Reproduction Method>

The reproduction apparatus of the third embodiment of the present invention is an apparatus for reproducing information data recorded on a medium having at least a diffraction grating layer for recording data and a core layer, and is characterized by including at least an optical head radiating incident light into the core layer set adjacent to the diffraction grating layer for recording data or binding a gap layer between them, and a photodetector detecting a reproduction beam outgoing from the diffraction grating layer for recording data.

It is characterized by including a reproduction optical system being set on an optical path of the reproduction beam outgoing from the medium before coming into the photodetector, and forming an image from the reproduction beam outgoing from the medium As the medium, for example, the medium of this embodiment of the present invention can be used.

The reproduction method of this embodiment of the present invention is a reproduction method reproduces information data recorded on a medium having at least a diffraction grating layer for recording data, a core layer, a recording layer and a recording mark, characterized by including at least radiating incident light from an optical head into the core layer set adjacent to the diffraction grating layer for recording data or binding a gap layer between them, and reproducing the information data recorded on the recording layer by detecting and reproducing a reproduction beam outgoing from the diffraction grating layer for recording data as patterns of brightness/darkness at a position of a photodetector corresponding to presence of recording marks.

As the medium, for example, the medium of this embodiment of the present invention can, be used. As the reproduction apparatus, for example, the reproduction apparatus of this embodiment of the present invention can be used.

Figure 13:
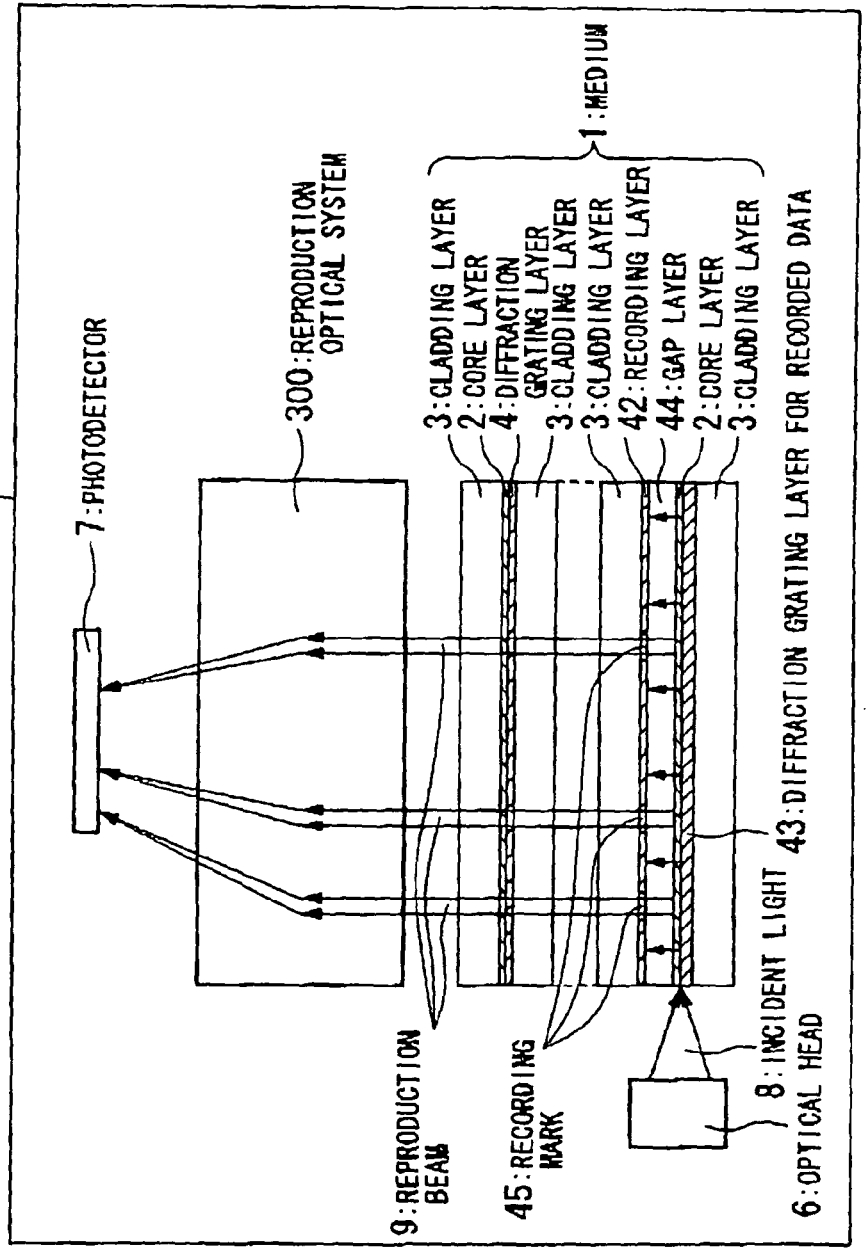
FIG. 13 is a figure showing structures of the medium and a recording apparatus therefore of an embodiment of the present invention.

FIG. 13 is a figure shows a structure of the reproduction apparatus of the embodiment of the present invention and a content of the reproduction method of the embodiment of the present invention. In this figure, a reproduction apparatus 5 is composed of an optical head 6 and a photodetector 7, and the optical head 6 has a function of radiating incident light into a desired core layer 2 of the medium 1.

Same as the prior arts, when the incident light is radiated into the desired core layer 2, it is possible to read the information data recorded on the diffraction grating layer 4 (as the holographic data).

There are methods for incidence of the incident light 8 to the core layer 2, such as a method of radiating from edge faces of the medium 1, a method of providing an optical connection portion at the core layer 2 and radiating from the upper side or the lower side of the medium 1, and a method of providing a mirror surface at each core layer 2 and radiating from the upper side or the lower side of the medium 1. These methods have the same effects. The method of radiating from the edge face of the medium 1 has an advantage in that it does not need to provide the optical connection portion, the mirror surface and the like at the medium 1.

The optical head 6 has a source for generating the incident light 8, and for example, various laser light sources can be applied to the source. The optical head 6 is, for example, constructed by combining a mirror leading the light, optical components such as the collimator, a condenser lens having a function of condensing (focusing) the incident light 8 at the core layer 2, an actuator having a function (mechanism, servo function, or the like) of radiating the incident light 8 at a desired position and angle of the core layer 2, and the like.

It is appropriate that the reproduction apparatus 5 of the embodiment of the present invention provides a photodetector for the servo if necessary.

The photodetector 7 has a function of detecting the reproduction beam 9 outgoing from the medium 1. It is appropriate that it has a mechanism for shifting. It should be noted that it is required to shift the photodetector 7 and the medium 1 relatively, therefore, it is appropriate to provide a mechanism for shifting the medium 1 side. For example, it is possible to use two dimensional photodetector like a CCD, a CMOS and so on, one dimensional photodetector such as a line sensor, a photodiode and the like.

The reproduction beam 9 goes out as two dimensional data, therefore, the one dimensional photodetector, preferably the two dimensional photodetector, has an advantage in that it can detect it in a shorter time.

It is appropriate that the reproduction apparatus 5 includes the reproduction optical system 300 on the optical path of the reproduction beam 9 outgoing from the medium 1 before going into the photodetector 9 if necessary. FIG. 13 shows a figure including the reproduction optical system 300 (the same effects can be obtained when the reproduction optical system 300 is not included).

The reproduction optical system 300 has a function of forming an image of the reproduction beam 9 outgoing from the diffraction grating layer 4 and the diffraction grating layer for recording data 43 on the photodetector 7. It is possible to construct the reproduction optical system 300 from, for example, various optical parts such as an aperture mask 302, a lens 301, a prism, a half mirror, a (polarized) beam splitter, a mirror, a polarizer, a liquid crystal device and the like and combinations of them.

The aperture mask is provided on the way of an optical path of the reproduction beam 9 outgoing from the medium 1 before it is accepted by the photodetector 7, and it has a function of separating and reproducing the reproduction beam 9 outgoing from each diffraction grating layer 4 if the multiplex information data is recorded on the diffraction grating layers 4. Using the aperture mask, it is possible to reproduce the information data of multiple screens of the photodetector 7 from one diffraction grating layer 4, therefore, it is possible to use the potential of the storage capacity of the medium 1 to the max without a limitation in accordance with a number of pixels of the photodetector 7.

In other words, there is an advantage in that it is possible to increase the storage capacity because the multiplex recording and the multiplex reproduction of the information data are possible.

There are aperture masks such that it is made from the liquid crystal device and can electrically change the position of aperture, or it has a fixed aperture and the mask is shifted. The prior one does not need a mechanical shifting, therefore, it is advantageous. It is appropriate that a number of the apertures being opened at a time is either one or more than one.

Hereafter, a reproduction operation of the reproduction apparatus of this embodiment is explained. When an incident light 8 is radiated from an optical head 6 into a core layer 2 adjacent to the diffraction grating layer for recording data, the incident light incoming into the core layer 2 is diffracted at the diffraction grating layer for recording data 43 and goes out as (in a case of FIG. 13) the reproduction beam 9 upward. The recording mark 45 is formed on the recording layer by the recording apparatus 52 and the recording method of the embodiment of the present invention. In the recording layer 45, for example, the reproduction beam 9 is transmitted at a point where the recording mark 45 is there, and is not transmitted at a point where the recording mark 45 in not there.

Therefore, a photodetector 7 detects a pattern of brightness/darkness corresponding to presence of the recording mark 45 on the recording layer 42. For example, when the information data which is specific to a medium 1 is recorded corresponding to the presence (number, position, form and the like) of the recording mark 45, then it is possible to detect and reproduce it with the photodetector 7.

A parallel beam as the reproduction beam 9 goes out from the diffraction grating layer for recording data 43, therefore, it is possible for the photodetector 7 to detect the pattern of the recording mark 45 formed on the recording layer 42 as it is (the presence and the position of the recording mark correspond to the brightness/darkness and the position on the photodetector with one to one relationship, and a relation of zooming is also one to one). The structure of the reproduction apparatus 7 becomes especially easier when the reproduction optical system 300 is not provided.

On the other hand, when the information data on the diffraction grating for the recorded data is formed as the holographic data beforehand so as to form the image on the photodetector 7 by the reproduction beam 9 (via the reproduction optical system if it is provided) transmitted via the recording mark 45, same as described above, it is possible that the photodetector 7 detects the pattern of the recording mark 45 formed on the recording layer 42.

In this case, generally, the reproduction beam is not a parallel beam and is a beam having various angles (it may have various phase and strength). In this case, there is an advantage in that the photodetector 7 can detect the pattern of the recording mark 45 without being effected from the presence, kind, characteristics and the like of the reproduction optical system 300.

The recording mark 45 is formed two-dimensionally on the recording layer 42 and works as the data for information.

A two dimensional pattern of the brightness/darkness corresponding to the information data of the recording layer is reproduced on the photodetector 7. When the reproduction beam 9 goes out from the diffraction grating layer for recording data 43 is a parallel beam, the size of the information data and the pattern of the brightness/darkness is (substantially) same, and the presence and the position of the recording mark correspond to the brightness/darkness and the position on the photodetector with one to one relationship. That is, A, B, C, . . . in FIG. 14 are reproduced as A', B', C', in FIG. 15 with one to one correspondence.

On the other hand, when the diffraction grating layer for recording data 43 is formed as the holographic data as described above, it is reproduced on the photodetector 7 in a same size, zoomed in or zoomed out. It is appropriate whether or not the presence and the position of the recording mark 45 on the recording layer 42 correspond to the brightness/darkness and its position on the photodetector 7 with one to one relationship.

In other words, it is appropriate that the recording data refractive grating 43 is formed so as that one dot of brightness/darkness on the photodetector 7 corresponds to one recording mark 45, multiple dots of brightness/darkness on the photodetector 7 correspond to one recording mark 45, one dot of brightness/darkness on the photodetector 7 corresponds to multiple recording marks 45, or multiple dots of brightness/darkness on the photodetector 7 correspond to multiple recording marks 45 respectively.

Figure 14:
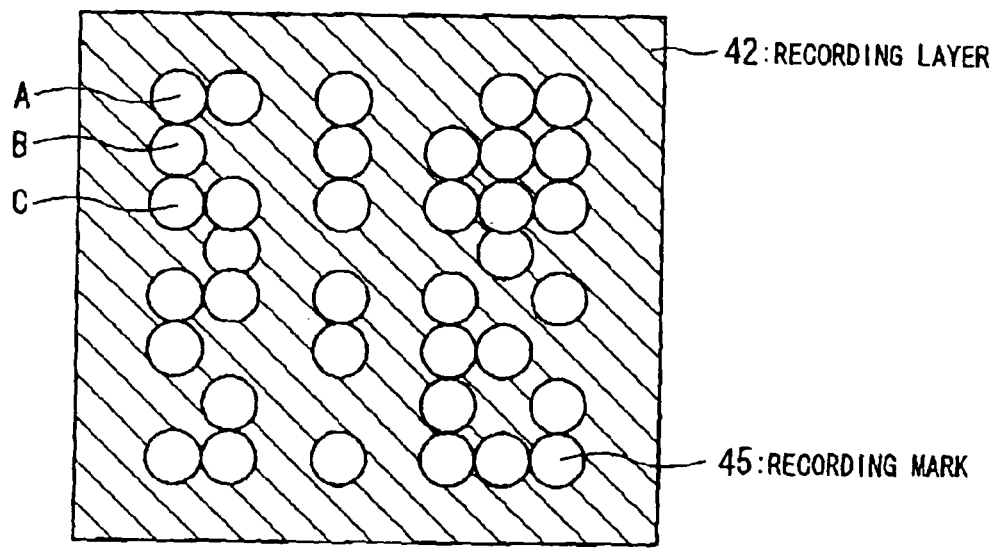
FIG. 14 is a figure showing structures of the medium and a recording apparatus therefore of an embodiment of the present invention.
Figure 15:
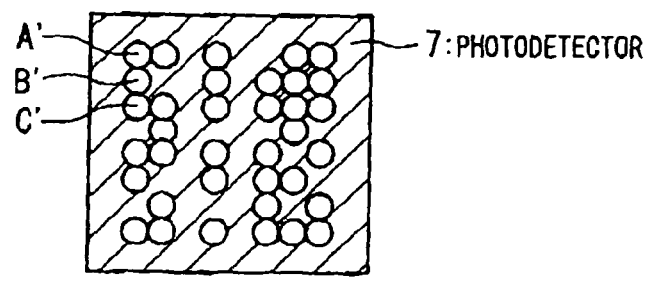
FIG. 15 is a side figure showing a structure of the laminated holographic medium of another embodiment of the present invention.
Figure 16:
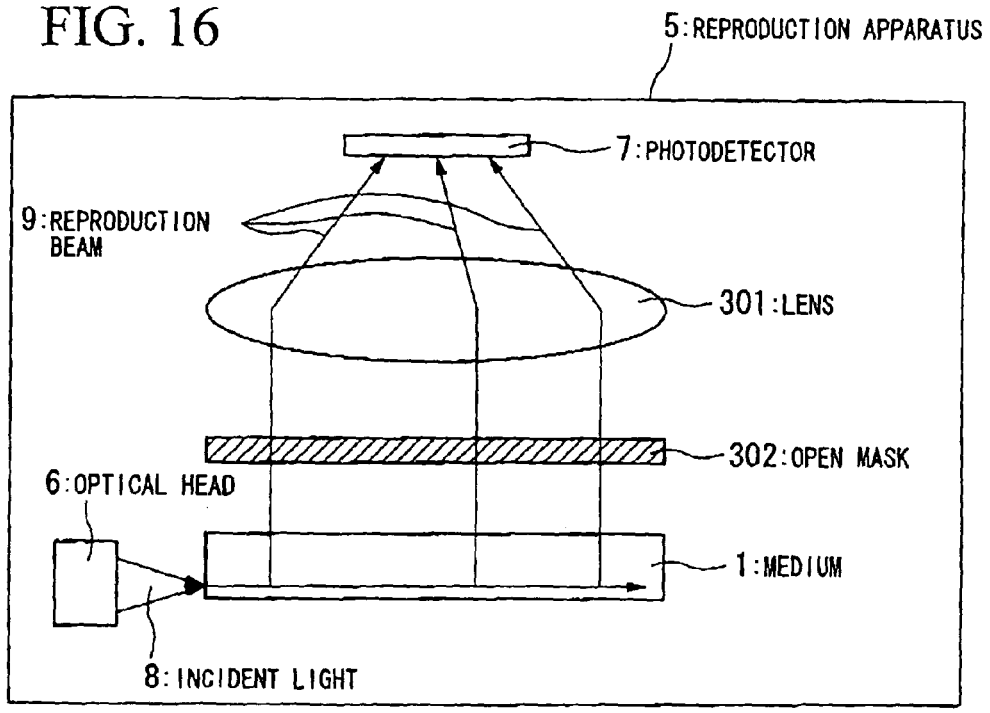
FIG. 16 is a side figure showing a structure of the laminated holographic medium of another embodiment of the present invention.

For example, when the holographic data of the diffraction grating layer for recording data 43 is formed so as that the reproduction beam outgoing from the A in FIG. 14 forms an image as A' in FIG. 16 and the reproduction beam outgoing from the B in FIG. 14 forms an image as B' in FIG. 15 (repeated in the same manner), it is possible that one recording mark 45 corresponds to one brightness/darkness dot on the photodetector 7.

FIG. 16 shows an example of construction in which the reproduction optical system 300 of the reproduction apparatus 6 in FIG. 13 composed of a lens 301 and an aperture mask 302. In this case, there is a possibility that apertures of the aperture mask 302 and a gap between the apertures shade the reproduction beam 9, however, it is possible to form the image of the reproduction beam 9 on the photodetector 7 without problems when the apertures are in open state and the recording mark 45 on the recording layer 42 is set in a manner of avoiding the gap between the apertures.

FIG. 16 is an example that the medium 1 (recording layer 42) has larger area than the photodetector 7, and the information data is reproduced by zooming out with the reproduction optical system 300. By applying the large recording layer 42, there is an advantage in that it is possible to record more information data. By applying the small recording layer 42, there is an advantage in that the reproduction apparatus becomes cheaper and smaller because the photodetector 7 becomes smaller.

By shifting the photodetector 7 and the reproduction optical system 300 relatively with respect to the medium 1 if necessary, the reproduction beam 9 (information data) outgoing from the medium 1 having a large recording surface can be reproduced easily and effectively by the photodetector 7, therefore, it is possible to increase the storage capacity (same for all embodiments).

Figure 17:
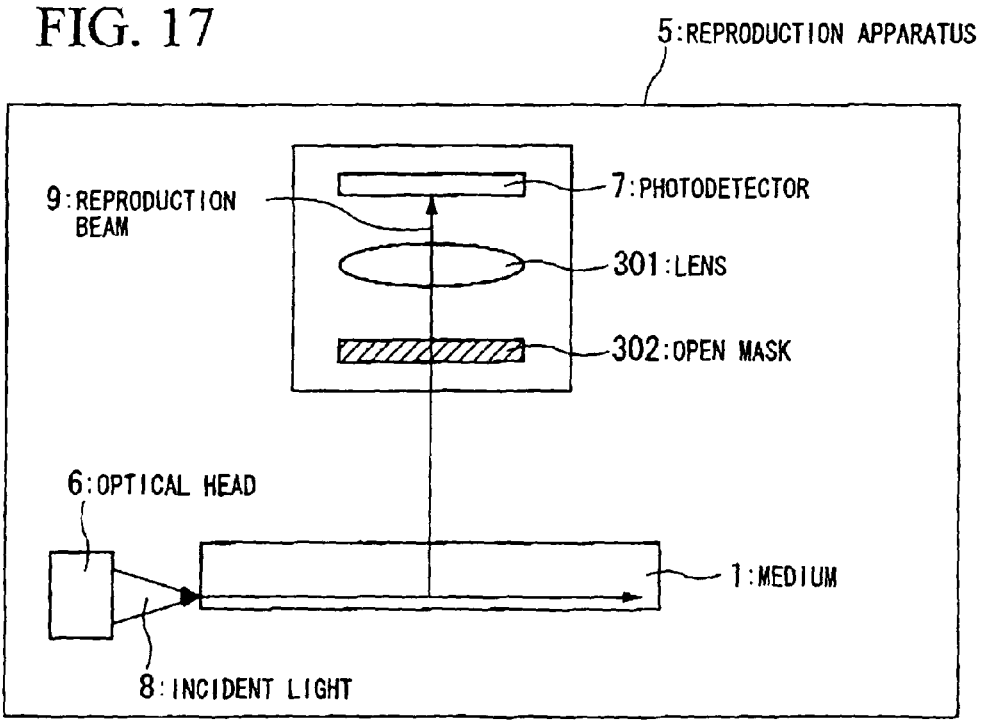
FIG. 17 is a figure showing structures of a medium and a reproduction apparatus therefore of an embodiment of the present invention.

FIG. 17 shows an example of construction in a case that the reproduction optical system 300 of the reproduction apparatus 5 in FIG. 13 (in this example, composed of a lens 301 and an aperture mask 302) is integrated with the photodetector 7. The reproduction operation is same as described above. When the number of the apertures of the aperture mask is small, for example 1, there may be a case that it is not possible for the photodetector 7 to reproduce all the information data as shown in FIG. 15.

In this case, one brightness/darkness dot is reproduced corresponding to one recording mark 45 at a center or around it of the photodetector 7, therefore, by shifting an integrated portion of the photodetector 7 and the reproduction optical system 300 in two dimensions (or one dimension) relatively (along with the surface of the medium 1) with respect to the medium 1, it is possible to reproduce all the brightness/darkness dots corresponding to all the recording marks 45.

This is an example of one brightness/darkness dot, however, in a case of multiple, if it is not possible to reproduce all the information data in one time, similarly, by shifting in two dimensions (or one dimension), it is possible to reproduce all the brightness/darkness dots corresponding to all the recording marks 45 (it is same for all the embodiments).

Figure 18:
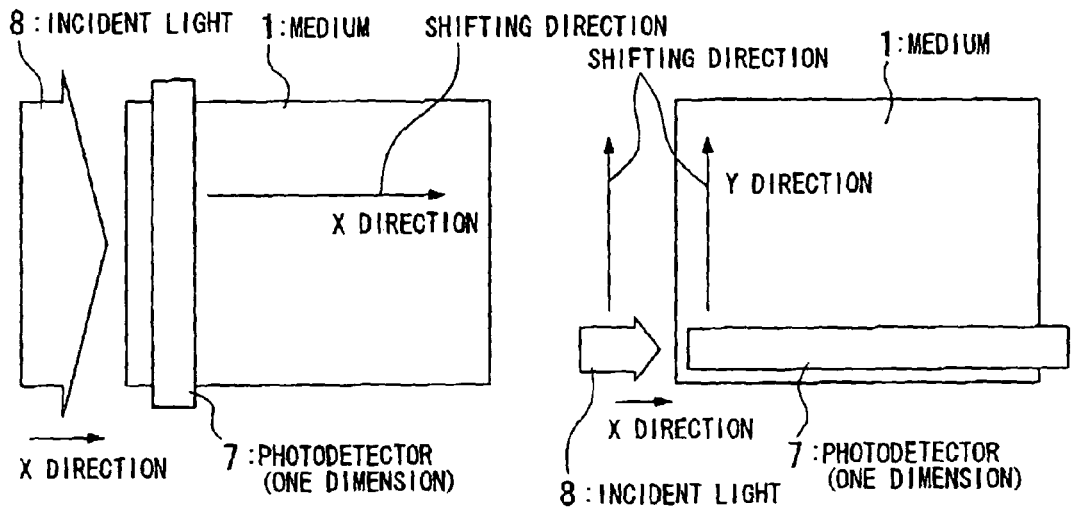
FIG. 18 is a figure of a concept for explaining reproduction operation applying a line sensor to a photodetector as a one-dimension sensor in a reproduction optical system in the figure.

For example, when a photodetector longer than the width of the medium 1 as the photodetector 7 for reproducing (such as a line sensor made from CCD), as shown in FIG. 18 which is a plane figure showing the reproduction apparatus 5 in FIG. 17 from its top, there is two operation methods for reproducing the recorded information data.

In accordance with an operation method of reproduction shown in FIG. 18(a), the incident light 8 is radiated into a predetermined core layer allover the width of the medium 1, the photodetector 7 is set to the medium 1 so as that the longer direction (y axis direction) of the photodetector 7 and the incident direction of the incident light 8 (x axis direction) cross orthogonally, the photodetector 7 is shifted together with the lens 301 and open/close positions of the aperture mask 302 in parallel with the incident direction of the incident light 8 (a direction from left to right or right to left in FIG. 18(a), that is along with x axis), open/close of the aperture mask 302 is operated and the information data included in the reproduction beam at the corresponding position is read.

In accordance with an operation method of reproduction shown in FIG. 18(b), the incident light 8 is radiated into a predetermined core layer with a width that the photodetector 7 can receive the reproduction beam including the information data from the medium 1, the photodetector 7 is set to the medium 1 so as that the longer direction (x-axis direction) of the photodetector 7 is in parallel with the incident direction of the incident light 8 (x axis direction), the photodetector 7 is shifted together with the incident light (that is, the optical head 6), the lens 301 and open/close positions of the aperture mask 302 perpendicularly (y axis direction) to the incident direction of the incident light 8 (from top to bottom (y axis direction) or bottom to top (y axis direction) in the figure), open/close of the aperture mask 302 is operated and the information data included in the reproduction beam at the corresponding position is read.

Figure 19:
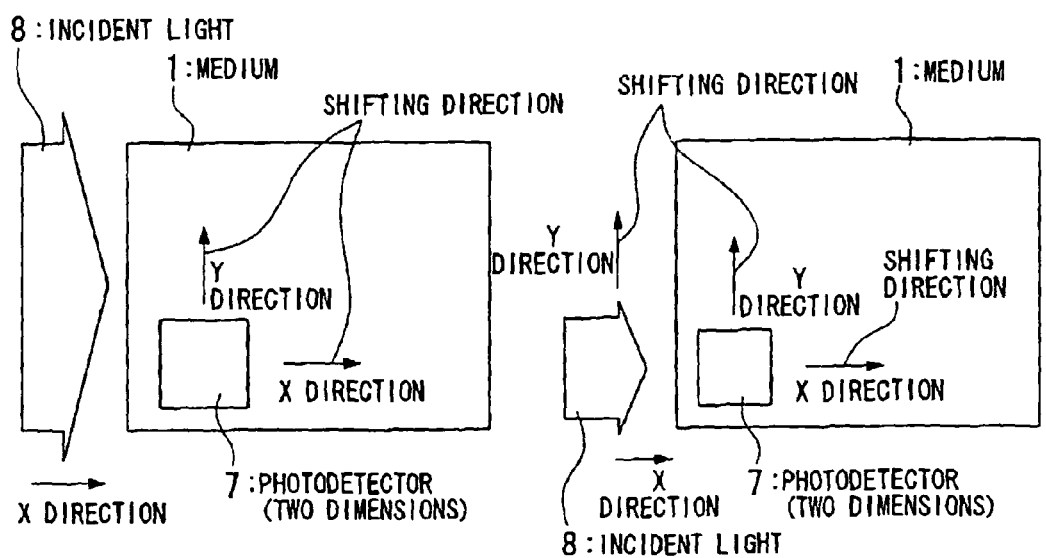
FIG. 19 is a figure of a concept for explaining reproduction operation applying an area sensor to a photodetector as a two-dimension sensor in a reproduction optical system in the figure.

When a two dimensional photodetector (such as an area sensor or an image sensor made from CCD) smaller than the surface of the media 1 as the photodetector 7 for reproducing, as shown in FIG. 19 which is a plane figure showing the reproduction apparatus 5 in FIG. 17 from its top, there is two operation methods for reproducing the recorded information data.

In accordance with the operating method shown in FIG. 19(a), the incident light 8 is radiated from the optical head 6 to a predetermined core layer (to x axis direction) overall the width of the media 1, the photodetector 7 is shifted up and down (y axis direction, vertically) and right and left (x axis direction, horizontally) together with the lens 301 and open/close positions of the aperture mask 302, open/close of the mask 302 is operated and the information data included in the reproduction beam at corresponding position is read.

In accordance with the operation method shown in FIG. 19(b), the incident light 8 having same width as the photodetector 7 goes out (a axis direction) from a predetermined core layer, the photodetector 7 is shifted up and down and right and left together with the lens 301 and open/close positions of the aperture mask 302 while shifting the incident position of the incident light 8 (that is the optical head 6) up and down corresponding to shifting of the photodetector 7 up and down (y axis direction), open/close of the mask 302 is operated and the information data included in the reproduction beam at corresponding position is read.

As described above, the reproduction apparatus of the present invention, using the one dimensional or two dimensional photodetector, by shifting the position of the photodetector relatively on one axis (up and down or right and left, vertically or horizontally) or on two axis (up and down and right and left, vertically and horizontally) one by one, the information data recorded on the recording layer is partially read, combining the partially read information data, and the information data written in the recording layer (for example, the reproduction data of the identification number) is detected.

It is appropriate that the one dimensional and the two dimensional photodetectors in FIG. 18 and FIG. 19 are combined in a constitution.

In stead of the one dimensional or two dimensional photodetector above, it is appropriate that the photodetector including one pixel sensor made from one device of an optical sensor device such as a CCD, a photodiode or the like is shifted on two axis (up and down and right and left, vertically and horizontally) one by one, the information data recorded on the recording layer is read per pixel by the photodetector, the read pixels are combined and the information data (for example, the reproduction data of the identification number) written in the recording layer is detected.

Figure 20:
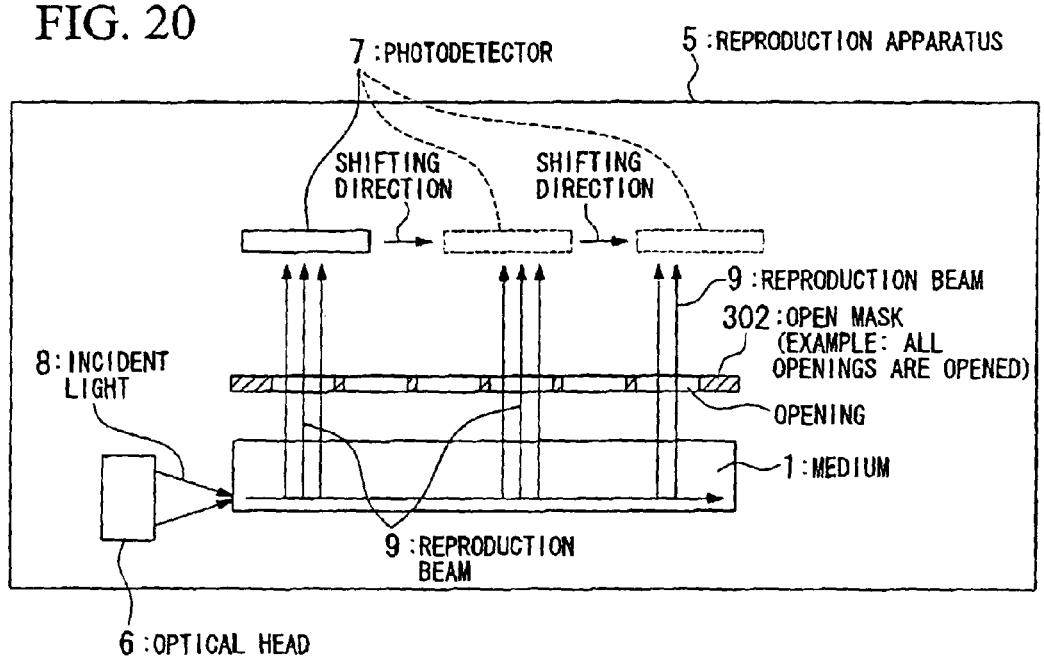
FIG. 20 is a figure of a concept for explaining operation of the reproduction apparatus detecting the reproduction beam from the medium in the present invention.
Figure 21:
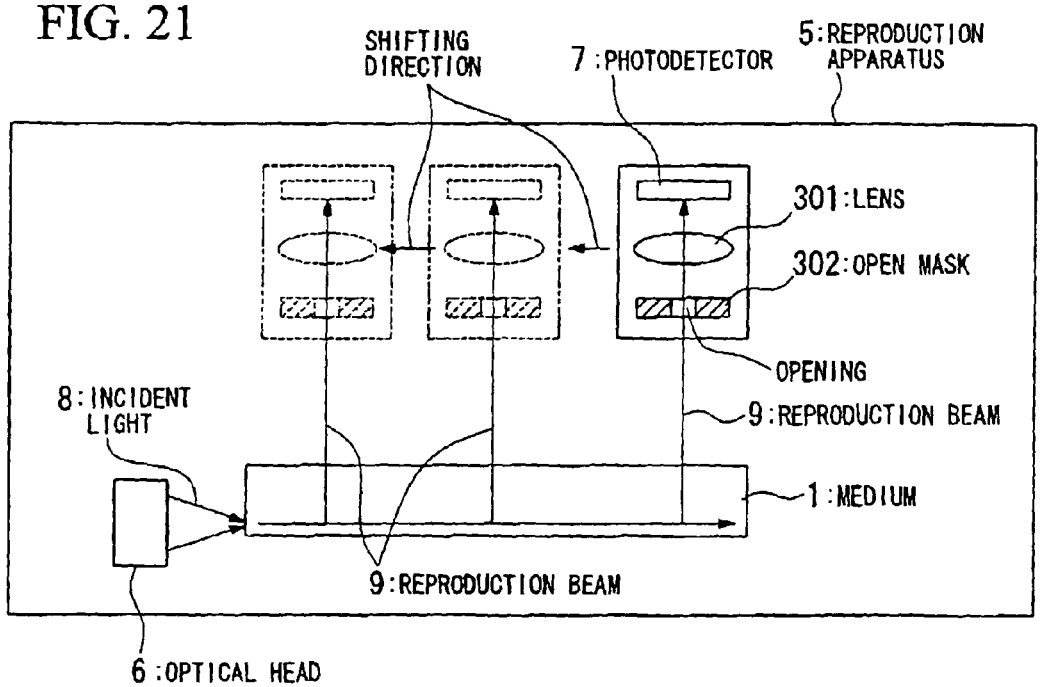
FIG. 21 is a figure of a concept for explaining operation of the reproduction apparatus detecting the reproduction beam from the medium in the present invention.

FIGS. 20 and 21 show an embodiment (figure of side face) in which the information data (the reproduction data of the identification number) recorded in the recording layer is read by shifting the photodetector 7 along with one or two axis on the reading face of the medium 1.

For example, in FIG. 20, an aperture mask 302 is used as the reproduction optical system, and this is an example that all apertures of the aperture mask 302 are in open status.

In FIG. 21, by shifting the photodetector 7 to the right/left, it is possible to catch the reproduction beam of the information data (ID reproduction data) outgoing from the medium 1 in return of the incident light 8.

As shown in FIG. 20, it is not necessary to keep the apertures of the aperture mask 302 open in any time, it is appropriate to keep the apertures corresponding to the shifting position of the photodetector 7 open so that it can be operated that the reproduction beam can be detected by the photodetector 7. It does not regard whether or not other apertures having no correspondence to the position of the photodetector 7 are closed at this timing.

FIG. 21 shows an example of applying the aperture mask 302 and a lens to the reproduction optical system.

A case is shown where a number of the apertures of the aperture mask 302 is 1 and an apparatus is constituted to integrate the photodetector 7, a lens 031 and the aperture mask 302. Therefore, it is possible to produce the reproduction optical system.

In this reproduction apparatus, by shifting the reproduction optical system constituted from the photodetector 7, the lens 301 and the aperture mask 302 to the right/left (x axis direction) in FIG. 21, it is possible to catch the reproduction beam of the information data (ID reproduction data) outgoing from the medium 1 in return of the incident light 8.

FIGS. 14 and 15 show an example in which the pattern of the recording mark 45 of the recording layer 42 is same as or zooming in/out of (a similar figure) the pattern of the brightness/darkness dots. In the present invention when the presence and the position of the recording mark 45 on the recording layer 42 correspond to the presence and the position of the light on the photodetector 7, it does not regard whether or not it is a one to one correspondence as shown in FIGS. 6 and 7.

Figure 22:
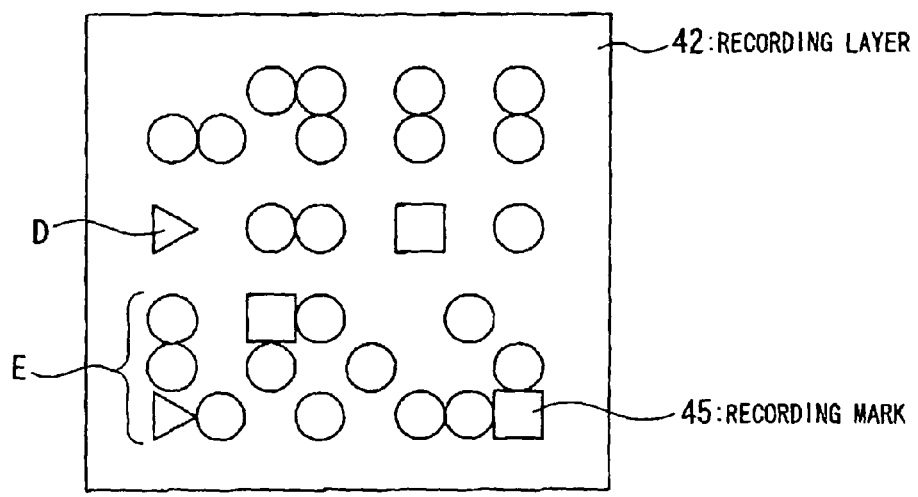
FIG. 22 is a figure showing a recording layer of one embodiment of the present invention.
Figure 23:
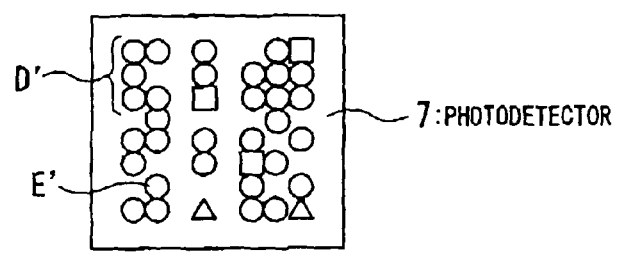
FIG. 23 is a figure showing the photodetector of one embodiment of the present invention.

FIGS. 22 and 23 show an example in which they are not corresponding in one to one relationship. For example, D in FIG. 22 and D' is FIG. 23, D is one Δ, however, corresponding D' is three ○. With respect to E FIG. 22 E' in FIG. 23, E is two ○ and one Δ, however, in this example, corresponding E' is one ○.

As shown in these figure, it is not necessary that the numbers, the forms (○,○,Δ and the like) and the positions of the pattern of the recording mark 45 and the pattern of the brightness/darkness dots on the photodetector 7 are corresponding in one to one relationship. By operating the number, the forms (○,○,Δ and the like) and the positions of the pattern of the brightness/darkness dots on the photodetector 7 in accordance with the pattern of the recording mark 45, it is possible to obtain the same effects as the case of FIGS. 14 and 15 even in such a case.

Figure 24:
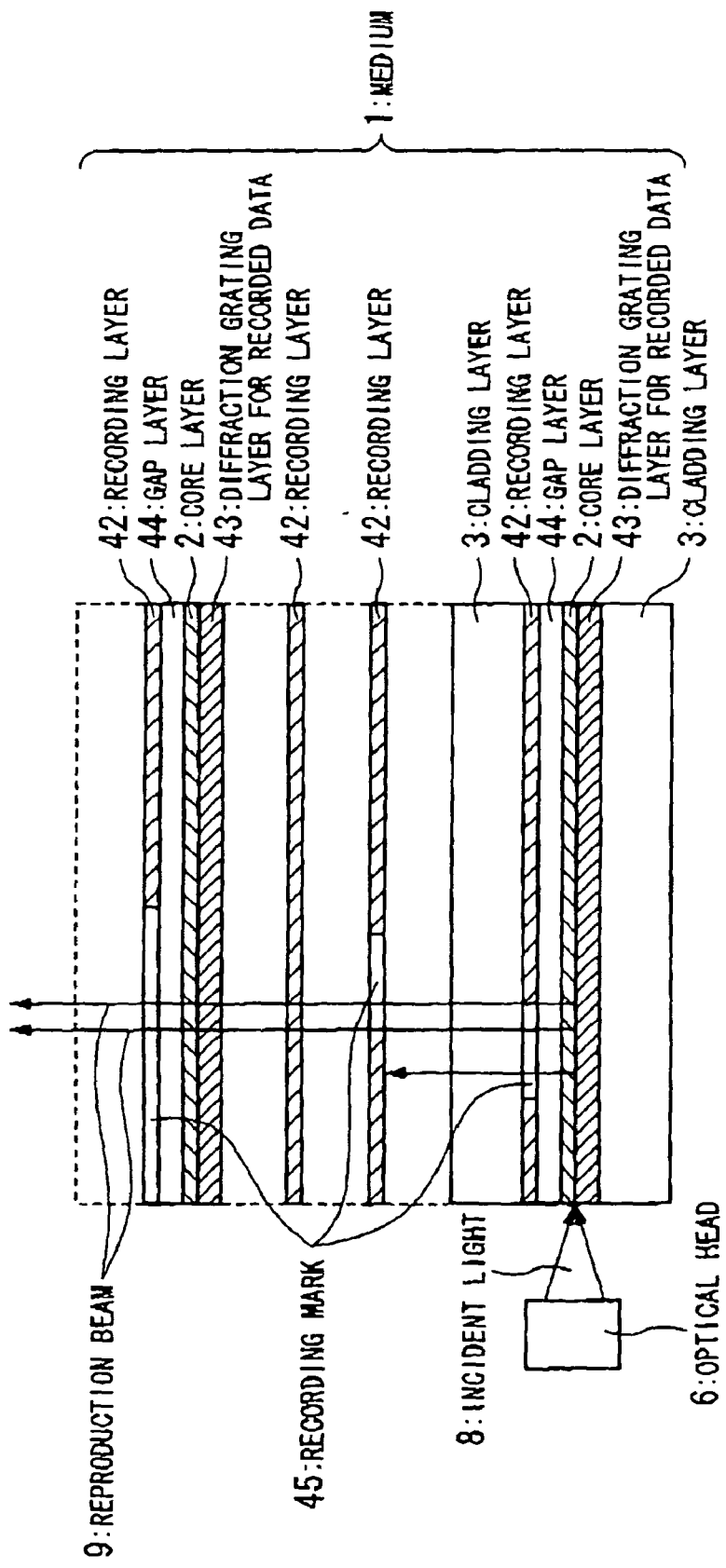
FIG. 24 is a figure showing the medium of one embodiment of the present invention.

FIG. 24 shows a constitute of the medium 1 of the third embodiment of the present invention and a constitute of the medium 1 having multiple recording layers 42 and diffraction grating layers for recording data 43. It is omitted in FIG. 12, however, among the recording layers 42, the diffraction grating layers for recording data 43 and the like, it is appropriate that multiple recording layers 42, diffraction grating layers for recording data 43, core layers 2, cladding layers 3, diffraction grating layers 4, gap layers 44, protection layers and the like are provided.

The same effects can be obtained even when multiple recording layers and/or diffraction grating layers for recording data 43. For example, when the position of the recording mark 45 is shifted a little and formed in a manner such as the recording layer 42 at the bottom and the second from the bottom in FIG. 24, it is possible that only the overlapping portion of both of them works as the recording mark 45 practically and there is an advantage in that it is possible to form accurately and finely while avoiding limitations on the size of the recording mark 45 because of a recording accuracy or a resolution of recording of the beam radiation system 102, the electron beam radiation system 103 and the like of the recording apparatus 52.

It is appropriate that all (the second recording layer 42 from the top the figure) or a portion (the recording layer 42 at the top in the figure) of the recording layer 42 has transmittance (or is non-transmittance).

When multiple recording layers 42 and/or the diffraction grating layers for recording data 43 are provided, even if one of the recording layers 42 includes a recording error, it is possible to record in the other recording layer therefore there is an advantage to develop an available percentage.

There is an advantage in that it is effective because it is possible to provide one common medium 1 (or part of this) available for various reproduction optical systems 300 (and reproduction apparatus 5) by providing various diffraction grating layers 43 for recorded data in the medium 1 (or part of it) adaptable for multiple reproduction optical systems 300 (and reproduction apparatus 5).

When the multiple diffraction grating layers for recording data 43 are provided, it is possible to provide multiple correspondence relationship between the pattern of the recording mark 45 and the pattern of the brightness/darkness dots on the photodetector 7 and more variation of recording and/or reproducing the data for information is can be obtained, therefore, there are advantages such that more amount and variety of information data can be obtained and it is possible to improve the security when they are applied to the information data specific to the medium.

Numbers of compositional elements, such as the optical components or the electromechanical components, of the recording apparatus 52 and the reproduction apparatus 5 described in this document can be one or more than one, and the same effects can be obtained.

It is appropriate that as the compositional elements of the recording apparatus 52 and the reproduction apparatus 5, such as a medium loading aperture that is an aperture for loading the medium 1, a medium loading space that is a space for loading the medium 1, a medium loading table having a function of fixing, loading, holding and ejecting the medium 1 are provided. They have an advantage in that it is easy and stable to load the medium 1. There is a compositional element of the recording apparatus 52 and the reproduction apparatus 5 such as a logic/control circuit.

The logic/control circuit is a circuit having functions of operating digital signals and operating activation of an active devices such as the light source, the beam radiation system, the photodetector, the liquid crystal device, various mechanisms of driving and the like explained in this specification.

The recording apparatus 52 and the reproduction apparatus 5 shown in this document are just typical embodiments in the present invention, and by changing position of the compositional elements, combining the embodiments or mixing the embodiments, the same advantages can be obtained and they are involved in the scope of the present invention.

Moreover, the same effects can be obtained not only when the reproduction apparatus is constituted in one body, but also constituted in two or more bodies by separating a portion including the optical head 6 and a portion including the photodetector 7.

When the pattern of the recording mark 45 recorded on the recording layer 42 is same, it is possible to reproduce the different information data by forming different data on the diffraction grating layer for recording data 43.

Therefore, it is possible to improve the security because it becomes difficult to find a correspondence between a visually recognized pattern of the information data of the recording mark 42 and the reproduced information data.

There is an advantage in that it is possible to record and reproduce various information in accordance with combinations of the data formed on the diffraction grating layer for recording data 43 and the pattern of the recording mark 45 recorded on the recording layer 42.

As shown above, with respect to the medium (laminated holographic medium) using the laminated hologram ROM, it is possible to record the information data to each medium, and it is possible to reproduce the recorded information data by using the reproduction apparatus for the laminated hologram ROM.

<Fifth-Twelfth Embodiments>

Figure 25:
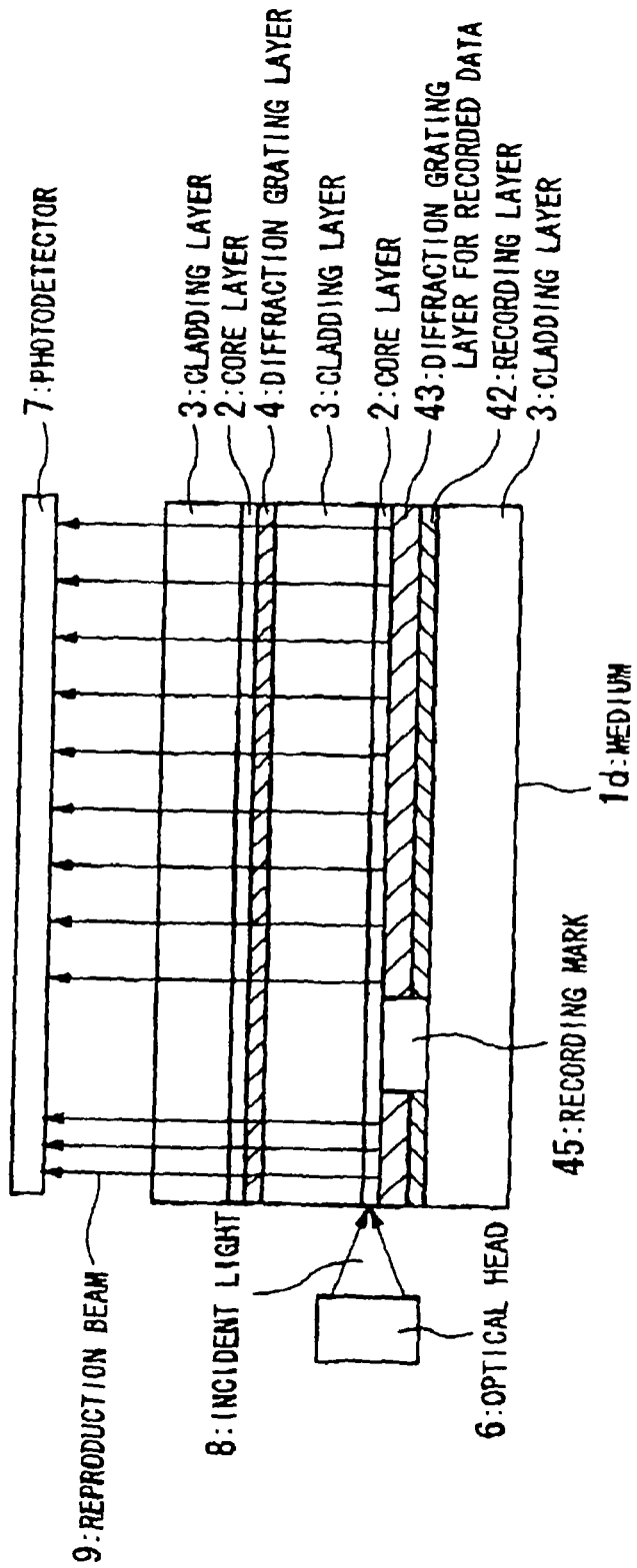

FIG. 25 is a side face of the medium of the fifth embodiment. This medium 1*d* has basically the same structure, characteristic and function as the medium 2*b* and 1*c* shown in FIGS. 7 and 8.

The core layer 2, the diffraction grating layer for recording data 43 and the recording layer 42 are adjacently set from a position close to an incident side (side of the photodetector 7) of the reproduction beam 9. Same as FIGS. 7 and 8, the recording mark 45 is formed on the recording layer 42 by the light or the electron beam.

It should be noted that in this embodiment, while the recording mark 45 is formed on the recording layer 42, the adjacent diffraction grating layer for recording data 43 is affected (form, changes of refractive index, removing), therefore, as a result, the reproduction beam 9 does not outgo from the diffraction grating layer for recording data 43 adjacent to the formed recording mark 45.

Upon reproducing, the brightness/darkness pattern of the reproduction beam 9 is detected by the photodetector 7 corresponding to the presence of the recording mark 45, therefore, it is possible to detect and reproduce the information data recorded on the recording layer 42.

Figure 26:
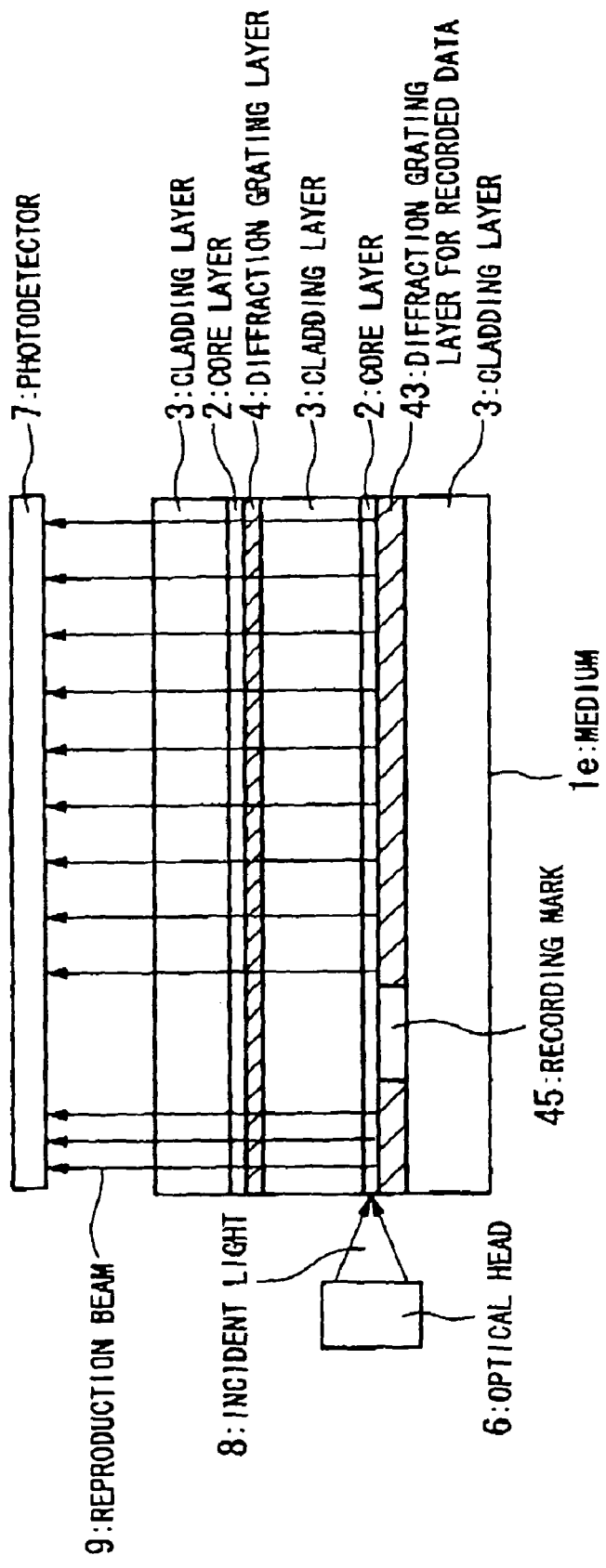
FIG. 26 is a side figure showing a structure of the laminated holographic medium of a fifth embodiment of the present invention.

FIG. 26 is a side face of the medium of the sixth embodiment. This medium 1*e* has basically the same structure, characteristic and function as the medium 2*b* and 1*c* shown in FIGS. 7 and 8. The core layer 2 and, the diffraction grating layer for recording data 43 are adjacently set from a position close to an incident aide (side of the photodetector 7) of the reproduction beam 9, and the diffraction grating layer for recording data 43 as the recording layer 42 too. Same as FIGS. 7 and 8, the recording mark 45 is formed on the diffraction grating layer for recording data 43 (the recording layer 42) by the light or the electron beam. The recording mark 45 (form, changes of refractive index, removing) is formed on the diffraction grating layer for recording data 43 (the recording layer 42), and the reproduction beam 9 does not outgo from the diffraction grating layer for recording data 43 (the recording layer 42) on which the recording mark 45 is formed.

Upon reproducing, the brightness/darkness pattern of the reproduction beam 9 is detected by the photodetector 7 corresponding to the presence of the recording mark 45, therefore, it is possible to detect and reproduce the information data recorded on the diffraction grating layer for recording data 43 (the recording layer 42).

Figure 27:
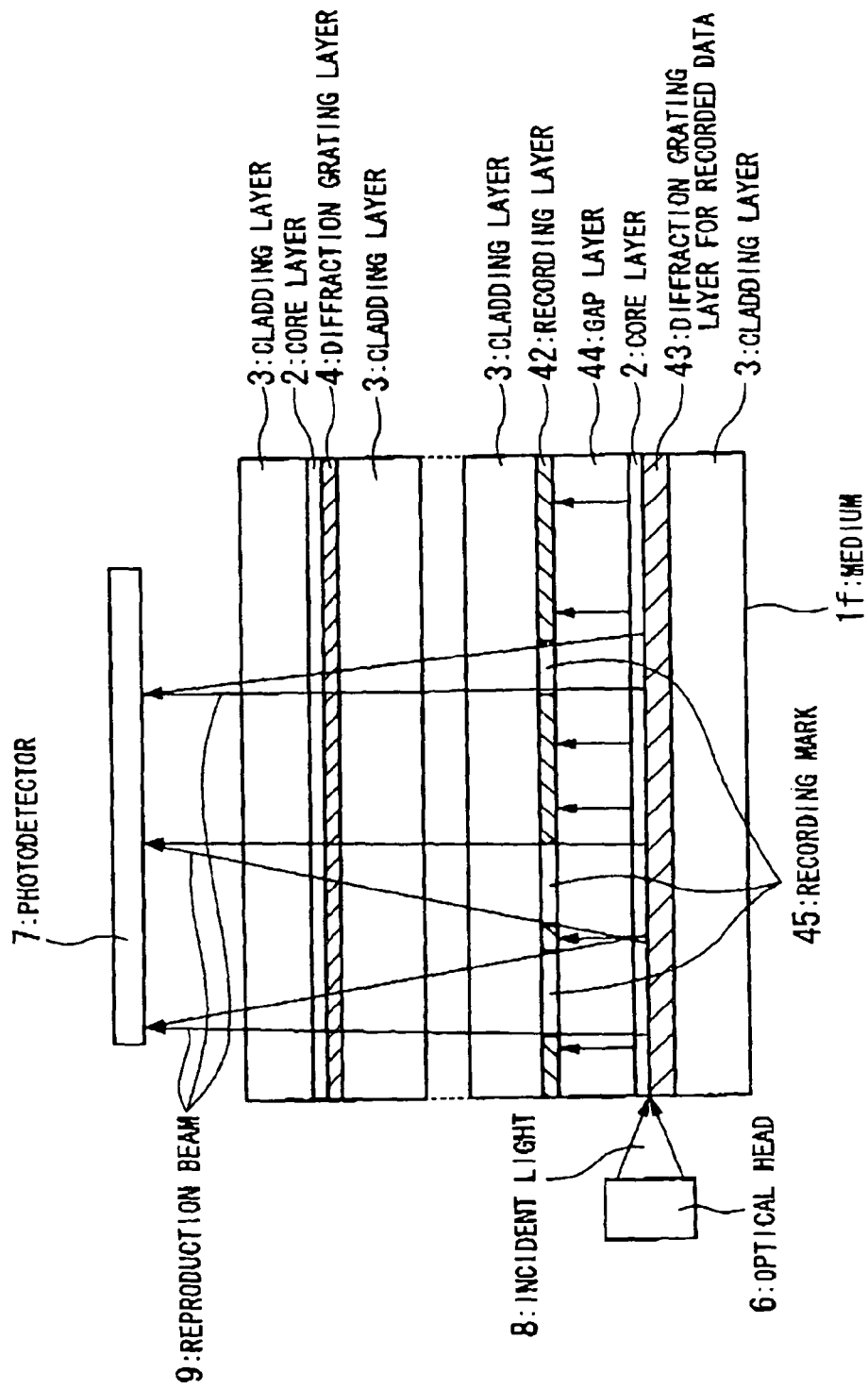
FIG. 27 is a side figure showing a structure of the laminated holographic medium of a seventh embodiment of the present invention.

FIG. 27 is a side face of the medium of the seventh embodiment, and this medium 1*f* is basically the same as FIGS. 7 and 8. The same effects can be obtained as shown in FIGS. 25 and 26.

In this embodiment, the diffraction gratings are produced as the holographic data beforehand in the diffraction grating layer for recording data 43 so that the dots of brightness/darkness forms on the photodetector 7. On the recording layer 42, in a portion without the recording mark 45, the reproduction beam 9 from the diffraction grating layer for recording data 43 is shaded by the recording layer 42 and cannot reach to the photodetector 7.

On the other hand, after the recording mark 45 is formed, the reproduction beam 9 reaches to the photodetector 7 and is detected and reproduced by the photodetector 7 as the dots of the brightness/darkness. In such manner, the presence of the recording mark 45 on the recording layer 42 corresponds to the brightness/darkness dots on the photodetector 7, and it is possible that the photodetector 7 detects and reproduces the information data recorded on the recording layer 42. In this embodiment, the brightness/darkness on the photodetector 7 can be the fine brightness/darkness dots having higher resolution, therefore, an advantage such as having larger storage capacity can be obtained (transmittal/non-transmittal can be reverted, this is same for other embodiments).

Figure 28:
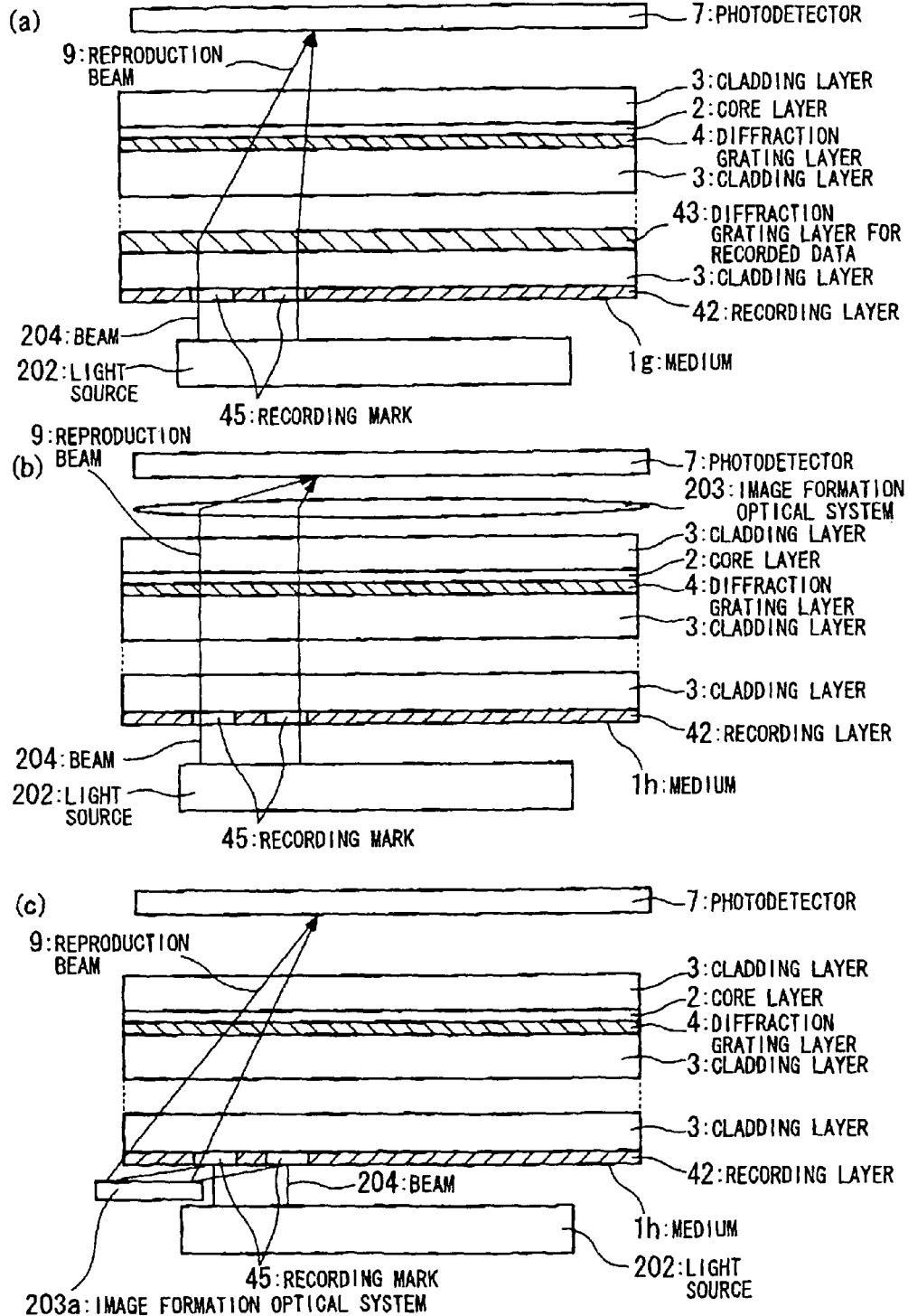
FIG. 28 is a side figure showing a structure of the laminated holographic medium and a structure of the reproduction apparatus of eighth and ninth embodiments in the present invention.

FIG. 28(*a*) is a side face showing a constitution of a medium of the eighth embodiment of the present invention and its reproduction apparatus. This medium 1*g* is basically same as the other embodiments described in this document. With respect to this medium 1*g*, the recording mark 45 recorded on the recording layer 42 is formed in a real image on the photodetector 7 by using a beam 204 from a light source 202 separately provided to the reproduction apparatus, and is detected and reproduced.

The diffraction grating layer for recording data 43 works as an image formation optical system such as an image formation lens or a concave mirror. This diffraction grating layer for recording data 43 can be obtained by designing as, for example a hologram optical device. The diffraction grating layer for recording data 43, when it works as the image formation lens, is set between the recording layer 42 and the photodetector 7, and when it works as the concave mirror, the recording layer 42 is set between the diffraction grating layer for recording data 43 and the photodetector 7.

FIG. 28(*b*) is a side face showing a constitution of a medium of the ninth embodiment of the present invention and its reproduction apparatus. Comparing to the medium 1*g* above, this medium 1*h* is different because the diffraction grating layer for recording data 43 is not provided. With respect to this medium 1*h*, the recording mark 45 formed on the recording layer 42 according to the same theory in FIG. 28(*a*) is formed as a real image on the photodetector 7 and is detected and reproduced, and is formed in the image by using the image formation optical system 203 (such as an image formation separately provided to the reproduction apparatus. In this case, the image formation optical system 203 is set between the medium 1*h* and the photodetector 7.

FIG. 28(*c*) shows another embodiment of the reproduction apparatus for the medium 1*h* of FIG. 28(*b*). In this embodiment, as the image formation optical system 203*a*, a function of, for example, the concave mirror is applied. In this case, the constitution is such that the medium 1*h* is set between the image formation optical system 203*a* and the photodetector 7. In this embodiment, the photodetector 7 can detect and reproduce the real image of the recording mark 45.

As the image formation optical system 203*a*, not only a concave mirror or an image formation lens, but also an optical component that is a photodetector having the above described function of forming the real image by providing an image formation reflection lens, an image formation pin-hall or the like, can be applied.

FIG. 29(a) is a side face of a constitution of a medium of the tenth embodiment of the present invention and its reproduction apparatus. This medium 1i is basically the same as the other mediums as described in this document. The diffraction gratings are formed in the diffraction grating layer for recording data 43 such that the incident light, for example in this figure, comes into directly above (and/or downright) and in parallel.

When the recording mark 45 is formed, the incident light goes out directly above and downright in the same time. A reflection layer 206 is provided under the recording layer 42 and when the reproduction beam 9 goes out downright, it is reflected and goes out directly above and comes into the photodetector 7 finally. The reproduction beam 9 from downright is added to upward where the recording mark 45 is present, on the other hand, only the reproduction beam 9 upward goes out where the recording mark 45 is not present, therefore, it is brighter where the recording mark 45 is present. That is, it is possible to detect and reproduce the presence of the recording mark 45 in accordance with the brightness/darkness of the reproduction beam 9.

FIG. 29(b) is a side face of a constitution of a medium of the eleventh embodiment of the present invention and its reproduction apparatus. In this medium 1j, the reflection layer 206 in FIG. 29(a) is separated from the medium 1i and it is provided as a reflection portion 207 at the reproduction apparatus. The theory is the same as in FIG. 29(a) and the same effects can be obtained.

There are production methods of producing the mediums above (the mediums of the fifth-eleventh embodiments).

(1) A method of recording on the recording layer 42 after producing the medium including the recording layer 42 as one body.

Figure 30:
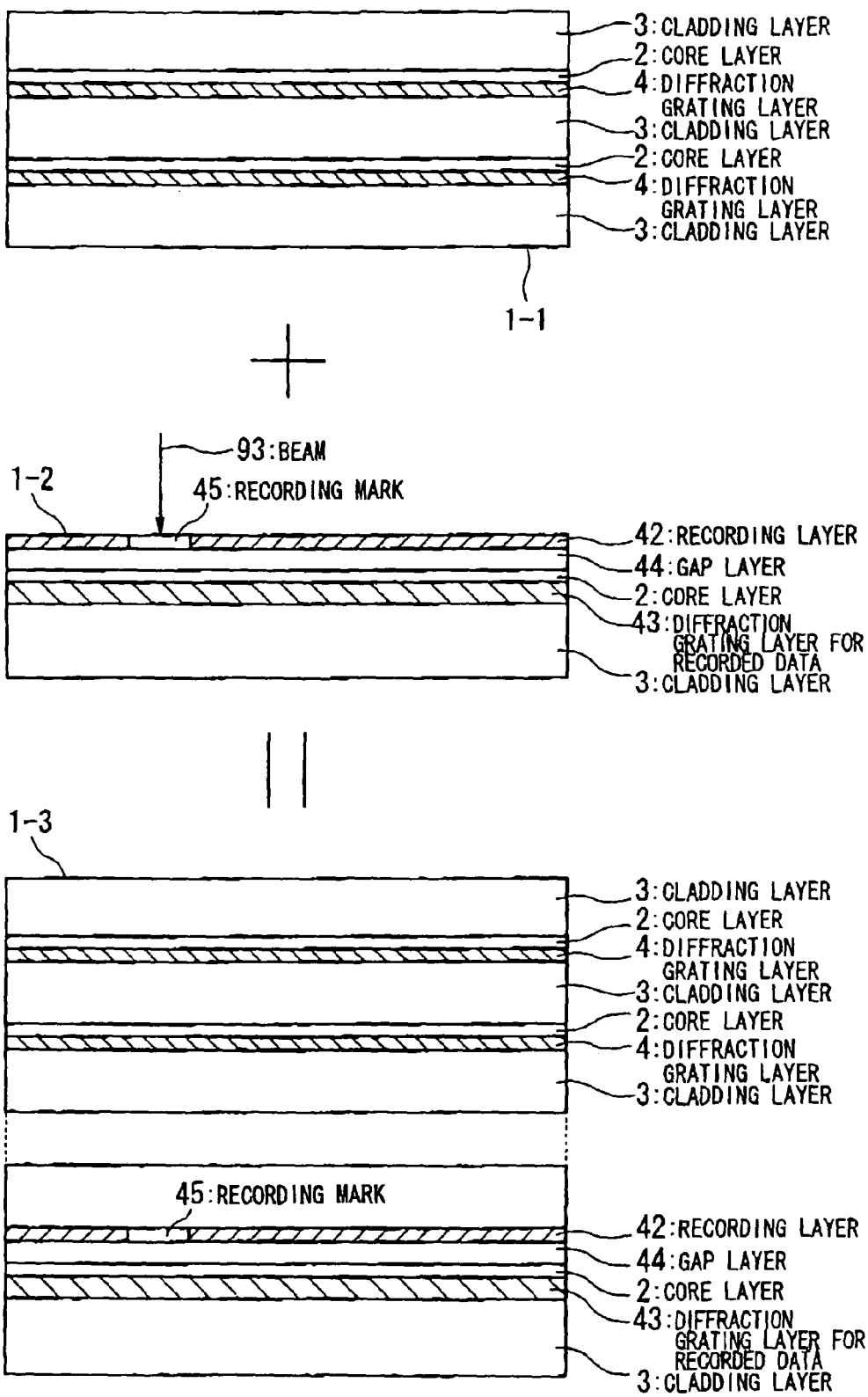
FIG. 30 is a figure for explaining a production method of the laminated holographic medium of an embodiment of the present invention

(2) A method of, as shown in FIG. 30, producing two bodies both a portion 1-1 excluding the recording layer 42 and a portion 1-2 including the recording layer 42, and producing a medium 1-3 in one body by adhering the portion 1-1 excluding the recording layer 42 to the portion 1-2 including the recording layer 42 after recording upon the portion 1-2 including the recording layer 42.

(3) A method of producing a portion 1-2 including the recording layer 42 and producing additionally a portion 1-1 excluding the recording layer 42 after recording on the recording layer 42. When a hole is generated on the recording layer 42, it is easier when the recording layer 42 is exposed and it is better to produce in two bodies as described above.

In other words, when applying the production methods of the mediums, that is a method of forming two bodies, by using the exposed recording layer, recording the information data on the medium and after that adhering other layer (being recorded or storing information of the contents) formed independently, it is possible to improve the freedom of selecting materials and the production methods of the recording layer 42, to prevent changing of forms of the medium after forming, and to reduce-errors of reading recorded data.

With respect to the medium 1, there are an using method in its own form, an using method in a case such as a package or a cartridge, an using method in its own form adhering an label 200 (FIG. 6) on one side (from which the reproduction beam does not outgo) and so on.

Figure 31:
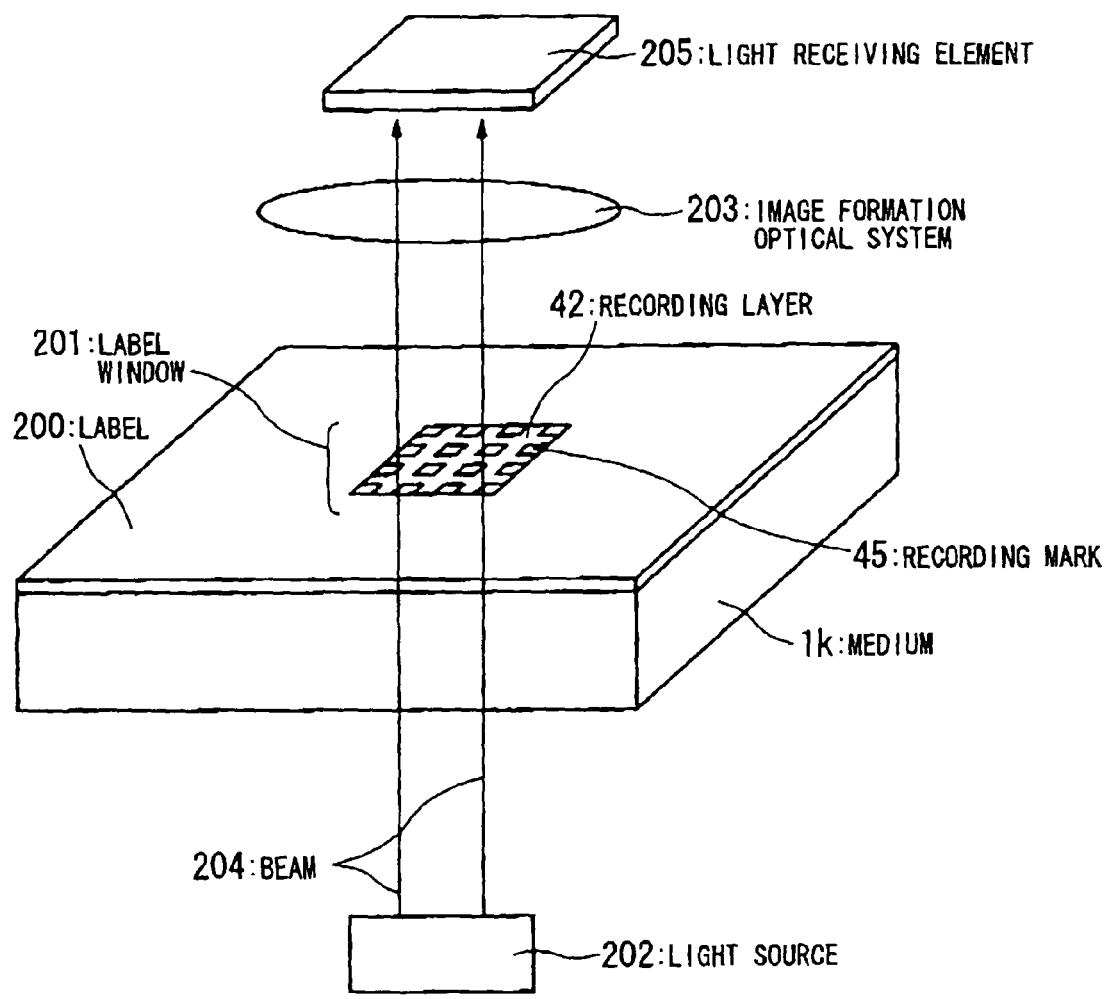
FIG. 31 is a figure seen from an oblique position showing a structure of the laminated holographic medium and a structure of the reproduction apparatus of the twelfth embodiment of the present invention.

FIG. 31 is a figure seen from an oblique position showing a medium of the twelfth embodiment. With respect to the medium 1k, a label 200 is adhered on one side. On the label 200, for example, information like a character or an image is printed or written. As shown in FIG. 31, when a label window 201 is proved on the label 200, the pattern of the recording mark 45 recorded on the recording layer 42 can be recognized by eyes (there are cases in which the recorded information can be recognized by eyes).

It is possible such that when a light 204 (it is not necessary to use a parallel beam like a laser) by a light source 202 is coming into the medium 1k from lower side (in a position of the figure) and is received by a light receiving element 205 (a photodetector of a point, one dimension or two dimensions) via an image formation optical system 203 such as an image formation lens, the data recorded on the recording layer can be read easily.

By applying a reading apparatus of the recorded data and/or a reading method shown in FIG. 31, there is an advantage and/or an effect such that it is possible to read and/or detect information specific to the medium easily without a recording and reproduction apparatus. In FIG. 31, it is possible to be upside down. It is naturally possible that the recorded information in the medium 1k can be read and detected by using the reproduction apparatus above.

A characteristic can be considered as an advantage such that only special reproduction apparatus can reproduce corresponding to services even though the reproduction apparatus and the reproduction method above cannot be applied to ordinary apparatus.

For example, it is possible to improve a security while the contents are distributed (or circulated) in the medium 1, because when a use brings the medium 1 as secondhand to a shop buying it, a shop clerk checks it whether or not it is registered as a stolen goods or whether or not it is copied by reading data of identification number with a special reproduction apparatus while hiding it from the user.

As a construction of layers of the medium above of the embodiments in the present invention, the gap layer and/or the cladding layer can be inserted between the layers if necessary. It can be suggested that there are the cladding layers on the upper and/or lower surfaces. And it can be suggested that there are no the cladding layers on the upper and/or lower surfaces. The same operation and the effects can be obtained in all cases. It is appropriate that the compositional elements of the recording apparatus and the reproduction apparatus are provided as the compositional elements of the medium, the package or the cartridge, provided as compositional elements conversely by exchanging compositional elements each other and the same effects can be obtained.

As shown above, with respect to the medium using the laminated hologram ROM, it is possible to record the information data, and it is possible to reproduce the recorded information data by using the reproduction apparatus for the laminated hologram ROM.

Figure 32:
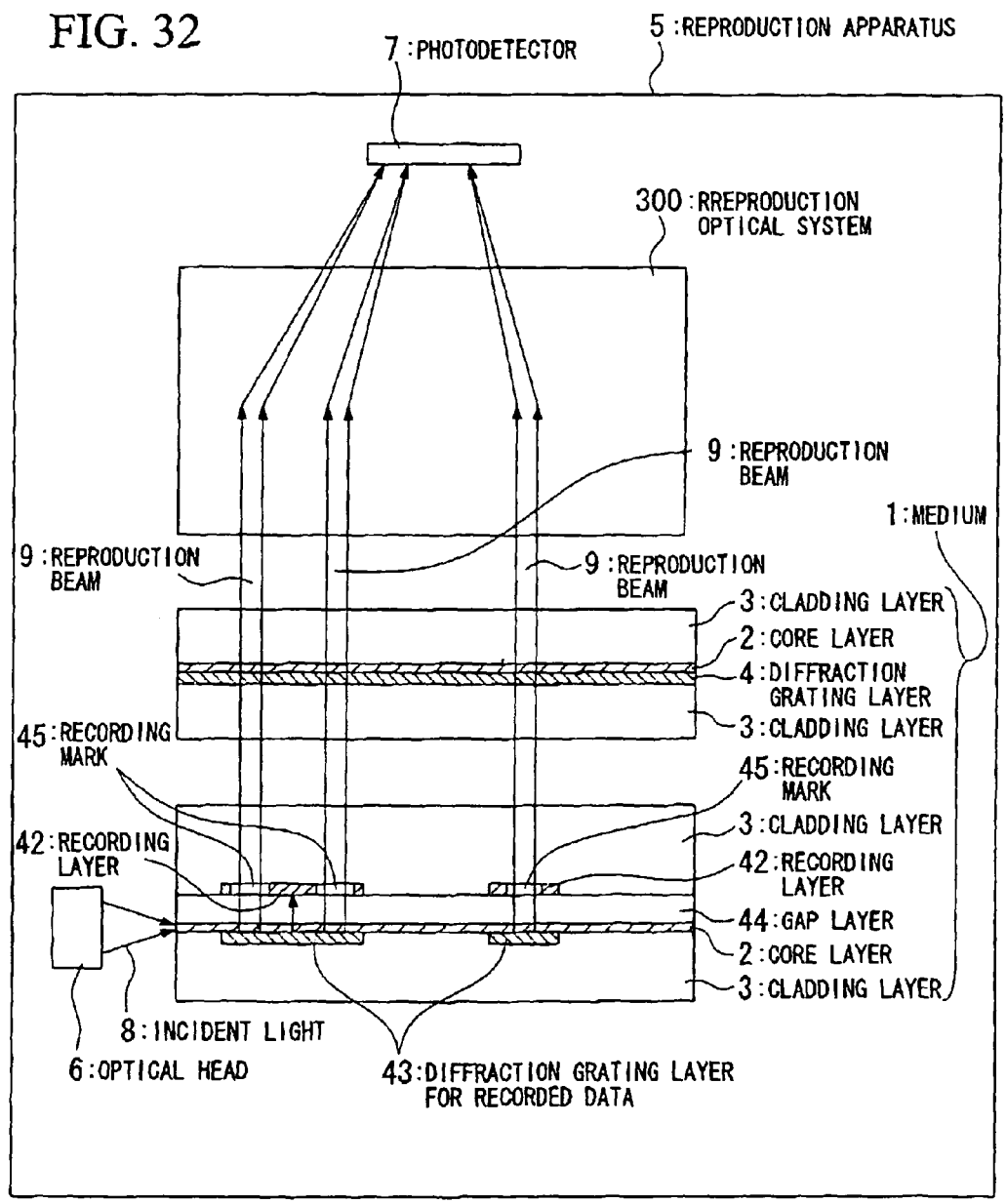
FIG. 32 is a side figure (cross-section) showing a structure in which the recording layer and a grating layer are formed partly on a reading side of the medium in the present invention.

In the embodiments above, as shown in FIG. 32, it is appropriate that when the medium 1 is seen as a plane, the diffraction grating layer for recorded layer can be provided only on an area including and overlapping a portion where the recording layer is formed and at least the recording mark is recorded, in other words, it is appropriate that the recording layer and the diffraction grating layer for recording data are provided a portion of the medium 1 instead of overall its reading surface, When the diffraction grating layer for recording data is provided overall the reading surface of the medium 1, a leakage of the light because of the diffraction grating layer for recording data is caused and a strength of the light is reduced while the incident light 8 is transmitted through the core layer, therefore, there is a problem such that the reproduction beam cannot obtain enough strength for reading.

However, when the diffraction grating layer for recording data is provided at a portion of the reading surface that is a necessary portion, it is possible to reduce the leakage of the incident light 8 at the minimum while being transmitted in the core layer caused by the diffraction grating layer for recording data.

As a result, comparing to a case of a constitution providing the diffraction grating layer for recording data overall the surface, it is possible to prevent reducing the strength of the incident light 8 while transmitting, therefore, it is possible to obtain an advantage to provide the reproduction beam with enough strength while reading because it is possible to prevent reducing the strength of the reproduction beam.

From a point of view with respect to controlling of reducing of the light, it is possible to decline the reduction of the incident light 8 while transmitting by reducing the area of the diffraction grating layer for recording data from which the light is leaked, therefore, it is appropriate in both ways of forming the recording layer overall the reading surface of the medium and of forming only on a portion of area that can contain necessary amount of information for recording the information data.

However, as shown below, it is possible to recognize a position of a recording mark including an identification by eyes, in order to avoid reducing the security and to avoid limiting the freedom of designing a label surface, it is preferable that the recording layer is set at only a necessary portion rather than setting overall the medium.

Same as other mediums (CD (registered trade mark), DVD, flash memory and the like), on one side (a side from which the beam for reproduce does not outgo, that is a label surface) of the medium of the present invention, a content showing that indicates such as what is recorded or stored as content information in the medium is expressed with excellent design Such expression is achieved by printing the image data of showing the content or adhering a sheet (paper, plastic or the like) on the label surface, or by setting into a package or a cartridge made from plastics, metals and the like.

When the recording layer is set overall the reading surface of the medium, the recording layer with light shading characteristic is easily found and the recording mark with transmittamcy (a portion having a hole) can be recognized by eyes. Therefore, even when it is encrypted and it is not easy to be decrypted, there is a possibility to be decrypted and there is a possibility that the security is decreased while distributing the content.

The medium of the present invention has a characteristic, easily imagined because it transmits (is made to transmit) the incident light and the reproduction beam without reducing, that it is optically transparent. Therefore, comparing to conventional mediums, as a new memory, it gives an image of the future.

However, as described above, when the recording layer is formed overall the reading surface of the medium, it loses the transmittance because the incident light is shaded by the recording layer therefore it reduces the effect of giving the image of the future.

Especially when the image data showing the content is directly printed on the label surface of the medium, it is difficult to show it with excellent design, therefore, there is a problem of causing a limitation on design.

With respect to this problem, as described above, by setting (forming) the recording layer on only a portion, of the reading surface of the medium at the minimum area for recording the information data, in some cases where it is formed, an user may not recognize the presence of the recording layer at all. In this case, by forming the diffraction grating layer for recording data corresponding to the position of the recording layer, it is possible to avoid leaking of the incident light 8 at the minimum and to improve the security and the design.

It is possible to be disappeared by getting mixed the recording mark (position where there is a hole) and the recording layer in a surface of the label, that is, a position with highly shaded on the surface of the label, therefore, it is difficult to recognize a position of the recording mark recording the identification number and it is possible to increase the security.

As described above, by getting mixed the recording layer in a design on the surface of the label, it is possible to determine a position of forming the recording layer and the recording mark (the position where there is the hole), therefore, it is possible to avoid limitations on the design of the surface of the label at the minimum.

With respect to colors of the recording layer, there is no limitation except that it should be possible to transmit the reproduction beam while reproducing.

However, with respect to a step of recording the information data on the recording layer, for example considering of creating a hole by laser, upon selecting the material of the recording layer, there is a condition that it should absorb the laser easily and it should be easy to be processed.

As described above, various colors can be selected for the material of the recording layer, it can be applied to design the surface of the label of the medium, and there is an advantage in that the security is increased because the information data is inserted into while designing.

For example, by setting a coloration of the recording layer in accordance with a coloration of the surface of the label, it is possible to increase an effect of disappearing or mixing the recording layer into the design of the surface of the label and it is possible to improve the design of the image data showing on the surface of the label.

<An Embodiment of an Authentication Sheet (a Thirteenth Embodiment)>

An authentication sheet of the present invention is characterized by being constituted from, at least, one or more core layers; one or more diffraction grating layers for recording data from which a reproduction beam goes out, provided on, under or in the core layer and formed with respect to a form or a refractive index distribution; and one or more recording layers provided adjacent to the core layer or the diffraction grating layer for recording data or provided while binding a gap layer between it and the core layer or the diffraction grating layer for recording data, and to which information data is expressed as presence of recording marks with or without transmittance of the light.

It is characterized by forming the diffraction grating layer for recording data such that a presence and a position of the recording mark on the recording layer are reproduced as a presence and a position of a brightness/darkness of the light. It is characterized by providing a cladding layer on one side or both sides of the core layer or the diffraction grating layer for recording data.

FIGS. 33-36 are figures showing the side face (cross-section) of the authentication sheet 500 of the embodiments in the present invention. It is possible to apply the medium 1 shown in FIGS. 7 and 8 as the authentication sheet of this embodiment by forming into a predetermined form of the sheet.

Figure 33:
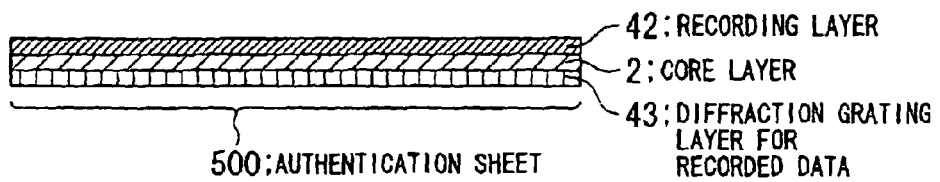
FIG. 33 is a side figure (cross-section) showing a structure of an authentication sheet of a first embodiment of the present invention.

FIG. 33 shows a constitution of the authentication sheet 500 of a first embodiment of the present invention. In this figure, the authentication sheet 500 is constituted from one core layer 2, one diffraction grating layer for recording data 43 provided in the core layer 2 at the lower side surface of the core layer and a recording layer 42 provided adjacent to the core layer 2.

Figure 34:
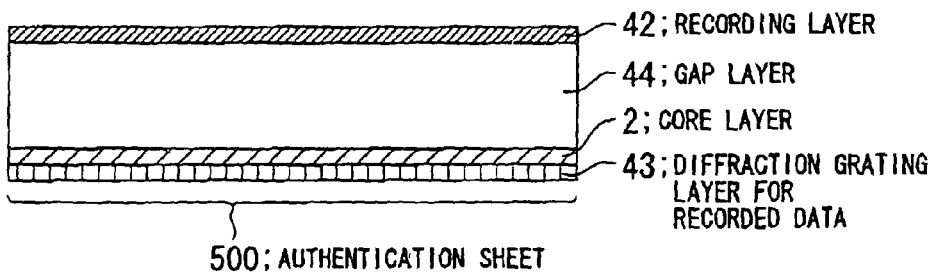
FIG. 34 is a side figure (cross-section) showing a structure of an authentication sheet of a second embodiment of the present invention.

FIG. 34 shows a constitution of the authentication sheet 500 of a second embodiment of the present invention. In this figure, the authentication sheet 500 is constituted from one core layer 2, one diffraction grating layer for recording data 43 provided in the core layer 2 at the lower side surface of the core layer and a recording layer 42 binding the gap layer 44 between itself and the core layer 2.

Figure 35:
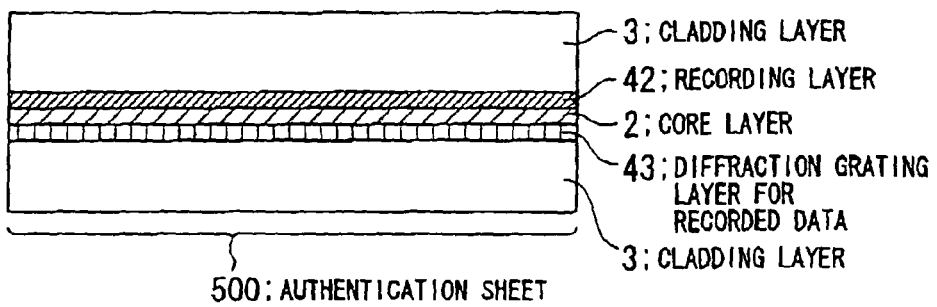
FIG. 35 is a side figure (cross-section) showing a structure of an authentication sheet of a third embodiment of the present invention.

FIG. 35 shows a constitution of the authentication sheet 500 of a third embodiment of the present invention, and comparing to the authentication sheet of the first embodiment shown in FIG. 33, this is an example of a constitution in which the cladding layers 3 are provided under the diffraction grating layer for recording data 43 and on the recording layer 42.

Figure 36:
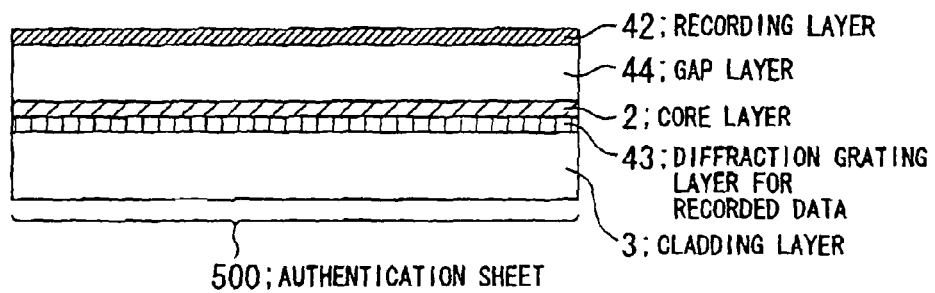
FIG. 36 is a side figure (cross-section) showing a structure of an authentication sheet of a fourth embodiment of the present invention.

FIG. 36 shows a constitution of the authentication sheet 500 of a fourth embodiment of the present invention, and comparing to the authentication sheet of the second embodiment shown in FIG. 34, this is an example of a constitution in which the cladding layer 3 is provided under the diffraction grating layer for recording data 43. Both of them have the same effects or advantages.

FIG. 7 shows an authentication sheet using the medium of the present invention, and comparing to the authentication sheet of the third embodiment shown in FIG. 35, this is an example of a constitution in which, same as the prior art, the diffraction grating layer 4, the core layer 2 and the cladding layer 3 are provided on the cladding layer 3.

Similarly, FIG. 8 shows an authentication sheet using the medium of the present invention, and comparing to the authentication sheet of the fourth embodiment shown in FIG. 36, this is an example of a constitution in which, same as the prior art, the cladding layer 3, the diffraction grating layer 4, the core layer 2 and the cladding layer 3 are provided on the recording layer 42.

As shown in such manners, if necessary, the same effects or advantages can be obtained when one or more core layers 2, two or more cladding layers 3 set so as to bind the core layer 2 and One or more diffraction grating layers 4 set at a boundary between the core layer 2 and the cladding layer 3 or inside the core layer are provided.

At the diffraction grating layer 4 of FIG. 33-36, same as the above described embodiments, the information data is stored as, for example, a bumpy form or a refractive index distribution (and as the holographic data). Same as the mediums of the above described embodiments, in the authentication sheet 500, there are the same effects and advantages when applying not only one recording layer 42, but also multiple. Same as the mediums of the above described embodiments, in the authentication sheet 500, there are the same effects and advantages not only when the diffraction grating layer 4, the recording layer 42 and the core layer 2 are set to be adjacent directly, but also when the gap layer 44 is provided among them.

A resin, a glass, an optical crystal and the like can be used for materials of the core layer 2 and the cladding layer 3, and for the gap layer 44, the materials having the same characteristics (the resin, the glass, the optical crystal and the like) can be used. The core layer 2 has a thickness of substantially 1 μm and the cladding layer 3 has a thickness of substantially 10 μm. The diffraction grating layers 4 can be set at two points that are on and under the core layer 2. It is necessary that the refractive index of the core layer 2 is larger than that of the cladding layer 3. The recording layer 42, as described in the third and the fourth embodiments of the medium, to which information data is recorded as presence of recording marks with or without transmittance of the light. The materials having functions of changing the optical characteristics such as the form, the refractive index and the like upon receiving the light (including infrared light, visible ray, ultraviolet light, laser, X-ray, electron beam and the like) or the heat and as a result, changing to have or not to have transmittance of the light (including changes such as transmittance/non-transmittance, with/without holes and the like), can be used.

For example, a material having characteristics of changing from non-transmittance to transmittance (or the converse), disappearing by changes of the form/sublimation (having a hole) can be used (a mark made on the recording layer in such manner is called recording mark 45).

It is appropriate to define the transmittal part as the recording mark or the non-transmittance part. In this document, many descriptions are using the transmittal part as a recording mark however the same effects can be obtained if the non-transmittance part is used. In this case, the description of this document should be changed appropriately such as changing brightness/darkness of brightness/darkness dots, and they are included in the scope of the embodiment (same in all the embodiments).

The concrete materials used for the recording layer 42 are, same as the medium of the third and the fourth embodiments, a metal (aluminum, chrome and so on), an oxide (chrome oxide, silver oxide and the like), a semiconductor (antimony and the like), a resin (UV curing resin, thermoset resin and the like, or fulleren or Coloring matter is doped to the resin), an ink, a paint, paper and the like.

FIG. 33 shows an example of constitution excluding the gap layer 44 and FIG. 34 shows an example of constitution including the gap layer 44, however, both of them have the name effects and advantages.

It is appropriate that the recording layer 42 is set at a side of the recording data diffraction grating layer 43 from which the reproduction beam goes out (a side to which the photodetector 7 is set with respect to the authentication sheet 500), and is not affected by providing a layer except for the gap layer 44 between the (recording layer 42 and the recording data diffraction grating layer 43, for example, the core layer 2, the cladding layer 3 or the diffraction grating layer 4.

It should be noted that, in ordinary cases, the information data is stored at the diffraction grating layer 4 therefore, in order to reproduce it, it is better not to set the diffraction grating layer 4 between the recording layer 42 and the recording data diffraction grating layer 43 (because the recording layer 42 and the recording data diffraction grating layer 43 shade the reproduction beam 9 from the diffraction grating layer 4 and it is impossible to reproduce the information data included in the diffraction grating layer 4).

The recording data diffraction grating layer 43 formed with the form or the refractive index distribution and from which the reproduction beam goes out. The recording data diffraction grating layer 43 has the same characteristics as the diffraction grating layer 4, and the incident light 8 came into the adjacent core layer 2 goes out as the reproduction beam 9 because of the bumpy form or the refractive index distribution. An angle of the outgoing reproduction beam 9 can be, for example, right above, that is both forward against the incident light 8 from the optical head 6 and backward with against the incident light 8 from the optical head 6, or it can be a parallel beam or can be a mixture of beams with various angles.

As shown in the reproduction apparatus and the reproduction method of the embodiments in the present invention explained below, it is appropriate that the recording data diffraction grating layer 43 is formed so as that the presence and the position of the recording mark 45 on the recording layer 42 correspond to the brightness/darkness and the position of the light on the photodetector 7.

It is appropriate that the presence and the position of the recording mark 45 on the recording layer 4 correspond to the brightness/darkness and the position of the light on the photodetector 7 with one to one relationship or without one-to-one relationship necessarily.

In other words, it is appropriate that the recording data refractive grating 43 is formed so as that one dot of brightness/darkness on the photodetector 7 corresponds to one recording mark 45, multiple dots of brightness/darkness on the photodetector 7 correspond to one recording mark 45, one dot of brightness/darkness on the photodetector 7 corresponds to multiple recording marks 45, or multiple dots of brightness/darkness on the photodetector 7 correspond to multiple recording marks 45.

There are two production methods of the authentication sheet 500 same as the third and the fourth embodiments of the medium, it can be produce by recording on the recording layer 43 after producing the authentication sheet 500 including the recording layer 42 as one united body, producing two bodies such as one portion including the recording layer 42 and another portion without the recording layer 42 and unifying at last by adhering another portion without the recording layer 42 to one portion including the recording layer 42 after recording on the recording layer 42, and recording on the recording layer 42 of a portion including the recording layer 42 and producing by adding on other portions without the recording portion 42.

With respect to the authentication sheet 500, there are an using method in its own form, an using method in a case such as a package or a cartridge, an using method in its own form adhering an label on one side (from which the reproduction beam does not outgo) and so on.

It is appropriate that the compositional elements of the recording apparatus and the reproduction apparatus are provided as the compositional elements of the authentication sheet, the package or the cartridge (providing compositional elements conversely, or exchanging compositional elements each other), the same effects car be obtained.

It is appropriate in the structure of the authentication sheet 500 of the present invention that the gap layer, the cladding layer or a protection layer are inserted between the layers, and the same functions and effects can be obtained whether or not there is the cladding layer or the protection layer on an upper side or lower side surface.

Figure 37:
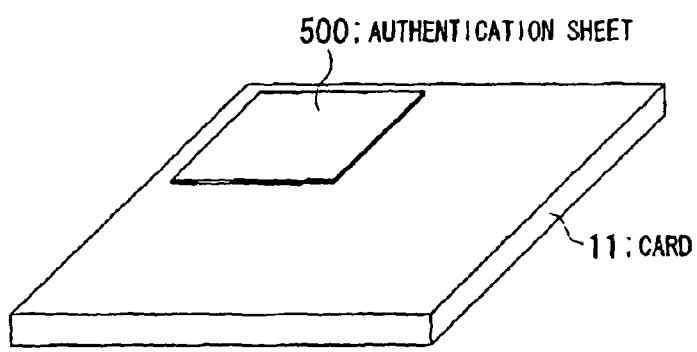
FIG. 37 is a figure showing an embodiment in which the authentication sheet is used adhered to a card.

FIG. 37 shows an embodiment in which the authentication sheet 500 of the present invention is adhered to a card 11. The authentication sheet 500 can be adhered overall or a portion of the card 11 on an upper surface, a lower surface or inside of it.

It is appropriate that the authentication sheet 500 works alone, or as described below in "An example of an application field applying the present invention", it is appropriate that the authentication sheet 500 works while being adhered to something other such as a card or a sticker (not limited to something thin like a card or a ticker, but including something in a block shape).

In the embodiments of the present invention, in many cases only the authentication sheet 500 is drawn; however, in such embodiments, the scope of the present invention includes not only the authentication sheet 500 alone but also something to which the authentication sheet 500 is adhered as shown in FIG. 37. That is, it is appropriate that the authentication sheet 500 of the present invention inserted into the recording apparatus and/or the reproduction apparatus works alone, and it is appropriate that the authentication sheet 500 works while being adhered to something other such as the card 11.

<An Embodiment of the Authentication Sheet (a Recording Apparatus and a Recording Method of a Thirteenth Embodiment)>

The recording apparatus of the embodiment of the present invention is an apparatus which records the information data to the authentication sheet including at least a recording layer, and is characterized by including at least a beam radiation system having functions of radiating a beam onto the recording layer and drawing or projecting the information data as a whole or an electron beam radiation system having functions of radiating an electron beam onto the recording layer and drawing or projecting collectively the information data For the authentication sheet, for example, it is possible to apply the authentication sheet of the embodiments of the present invention.

The recording method of the present invention is a recording method of recording the information data to a medium providing at least the recording layer using a recording apparatus providing at least the beam radiation system or the electron beam radiation system, and is characterized by recording the information data by drawing or projecting as a whole on the recording layer corresponding to the presence of the recording mark having transmittance or non-transmittance of the light using the beam radiation system or the electron beam radiation system.

As the authentication sheet, it is possible to apply the authentication sheet of the embodiments of the present invention. For the recording apparatus, for example, it is possible to apply the recording apparatus of the embodiments of the present invention.

Figure 38:
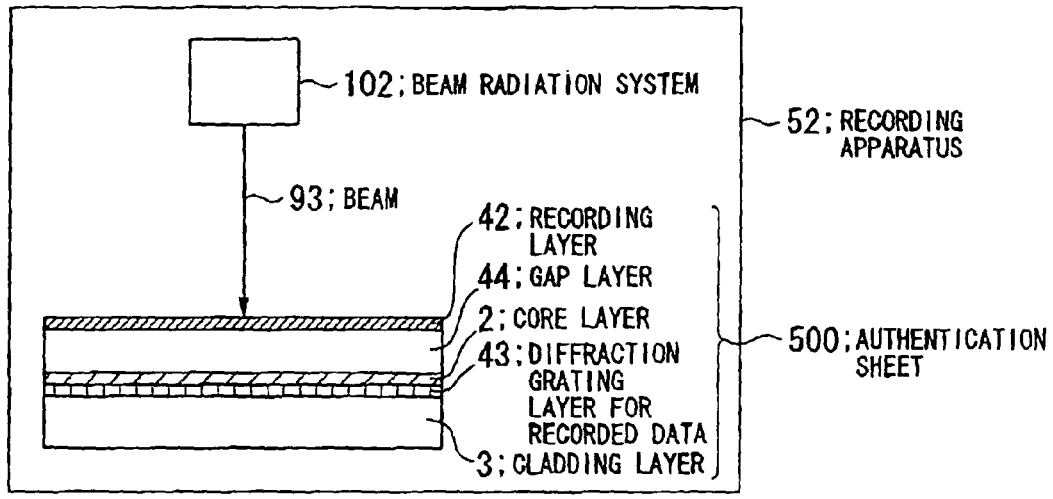
FIG. 38 is a figure showing a structure of the recording apparatus of the first embodiment of the present invention.
Figure 39:
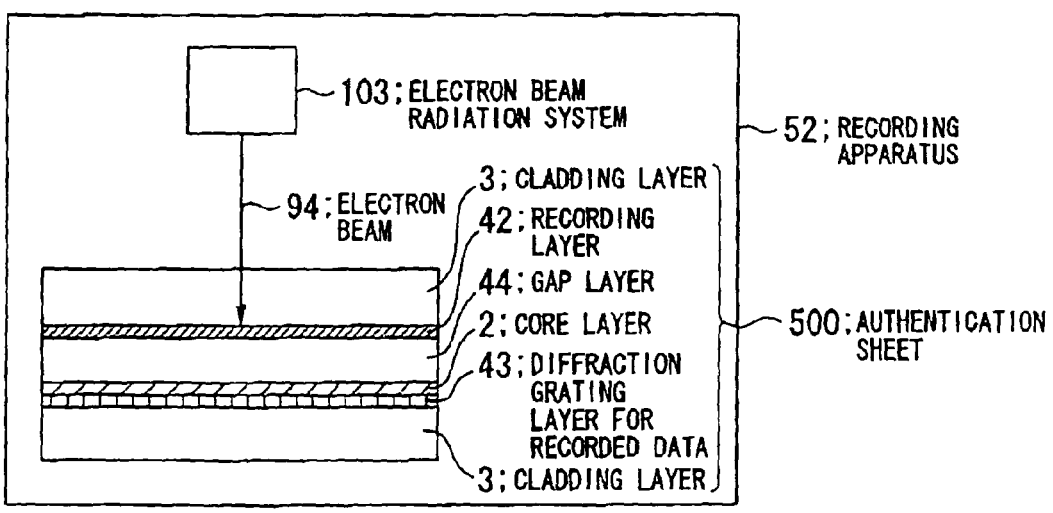
FIG. 39 is a figure showing a structure of the recording apparatus of the second embodiment of the present invention.

FIGS. 38 and 39 show a structure (side face) of a recording apparatus 52 of this embodiment of the present invention. In FIG. 38 the recording apparatus 52 is composed of a beam radiation system 102 that has a function of radiating a beam 93 and drawing on the recording layer 43, and in FIG. 9C, the recording apparatus 52 is composed of an electron beam radiation system 103 that has a function of radiating an electron beam 94 and drawing on the recording layer 43.

When the recording portion 42 of the authentication sheet 500 includes holes, it is easier to create holes if the recording layer 42 is exposed FIG. 38 shows an example of the authentication sheet 500 having the recording layer 42 exposed, and FIG. 39 shows an example of the authentication sheet 500 providing the cladding layer 3 set on the recording layer 42.

With respect to the authentication sheet 500, it is appropriate that it is produced by recording after combining a portion including the recording layer 42 and a portion excluding the recording layer 42, and by adhering a portion excluding the recording layer 42 after recording to a portion including the recording layer 42.

In FIGS. 38 and 39, the same effects are obtained even when the beam 93 and the electron beam 94 are exchanged and the beam radiation system 102 and the electron beam radiation system 103 are exchanged.

Hereafter, a recording operation of the recording apparatus 52 is explained. Upon recording, using the beam radiation system 102 or the electron beam radiation system 103, positions having transmittance or non-transmittance with respect to the beam or the electron beam (the recording mark 45: including transmittance/non-transmittance, with/without holes and the like) are drawn or projected as a whole using the spatial light modulator on the recording layer 42. In accordance with the presence of the recording mark 45 (number, position, shape and the like), it is possible to record the information data on the recording layer 42. The shape, the changes of the refractive index, removal (hole) and the like of the recording layer 42 have functions of the recording mark 45.

As the beam 93, infrared light, ultraviolet light, a laser, X-rays, or the like can be applied. It is appropriate that the beam radiation system 102 and the electron beam radiation system 103 have compositional elements of the optical parts, parts for the electron beam and the like such as a lens, a collimator and the like if necessary.

It is appropriate that the beam radiation system 102, the electron beam radiation system 103 and the authentication sheet 500 changes their angles and positions relatively if necessary, therefore, it is appropriate that they have shifting mechanism and functions in one, two or three dimension.

Figure 40:
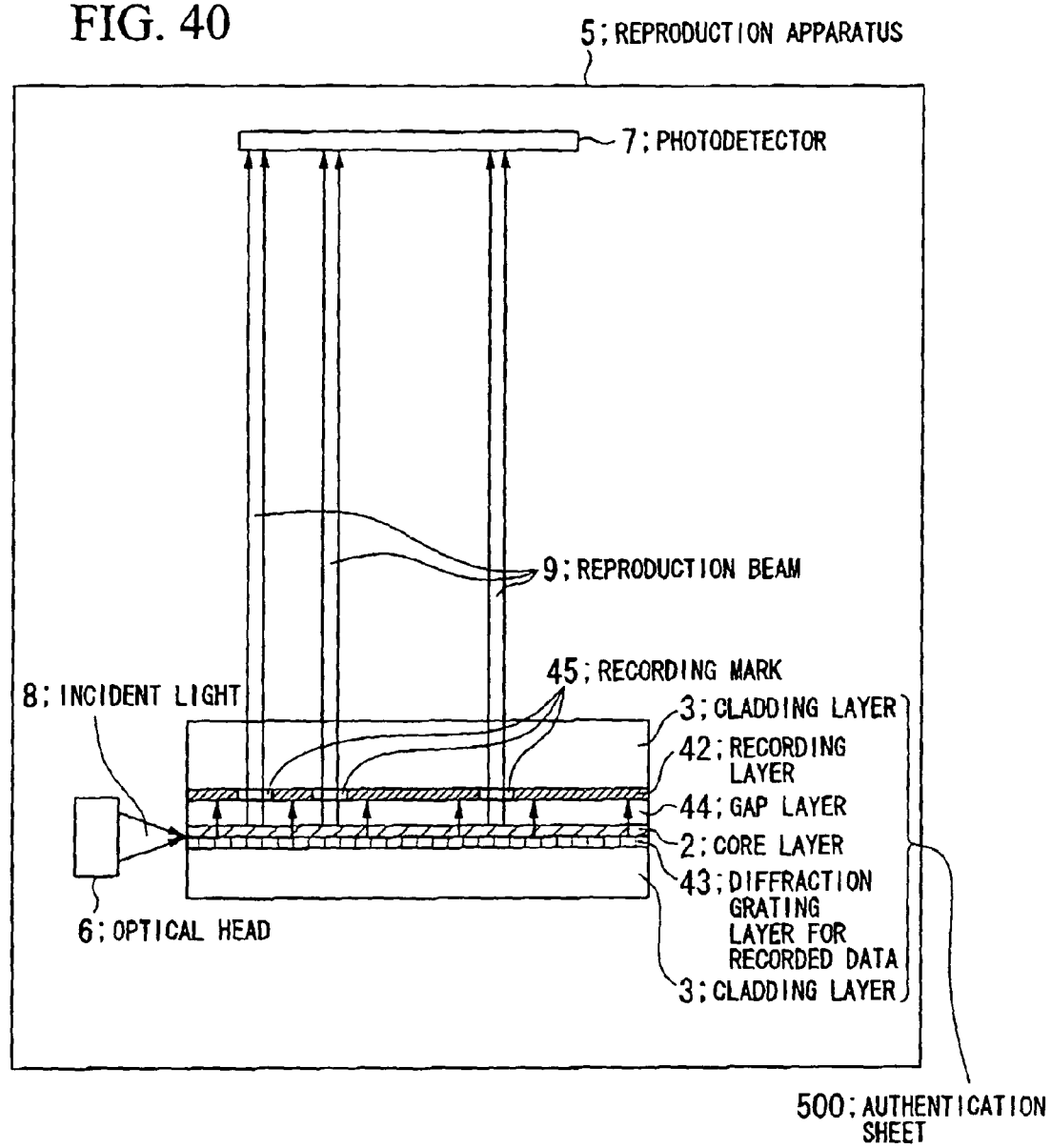
FIG. 40 is a figure showing a structure of the reproduction apparatus of the first embodiment of the present invention.

Moreover, it is appropriate that the recording apparatus 52 has the optical head 6, photodetector 7 and the like of the reproduction apparatus shown in FIG. 40, and has compositional elements or functions that the reproduction apparatus 5 of the present invention such as an aperture mask, a reproduction optical system, an authentication sheet supporting portion if necessary.

Other than a method of recording on the recording layer 42 by using the beam 93, the electron beam 94 and the like, it is possible to record by printing an ink, a paint and the like in accordance with desired pattern on the authentication sheet 500 using various printing techniques such as an inkjet printing, a laser printing, a screen printing and the like.

It is possible to use a method of adhering a label of paper, ink or resin on the authentication sheet 500 and printing a recording pattern on it, or a method of adhering the label to which the recording pattern is already printed on the authentication sheet 500. This is included in the scope of the present invention too.

Moreover, in addition to the beam 93, the beam radiation system 102, the electron beam 94 and the electron beam radiation system 103, the ion beam and the source of the ion beam are useful, They are, and the combinations of above described elements, for example, a method of spraying the ink or paint in accordance with the printing technology and recording by radiating the beam 93, the electron beam 94 or the like, are included in the scope of the present invention.

With respect to a medium and a recording method, there is a mechanism or a method in order to achieve high accuracy upon a form and a position of a processing spot of the recording mark 45, it is possible to operate the spot form and the spot position with high accuracy by applying the medium and the recording method of observing the surface being processed from the down side of a sample (authentication sheet 500) and it has an advantage.

It is possible to record the information data on the authentication sheet 500 by using the recording apparatus which records on the medium shown in FIG. 12. In this figure, the beam radiation system 102 (or the electron beam radiation system); for example, has a function of radiating the beam 93 and operates recording of the information data in a same manner that has been already explained as a recording operation of the medium 1 by moving vertically (along with the optical axis of the beam) and scanning with the beam or the radiation system itself in one dimension or two dimension on the inside surface of the medium 1 as the authentication sheet 500.

<An Embodiment of an Authentication Sheet (a Thirteenth Embodiment of a Reproduction Apparatus and a Reproduction Method)>

The reproduction apparatus of the embodiment of the present invention is an apparatus for reproducing information data recorded on a medium having at least a diffraction grating layer for recording data and a core layer, and is characterized by including at least an optical head having a function of radiating incident light into the core layer set adjacent to the diffraction grating layer for recording data or binding a gap layer between them, and a photodetector detecting a reproduction beam outgoing from the diffraction grating layer for recording data. For the authentication sheet, it is possible to use the authentication sheet of the embodiments of the present invention.

The reproduction method of this embodiment of the present invention is a reproduction method reproduces information data recorded on an authentication sheet having at least a diffraction grating layer for recording data, a core layer, a recording layer and a recording mark, characterized by including at least radiating incident light from an optical head into the d core layer set adjacent to the diffraction grating layer for recording data or binding a gap layer between them, and reproducing the information data recorded on the recording layer by detecting and reproducing a reproduction beam outgoing from the diffraction grating layer for recording data as patterns of brightness/darkness at a position of a photodetector corresponding to presence of recording marks. For the authentication sheet, it is possible to use the authentication sheet of the embodiments of the present invention. For the reproduction apparatus, it is possible to use the reproduction apparatus of the embodiments of the present invention.

FIG. 40 is a figure shows a structure of the reproduction apparatus of the embodiment of the present invention and a content of the reproduction method of the embodiment of the present invention. In this figure, a reproduction apparatus 6 is composed of an optical head 6 and a photodetector 7, and the optical head 6 has a function of radiating incident light into a desired core layer 2 of the authentication sheet 500.

When the authentication sheet 500 has the diffraction grating layer 4, same as the prior arts, when the incident light is radiated into the core layer 2 adjacent to the diffraction grating layer 4, it is possible to read the information data recorded on the diffraction grating layer 4 (as the holographic data).

There are methods for incidence of the incident light 8 to the core layer 2, such as a method of radiating from edge faces of the authentication sheet 500, a method of providing an optical connection portion at the core layer 2 and radiating from the upper side or the lower side of the authentication sheet 500, and a method of providing a mirror surface at each core layer 2 and radiating from the upper side or the lower side of the authentication sheet 500. These methods have the same effects. The method of radiating from the edge face of the authentication sheet 500 has an advantage in that it does not need to provide the optical connection portion, the mirror surface and the like at the authentication sheet 500.

The optical head 6 has a source for generating the incident light 8, and for example, various laser light sources can be applied to the source. The optical head 6 is, for example, constructed by combining a mirror leading the light, optical components such as the collimator, a condenser lens having a function of condensing (focusing) the incident light 8 at the core layer 2, an actuator having a function (mechanism, servo function, or the like) of radiating the incident light 8 at a desired position and angle of the core layer 2, and the like. It is appropriate that the reproduction apparatus 5 of the embodiment of the present invention provides a photodetector for the servo if necessary.

The photodetector 7 has a function of detecting the reproduction beam 9 outgoing from the authentication sheet 500. It is appropriate that it has a mechanism for shifting. It should be noted that it is required to shift the photodetector 7 and the authentication sheet 500 relatively, therefore, it is appropriate to provide a mechanism for shifting the authentication sheet 500 side. For example, it is possible to use two dimensional photodetector like a CCD, a CMOS and so on, one dimensional photodetector such as a line sensor, a photodiode and the like.

The reproduction beam 9 goes out as two dimensional data, therefore, the one dimensional photodetector, preferably the two dimensional photodetector, has an advantage in that it can detect it in a shorter time.

Figure 41:
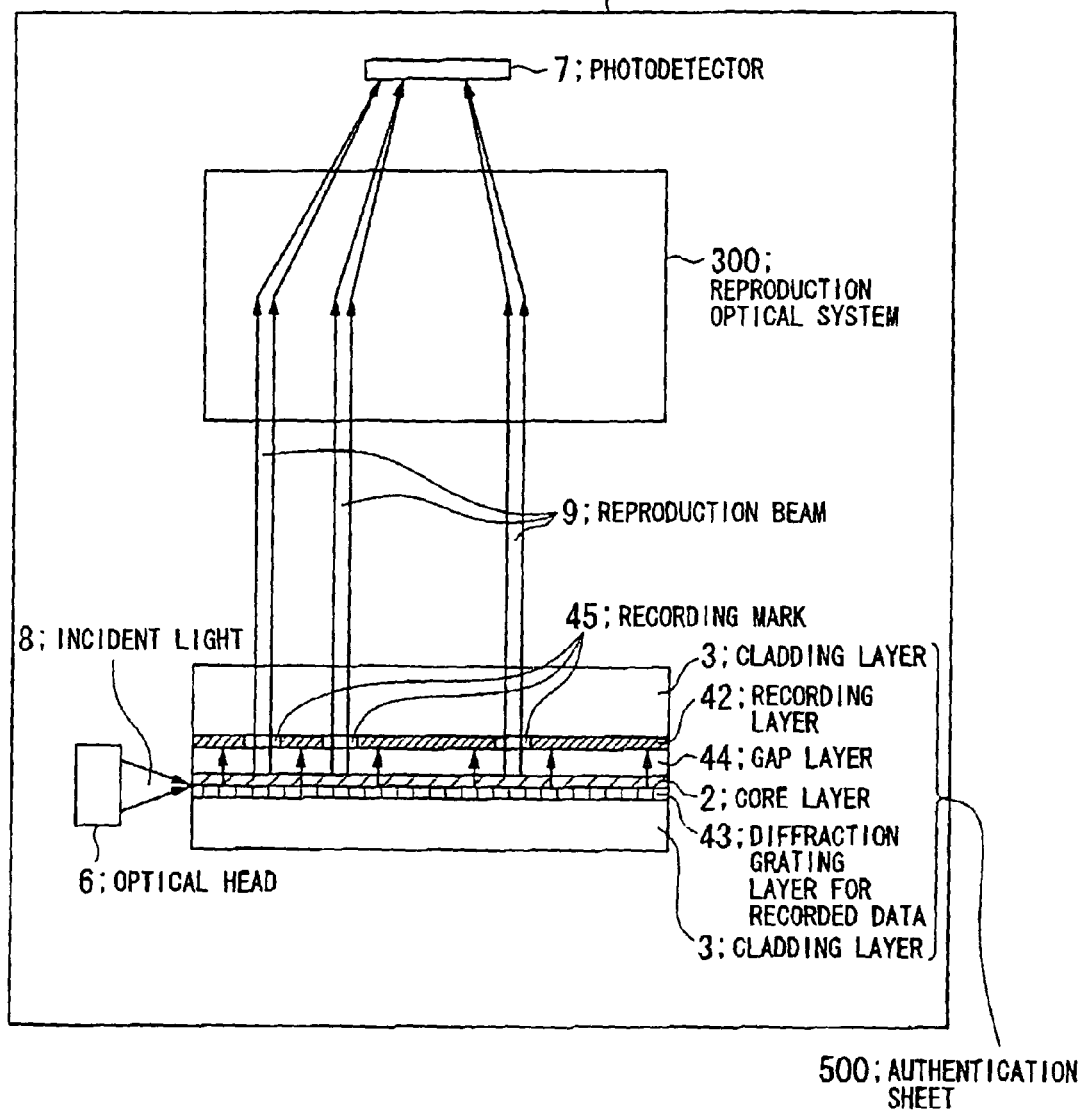
FIG. 41 is a figure showing a structure of the reproduction apparatus of the second embodiment of the present invention.

It is appropriate that the reproduction apparatus 5 includes the reproduction optical system 300 on the optical path of the reproduction beam 9 outgoing from the authentication sheet 500 before going into the photodetector 9 if necessary. FIG. 41 shows a constitution including the reproduction optical system 300 (the same effects can be obtained when the reproduction optical system 300 is not included).

The reproduction optical system 300 has a function of forming an image of the reproduction beam 9 outgoing from the diffraction grating layer 4 and the diffraction grating layer for recording data 43 on the photodetector 7. It is possible to construct the reproduction optical system 300 from, for example, various optical parts such as an aperture mask 302, a lens 301, a prism, a half mirror, a (polarized) beam splitter, a mirror, a polarizer, a liquid crystal device and the like and combinations of them.

The aperture mask is provided on the way of an optical path of the reproduction beam 9 outgoing from the authentication sheet 500 before it is accepted by the photodetector 7, and it has a function of separating and reproducing the reproduction beam 9 outgoing from each diffraction grating layer 4 if the multiplex information data (including contents and the like) is recorded on (when the authentication sheet 500 has the diffraction grating layer 4) the diffraction grating layers 4. Using the aperture mask, it is possible to reproduce the information data of multiple screens of the photodetector 7 from one diffraction grating layer 4, therefore, it is possible to use the potential of the storage capacity of the authentication sheet 500 to the max without a limitation in accordance with a number of pixels of the photodetector 7. In other words, there is an advantage in that it is possible to increase the storage capacity because the multiplex recording and the multiplex reproduction of the information data are possible.

There are aperture masks such that it is made from the liquid crystal device and can electrically change the position of aperture, or it has a fixed aperture and the mask is shifted. The prior one does not need a mechanical shifting, therefore, it is advantageous. It is appropriate that a number of the apertures being opened at a time is either one or more than one.

Hereafter, a reproduction operation of the reproduction apparatus of this embodiment of the present invention is explained. When an incident light 8 is radiated from an optical head 6 into a core layer 2 adjacent to the diffraction grating layer for recording data, the incident light incoming into the core layer 2 is diffracted at the diffraction grating layer for recording data 43 and goes out as (in a case of FIGS. 40 and 41) the reproduction beam 9 upward. The recording mark 45 is formed on the recording layer by the recording apparatus 52 and the recording method of the embodiment of the present invention. In the recording layer 45, for example, the reproduction beam 9 is transmitted at a point where the recording mark 45 is there, and is not transmitted at a point where the recording mark 45 in not there.

Therefore, a photodetector 7 detects a pattern of brightness/darkness corresponding to presence of the recording mark 45 on the recording layer 42. For example, when the information data which is specific to a authentication sheet 500 is recorded corresponding to the presence (number, position, form and the like) of the recording mark 45, then it is possible to detect and reproduce it with the photodetector 7.

A parallel beam as the reproduction beam 9 goes out from the diffraction grating layer for recording data 43, therefore, it is possible for the photodetector 7 to detect the pattern of the recording mark 45 formed on the recording layer 42 as it is (the presence and the position of the recording mark correspond to the brightness/darkness and the position on the photodetector with one to one relationship, and a relation of zooming is also one to one). The structure of the reproduction apparatus 7 becomes especially easier when the reproduction optical system 300 is not provided.

On the other hand, when the information data on the diffraction grating for the recorded data is formed as the holographic data beforehand so as to form the image on the photodetector 7 by the reproduction beam 9 (via the reproduction optical system if it is provided) transmitted via the recording mark 45, same as described above, it is possible that the photodetector 7 detects the pattern of the recording mark 45 formed on the recording layer 42. In this case, generally, the reproduction beam is not a parallel beam and is a beam having various angles (it may have various phase and strength). In this case, there is an advantage in that the photodetector 7 can detect the pattern of the recording mark 45 without being effected from the presence; kind, characteristics and the like of the reproduction optical system 300.

Referring to FIG. 14 and FIG. 15, above things are describes. FIG. 14 shows the embodiment of the recording layer 42 and FIG. 15 shoes the embodiment of the photodetector 7. In FIG. 14, the recording mark 45 is formed two-dimensionally on the recording layer 42 and works as the data for information.

As shown in FIG. 15, a two dimensional pattern of the brightness/darkness corresponding to the information data of the recording layer is reproduced on the photodetector 7. When the reproduction beam 9 goes out from the diffraction grating layer for recording data 43 is a parallel beam, the size of the information data and the pattern of the brightness/darkness is (substantially) same, and the presence and the position of the recording mark correspond to the brightness/darkness and the position on the photodetector with one to one relationship. That is, A, B, C, . . . in FIG. 14 are reproduced as A', B', C', . . . in FIG. 15 with one to one correspondence.

On the other hand, when the diffraction grating layer for recording data 43 is formed as the holographic data as described above, it is reproduced on the photodetector 7 in a same size, zoomed in or zoomed out. It is appropriate whether or not the presence and the position of the recording mark 45 on the recording layer 42 correspond to the brightness/darkness and its position on the photodetector 7 with one to one relationship.

In other words, it is appropriate that the recording data refractive grating 43 is formed so as that one dot of brightness/darkness on the photodetector 7 corresponds to one recording mark 45, multiple dots of brightness/darkness on the photodetector 7 correspond to one recording mark 45, one dot of brightness/darkness on the photodetector 7 corresponds to multiple recording marks 45, or Multiple dots of brightness/darkness on the photodetector 7 correspond to multiple recording marks 45.

For example, when the holographic data of the diffraction grating layer for recording data 43 is formed so as that the reproduction beam outgoing from the A in FIG. 12 forms an image as A' in FIG. 7B and the reproduction beam outgoing from the B in FIG. 6B forms an image as B' in FIG. 7B (repeated in the same manner), it is possible that one recording mark 45 corresponds to one brightness/darkness dot on the photodetector 7.

It is possible to apply FIG. 16 that is an apparatus for the medium 1 to the authentication sheet 500, and in such case, this FIG. 16 shows an example of construction in which the reproduction optical system 300 of the reproduction apparatus 5 in FIG. 41 composed of a lens 301 and an aperture mask 302. In this case, there is a possibility that an aperture of the aperture mask 302 and a gap between the apertures shade the reproduction beam 9, however, it is possible to form the image of the reproduction beam 9 on the photodetector 7 without problems when the aperture is in an open state and the recording mark 45 on the recording layer 42 is set in a manner of avoiding the gap between the apertures.

FIG. 16 is an example that the authentication sheet 500 (that is, the recording layer 42 of the medium 1) has larger area than the photodetector 7, and the information data is reproduced by zooming out with the reproduction optical system 300. By applying the large recording layer 42, there is an advantage in that it is possible to store more information data. By applying the small recording layer 42, there is an advantage in that the reproduction apparatus becomes cheaper and smaller because the photodetector 7 becomes smaller.

By shifting the photodetector 7 and the reproduction optical system 300 relatively with respect to the authentication sheet 500 if necessary, the reproduction beam 9 (information data) outgoing from the authentication sheet 500 having a large recording surface can be reproduced easily and effectively by the photodetector 7, therefore, it is possible to increase the storage capacity (same for all embodiments).

It is possible to apply FIG. 17 showing the reproduction apparatus of the medium 1 to the authentication sheet 500, and this FIG. 17 shows an example of construction in a case that the reproduction optical system 300 of the reproduction apparatus 5 in FIG. 41 (in this example, composed of a lens 301 and an aperture mask 302) is integrated with the photodetector 7. The reproduction operation is same as described above.

When the number of the apertures of the aperture mask is small, for example 1, there may be a case that it is not possible for the photodetector 7 to reproduce all the information data as shown in FIG. 15.

In this case, one brightness/darkness dot is reproduced corresponding to one recording mark 45 at a center or around it of the photodetector 7, therefore, by shifting an integrated portion of the photodetector 7 and the reproduction optical system 300 in two dimensions (or one dimension) relatively (along with the surface of the authentication sheet, that is the medium 1) with respect to the authentication sheet 500, it is possible to reproduce all the brightness/darkness dots corresponding to all the recording marks 45.

This is an example of one brightness/darkness dot, however, in a case of multiple, if it is not possible to reproduce all the information data in one time, similarly, by shifting in two dimensions (or one dimension), it is possible to reproduce all the brightness/darkness dots corresponding to all the recording marks 45 (as described in FIGS. 18-21, it is same for all the embodiments).

FIGS. 14 and 15 show an example in which the pattern of the recording mark 45 of the recording layer 42 is same as or zooming in/out of (a similar figure) the pattern of the brightness/darkness dots. In the present invention when the presence and the position of the recording mark 45 on the recording layer 42 correspond to the presence and the position of the light on the photodetector 7, it does not regard whether or not it is a one to one correspondence as shown in FIGS. 14 and 15.

An example in which they are not corresponding in one to one relationship has been explained referring to FIGS. 22 and 23, therefore, detailed explanation is omitted.

It is possible to apply they constitution of the medium shown in FIG. 24 to the constitution of the authentication sheet 500, and FIG. 24 shows a constitute of the authentication sheet 500 in a case of having multiple recording layers 42 and diffraction grating layers for recording data 43. It is omitted in FIG. 24, however, among the recording layers 42, the diffraction grating layers for recording data 43 and the like, it is appropriate that brightness/darkness dots on the photodetector 7 and more variation of recording and/or reproducing the data for information is can be obtained, therefore, there are advantages such that more amount and variety of information data can be obtained and it is possible to improve the security when they are applied to the information data specific to the authentication sheet.

Numbers of compositional elements, such as the optical components or the electromechanical components, of the recording apparatus 52 and the reproduction apparatus 5 described in this document can be one or more than one, and the same effects can be obtained.

It is appropriate that as the compositional elements of the recording apparatus 52 and the reproduction apparatus 5, such as an authentication sheet loading aperture that is an aperture for loading the authentication sheet 500, an authentication sheet loading space that, is a space for loading the authentication sheet 500, an authentication sheet loading table having a function of fixing, loading, holding and ejecting the authentication sheet 500 are provided. They have an advantage in that it is easy and stable to load the authentication sheet 500. There is a compositional element of the recording apparatus 62 and the reproduction apparatus 5 such as a logic/control circuit.

The logic/control circuit is a circuit having functions of operating digital signals and operating activation of an active devices such as the light source, the beam radiation system, the photodetector, the liquid crystal device, various mechanisms of driving and the like explained in this specification.

The recording apparatus 52 and the reproduction apparatus 5 shown in this document are just typical embodiments in the present invention, and by changing position of the compositional elements, combining the embodiments or mixing the embodiments, the same advantages can be multiple recording layers 42, diffraction grating layers for recording data 43, core layers 2, cladding layers 3, diffraction grating layers 4, gap layers 44, protection layers and the like are provided.

The same effects can be obtained even when multiple recording layers and/or diffraction grating layers for recording data 43. For example, when the position of the recording mark 45 is shifted a little and formed in a manner such as the recording layer 42 at the bottom and the second from the bottom in FIG. 24, it is possible that only the overlapping portion of both of them works as the recording mark 45 practically and there is an advantage in that it is possible to form accurately and finely while avoiding limitations on the size of the recording mark 45 because of a recording accuracy or a resolution of recording of the beam radiation system 102, the electron beam radiation system 103 and the like of the recording apparatus 52.

It is appropriate that all (the second recording layer 42 from the top in the figure) or a portion (the recording layer 42 at the top in the figure) of the recording layer 42 has transmittance.

When multiple recording layers 42 and/or the diffraction grating layers for recording data 43 are provided, even if one of the recording layers 42 includes a recording error, it is possible to record in the other recording layer therefore there is an advantage to develop an available percentage.

There is an advantage in that it is effective because it is possible to provide one common authentication sheet 500 (or part of this) available for various reproduction optical systems 300 (and reproduction apparatus 5) by providing various diffraction grating layers 43 for recorded data in the authentication sheet 500 (or part of it) adaptable for multiple reproduction optical systems 300 (and reproduction apparatus 5).

When the multiple diffraction grating layers for recording data 43 are provided, it is possible to provide multiple correspondence relationship between the pattern of the recording mark 45 and the pattern of the obtained and they are involved in the scope of the present invention.

The authentication sheet means the authentication sheet itself and other things to which the authentication sheet is adhered and have a card shape, a sticker shape, a plate shape and the like (irrespective of thickness), and moreover, the shape is irrespective therefore a square shape, a disc shape and so on are included too.

When the reproduction beam 9 can be recognized by eyes, the photodetector 7 cannot be necessary. When the information obtained from the reproduction beam 9 is not used electrically, it is possible that, for example, a frosted glass can be applied to the photodetector 7 and it is possible to obtain the information data by projecting the reproduction beam 9 on it.

Moreover, the same effects can be obtained not only when the reproduction apparatus is constituted in one body, but also constituted in two or more bodies by separating a portion including the optical head 6 and a portion including the photodetector 7.

When the pattern of the recording mark 45 recorded on the recording layer 42 is same, it is possible to reproduce the different information data by forming different data on the diffraction grating layer for recording data 43.

Therefore, it is possible to improve the security because it becomes difficult to find a correspondence between a visually recognized pattern of the information data of the recording mark 42 and the reproduced information data. There is an advantage in that it is possible to record and reproduce various information in accordance with combinations of the data formed on the diffraction grating layer for recording data 43 and the pattern of the recording mark 45 recorded on the recording layer 42.

<An Embodiment of an Authentication Sheet (an Example of an Application Field of the Thirteenth Embodiment ("An Example of an Application Field Applying the Present Invention"))>

This technology works as an authentication sheet independently or works when it is adhered to other thins, for example, fields like a memory (a memory/medium for distributing contents), a key (examples: a home/room key, an access key for a PC and so on, and the like), a guarantee sticker, a credit card, a passport, paper money, a driving license, an insurance card, a member card, a sticker for packing, a tag, an admission ticket, a consultation ticket, an ID card, a personal key, a gift ticket, a business soft ware, a certification sticker, a package sticker, a prepaid card, a game card, a trading card, an amusement software, a commemorative stamp, a greeting card, a production tool, an anti-counterfeit sticker, a copyright protection sticker, a sticker for proving an original manufacturer's product and the like can be suggested.

Figure 42:
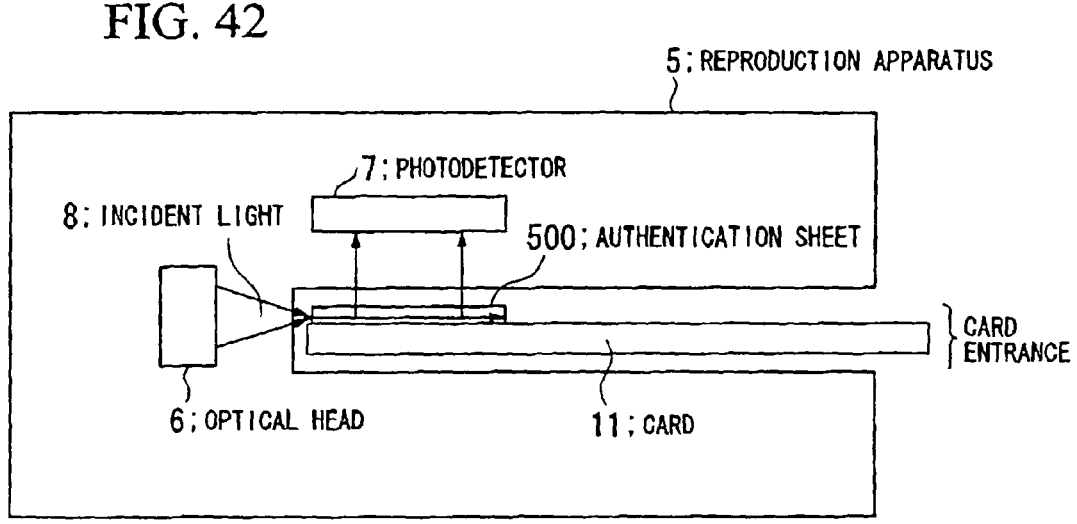
FIG. 42 is a figure for explaining a state of the authentication sheet of the embodiment of the present invention when it is inserted into a card entrance of the reproduction apparatus.
Figure 43:
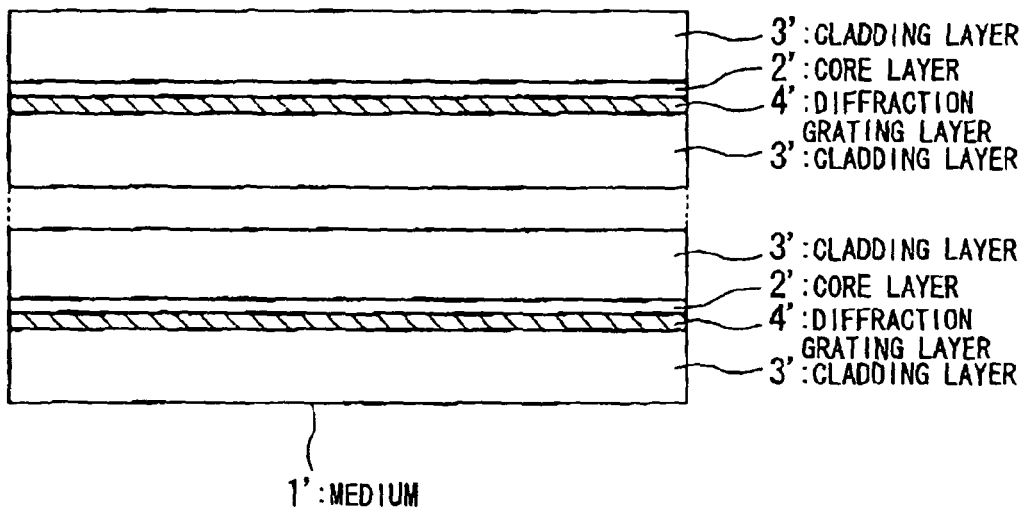
FIG. 43 is a side figure showing a structure of a laminated holographic medium in the prior art.
Figure 44:
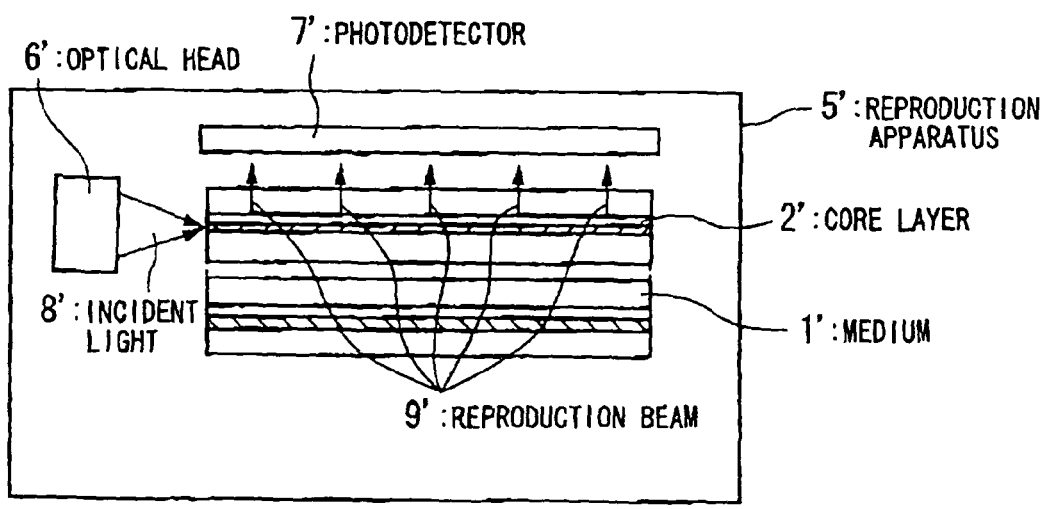
FIG. 44 is a side figure showing a structure of the laminated holographic medium and its reproduction apparatus.

In FIG. 42, an embodiment of a state is shown in which the authentication sheet 500 is adhered to a card and/or a sticker ("card 11" is applied to a general term) as shown in FIG. 7 and is inserted into the reproduction apparatus 5. For example, when this card 11 is a key, the reproduction apparatus 5 has a role of a card reader (or a portion of the card reader) set at an entrance of a home/room.

Similarly in other application fields, an image of usage can be obtained such that the authentication sheet 500 is used independently or is used by adhering to a card (used as a general term) and the reproduction apparatus 5 is used as a card reader or a potion of it. It is appropriate that the reproduction apparatus 5 provides a card entrance if necessary (same for all embodiments).

As described above, it is shown that, in accordance with the present invention, it is possible to record and reproduce the information data with respect to each of the authentication sheet easily.

It can be appropriate that a program for implementing the functions of recording/reproducing of the above described recording apparatus and reproduction apparatus is recorded in a computer readable storage medium, the computer system reads the program recorded in the storage medium and operates recording/reproducing by executing it.

"Computer system" here includes the OS and the hardware such as peripheral equipments. "Computer system" includes WWW system having a homepage provision environment (or display environment). "Computer readable medium" is a portable medium such as a flexible disc, a magneto-optical disc, a ROM, a CD-ROM and the like, or a storage apparatus such as a hard disc installed in the computer system. Moreover, "computer readable medium" includes such as a volatile memory inside the computer systems used for a server or a client to which the programs are transmitted via network like internet or a communication line like a telephone line, which saves the programs for a certain time period.

The program above can be transmitted from the computer storing this program in the storage apparatus or the like via a transmission medium or via transmission waves in the transmission medium to another computer system.

"Transmission medium" transmitting the program is a medium such as a network (communication network) like internet or a communication line (line) like a telephone line that has a function to transmit information. It can be appropriate that the above program can be a program for realizing a part of above described functions.

Moreover, it can be appropriate that the program is so called a difference file (difference program) which realizes the above functions by being combined with a program already stored in the computer.

<A Fourteenth Embodiment>

Hereafter, referring to figures, a laminated holographic memory system constituted from a laminated holographic medium and a reproduction apparatus in accordance with the fourteenth embodiment. A description below is common in the fourteenth-seventeenth embodiments.

Figure 45:
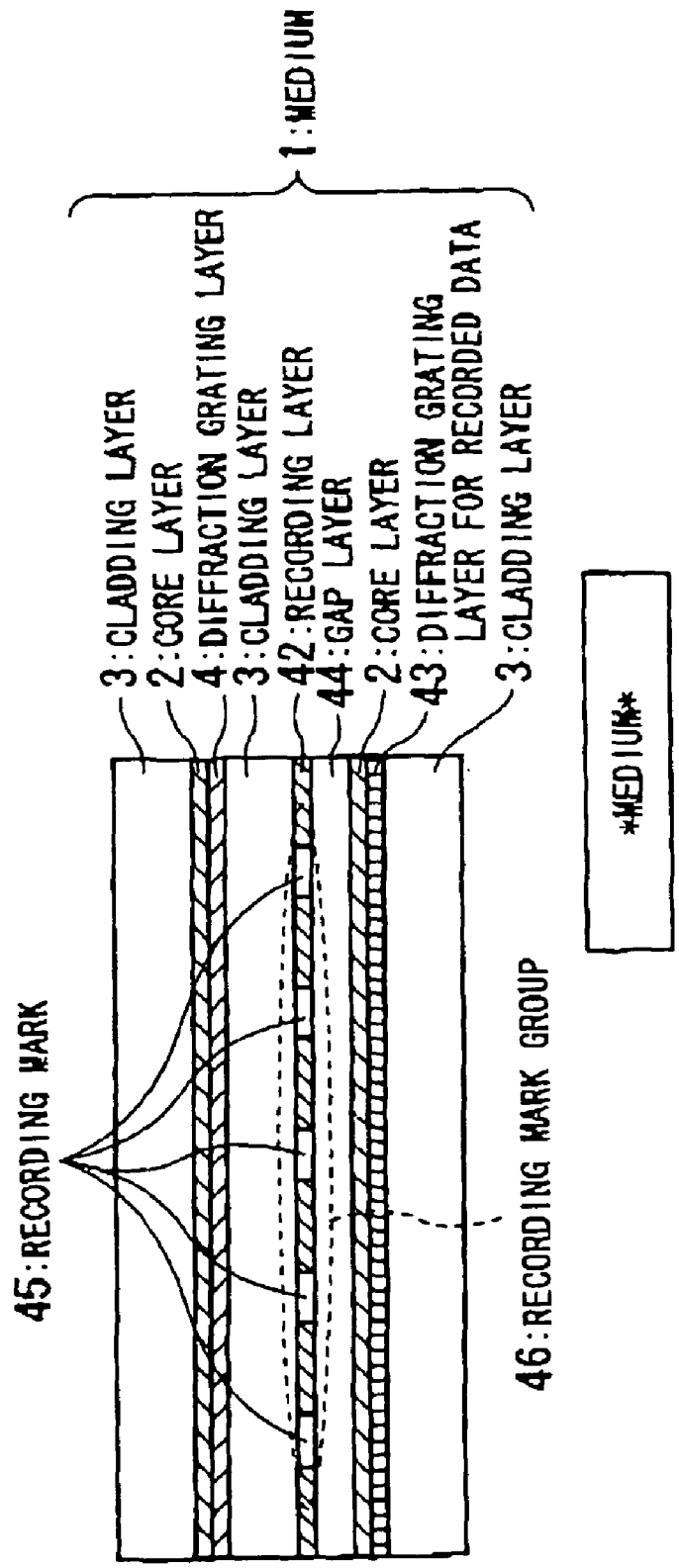
FIG. 45 is a figure showing a structure of the medium of a thirteenth embodiment of the present invention.

FIG. 45 is a figure showing an example of a medium 1 which is the laminated holographic medium. The medium 1 is composed of two core layers 2; 3 cladding layers 3 set so as to bind the core layers 2; and a gap layer. It provides a diffraction grating layer 4 which is set at a boundary between one of the core layers 2 and the cladding layers 3 binding this core layer 2 or is set inside the core layer 2, stores information data in a bumpy form or as a refractive index distribution; and a diffraction grating layer for recording data 43 which is set at a boundary between another core layer 2 and the cladding layers 3 binding this core layer 2 or is set inside the core layer 2

It provide a recording layer 42 to which information, that is the above described ID data, is recorded as a presence and a position of a recording mark 45 with or without transmittance of the light, is set at the above described another core layer 2 having the gap layer 44 between them It is appropriate that this diffraction grating layer for recording data 43 is provided on the above described another core layer 2.

Figure 46:
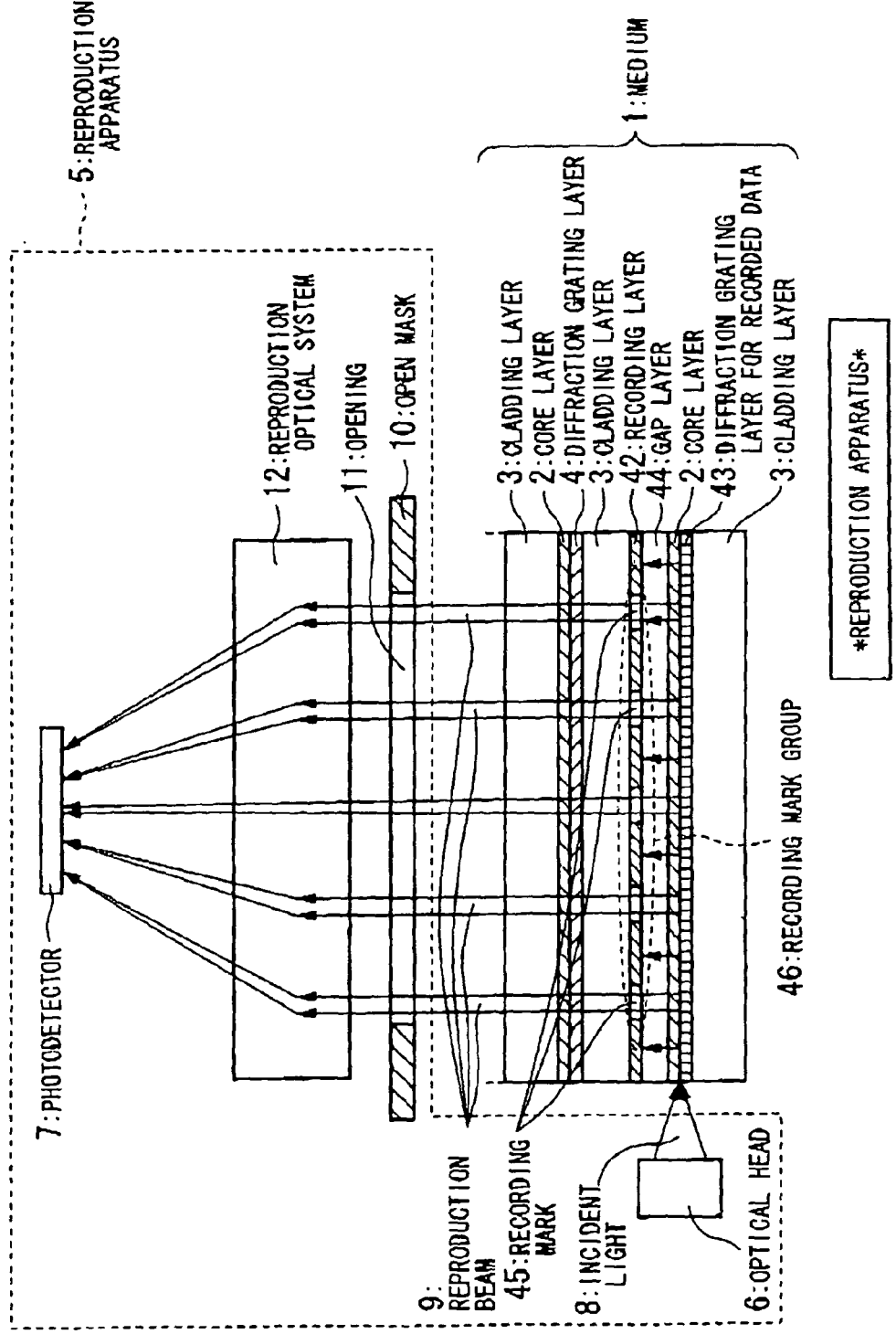
FIG. 46 is a figure (1) showing a structure of the medium and the reproduction apparatus of the thirteenth embodiment of the present invention.

FIG. 46 is a figure showing the above described laminated holographic memory system constituted from a reproduction apparatus 5 reading information recorded in a medium 1 and the medium 1. In this figure, the reproduction apparatus 5 is constituted from an optical head 6, a photodetector 7, an aperture mask 10 and a reproduction optical system 12. The optical head 6 can be, for example, various laser light source and has a function of radiating incident light 8 into the desired core layer 2 of the medium 1.

For example, the photodetector 7 can be two dimensional photodetector like a CCD, a CMOS and so on, one dimensional photodetector such as a line sensor, a photodiode and has a function of detecting a reproduction beam outgoing from the medium 1 after radiating the incident light from the optical head 6 into the medium 1.

The aperture mask 10 is provided on the way of an optical path of the reproduction beam 9 outgoing from the medium 1 before it is accepted by the photodetector 7, and separates and reproduces the reproduction beam 9 outgoing from each diffraction grating layer 4 if the multiplex information is recorded on the diffraction grating layers 4.

Using the aperture mask 10, it is possible to reproduce the information data of multiple screens of the photodetector 7 from one diffraction grating layer 4, therefore, it is possible to increase the storage capacity of the medium 1 without a limitation in accordance with a number of pixels of the photodetector 7. For such aperture mask 10, there are aperture masks such that it can electrically change the position of an aperture 11 by using the liquid crystal device, or it has a fixed aperture 11 and the aperture mask 10 is shifted on a plane by using a shifting apparatus and the like.

The reproduction optical system 12 has a function of forming an image of the reproduction beam 9 outgoing from the medium 1 on the photodetector 7. It is possible to construct the reproduction optical system 12 from, for example, various optical parts such as a lens, a prism, a half mirror, a (polarized) beam splitter, a mirror, a polarizer, a liquid crystal device and the like and combinations of them.

Hereafter, a reproduction step is explained. Upon emitting the incident light 8 to the desired core layer 2 of the medium 1 by the optical head 6, the light is diffracted in accordance with the information recorded in the diffractive grating layer 4, a reproduction light 9 goes out on a top surface of the medium 1, and the reproduction beam is detected by the photodetector 7 via the aperture mask 10 and the reproduction optical system 12. In accordance with such steps, it is possible to reproduce the information recorded in the medium 1. In FIG. 46, a size of the aperture 11 of the aperture mask 10 is larger than an area of all the recording marks 45 therefore all of the reproduction beam 9 go through the aperture mask 10.

The medium 1 provides a recording layer 42 to which information, that is the above described ID data, is recorded and it is possible to read the ID data of each medium by radiating the incident light 8 into the diffraction grating layer for recording data 43.

Figure 47:
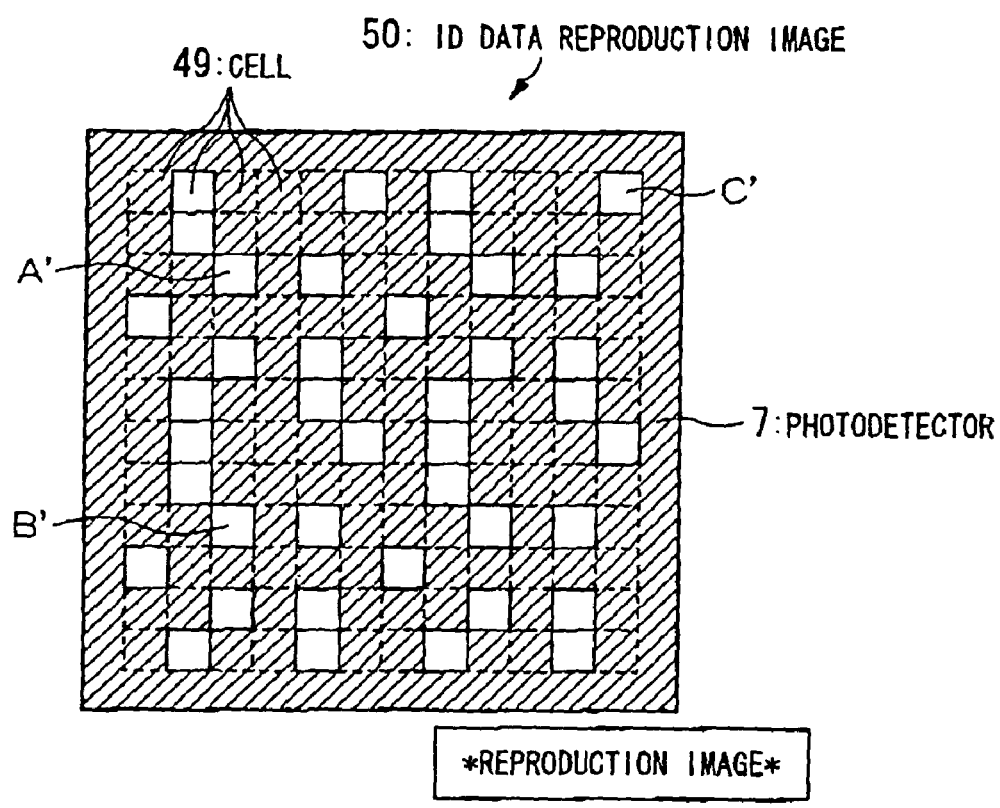
FIG. 47 is a figure (1) showing a reproduced image of ID data of the thirteenth embodiment of the present invention.

FIG. 47 is a figure showing a reproduction image on the photodetector 7 based on the reproduction beam 9 from the diffraction grating layer for recording data 43. Each brightness/darkness on the photodetector 7 is called cell 49, and an ID data reproduction image 50 indicating the ID data of each medium is constituted from a set of cells 49.

Figure 48:
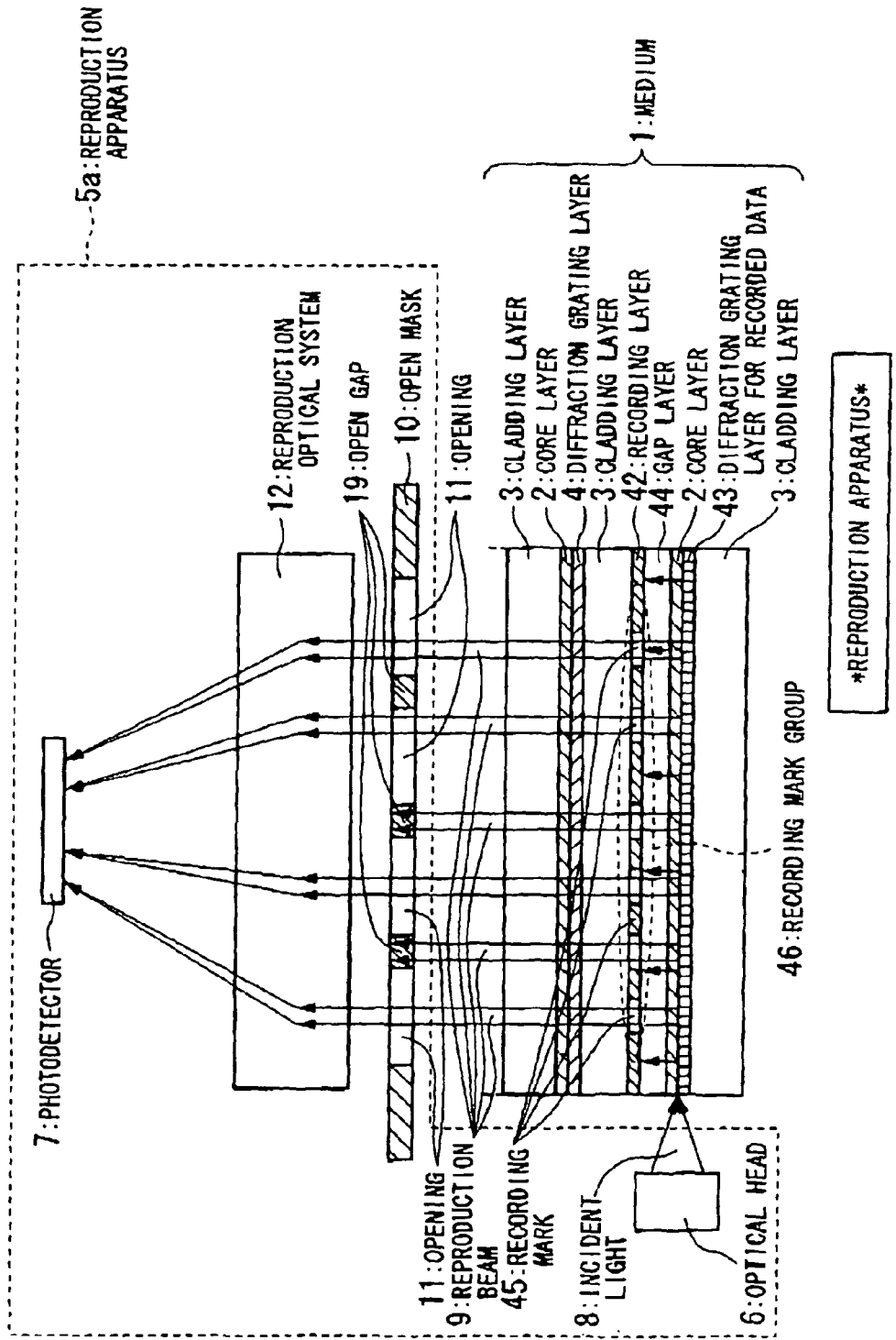
FIG. 48 is a figure (2) showing a structure of the medium and the reproduction apparatus of the thirteenth embodiment of the present invention.

FIG. 48 is a figure showing a side face of a reproduction apparatus 5a providing an aperture gap portion 19 that is an aperture gap dividing the apertures 11 of the aperture mask 10. In FIG. 48, same symbols are applied to portions corresponding to portions of FIG. 46 and the explanation is omitted.

Figure 49:
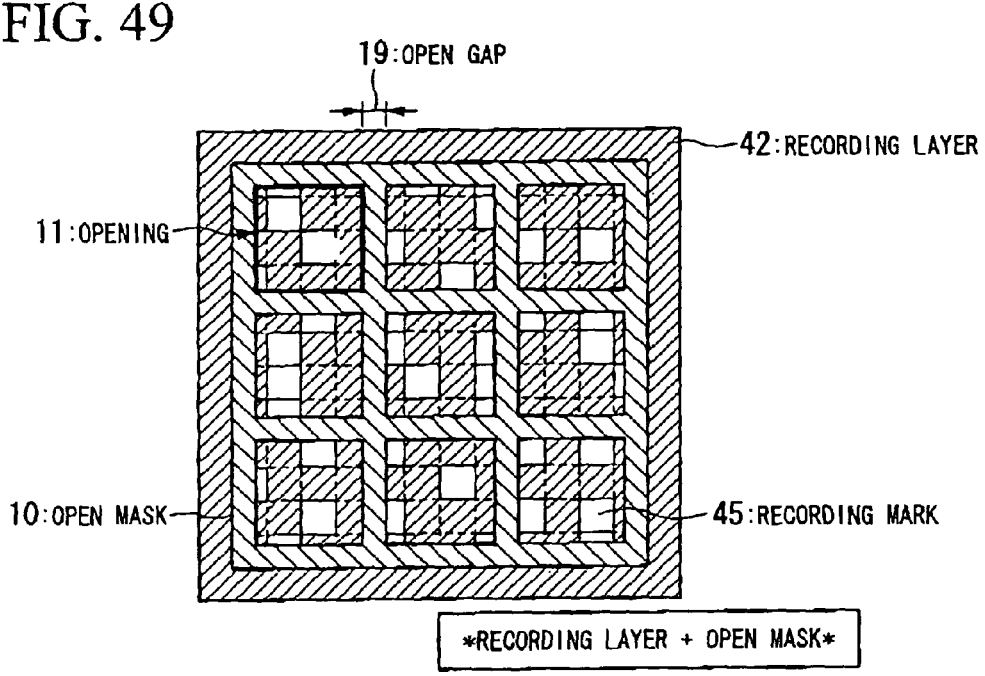
FIG. 49 is a figure of overlapping a recording mark and an aperture mask of the thirteenth embodiment of the present invention.

FIG. 49 shows a figure of the aperture mask 10 and the recording layer 42 that are seen from a side of the photodetector 7 while overlapping them. In FIG. 49, a portion of recording marks 45 are shaded by the aperture gap portion 19 of the apertures 11 of the aperture mask 10.

Figure 50:
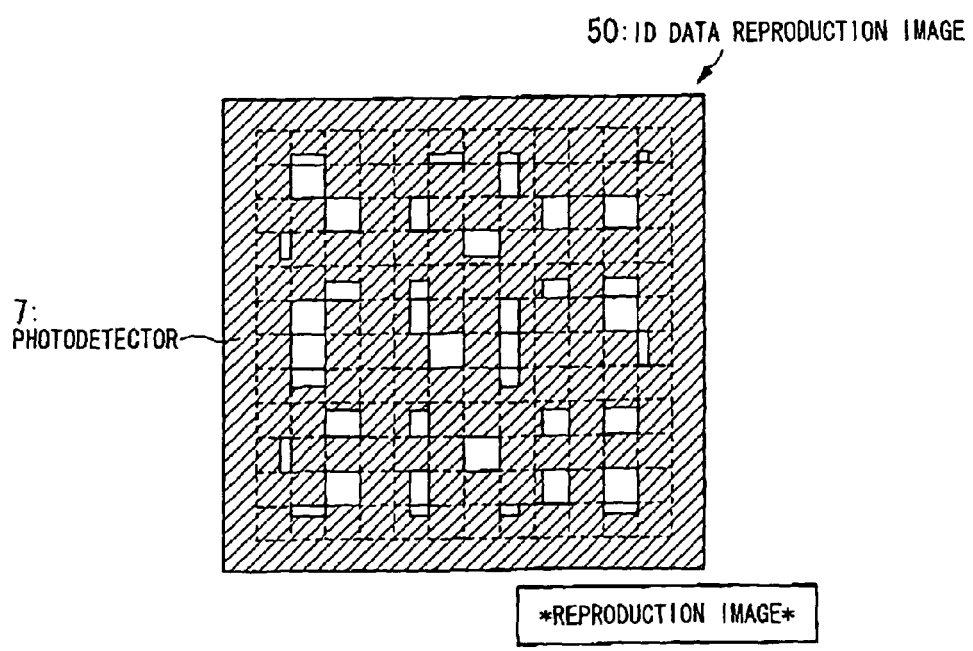
FIG. 50 is a figure (2) showing a reproduced image of ID data of the thirteenth embodiment of the present invention.

Therefore, upon reproducing, there is a problem that the reproduction beam 9 is shaded and the ID data reproduction image 50 is formed on the photodetector 7 even though a portion of the reproduction beam 9 is shaded as shown in FIG. 50. With respect to an object of solving this problem, the medium 1 constituted so as to form the ID data reproduction image 50 accurately is explained hereafter.

The medium 1 shown in FIGS. 51-53 below is related to that of the fourteenth embodiment.

Figure 51:
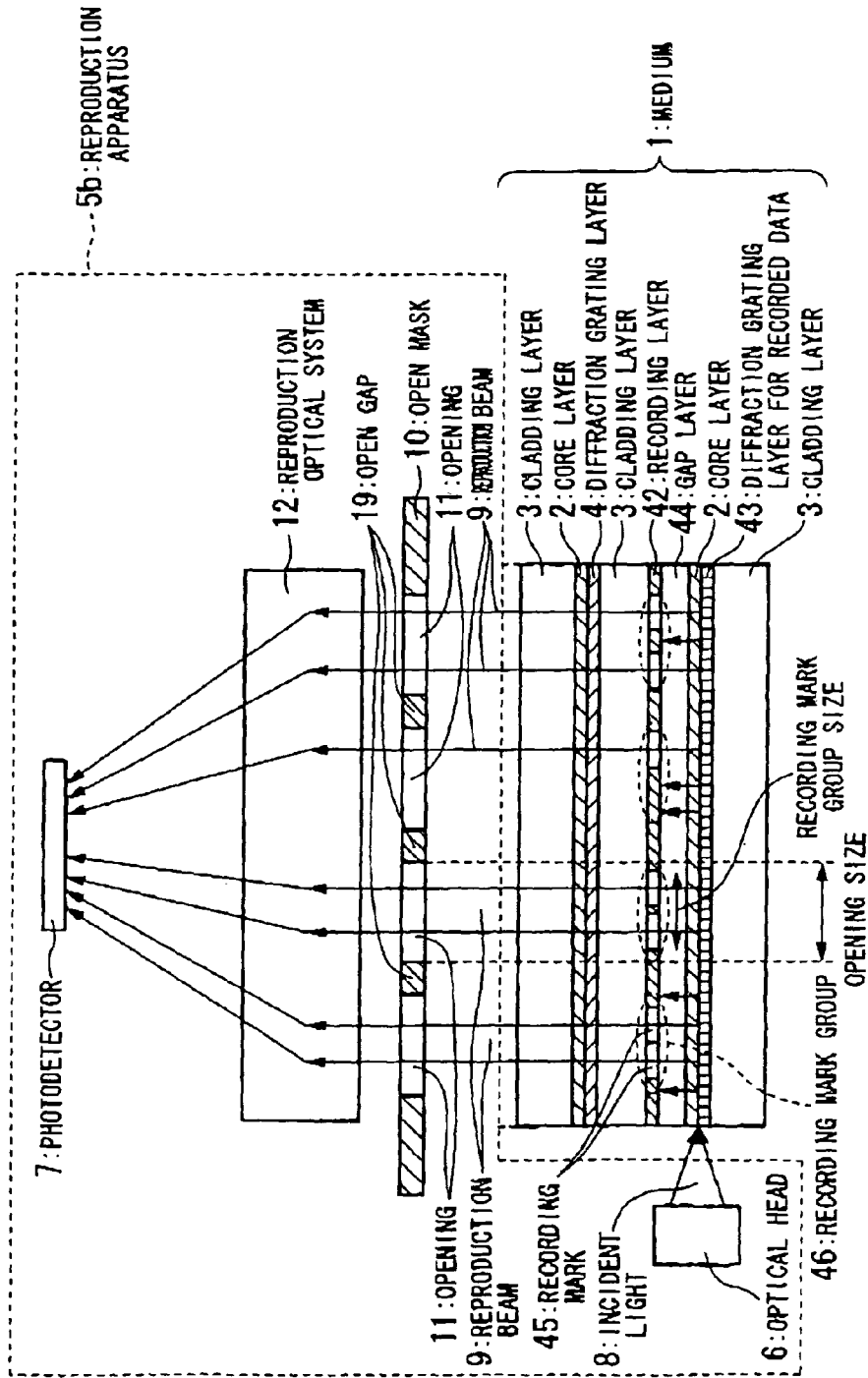
FIG. 51 is a figure showing structures of the medium and its reproduction apparatus therefore of the fourteenth embodiment of the present invention.

FIG. 51 is a side face showing a reproduction apparatus 5b which reads information recorded in the medium 1 of the fourteenth embodiment and the currently proposed medium 1.

The medium 1 of the fourteenth embodiment is characterized by having one-to-one correspondence between the presence and the position of the recording mark 45 on the medium and the presence and the position of brightness/darkness of the light on the photodetector; and providing the recording mark 45 so as to avoid overlapping on the aperture gap portion of the aperture mask in the reproduction apparatus 5b.

In FIG. 51, same symbols are applied to portions corresponding to portions of FIG. 48 and their explanations are omitted. In the medium 1, a recording mark group 46 means a set of the recording marks 45. A recording mark group size of the recording mark group 46 is set to be same as or smaller than an aperture size of the aperture 11 and the recording mark group 46 is designed so as not to be directly under the aperture gap portion 19, therefore, the reproduction beam 9 is not shaded by the aperture gap portion 19 and it is possible to form on the photodetector 7 without a loss.

Figure 52:
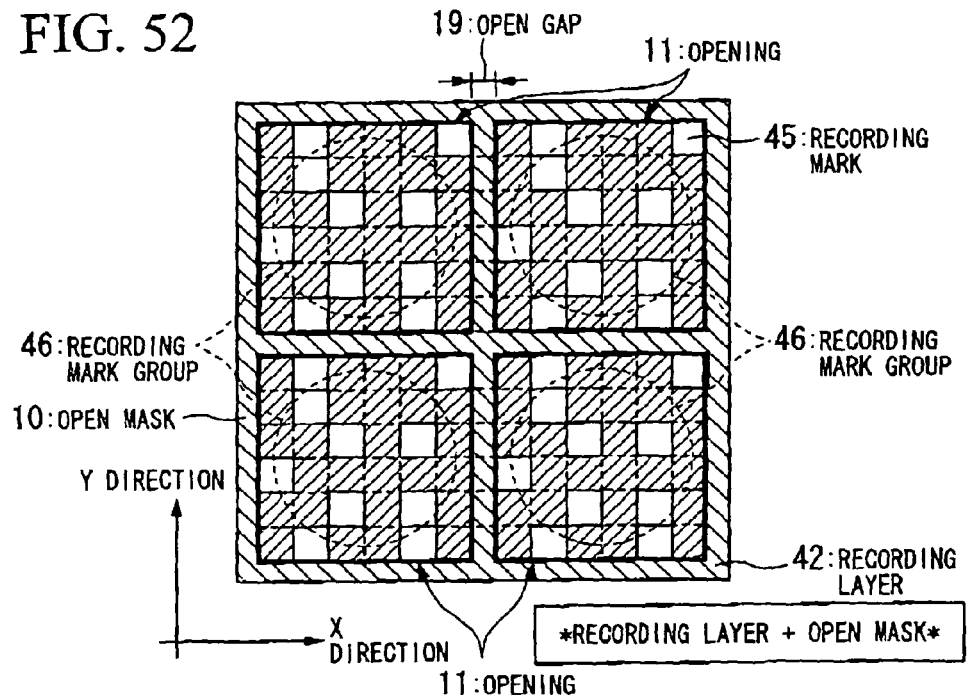
FIG. 52 is a figure of overlapping a recording mark and an aperture mask of the fourteenth embodiment of the present invention.

FIG. 52 is a top view of the recording layer 42 and the aperture mask 10 seen from the photodetector 7. In this figure, the aperture mask 10 has four apertures 11. Thirty six recording marks 45 are provided as one recording mark group 46 on the recording layer 42 so as to set directly under one aperture 11.

A number of the recording marks constituting the recording mark group 46 differs in accordance with a size of the aperture 11 and/or a size of the recording mark 45, however, it is possible to avoid shading the reproduction beam 9 because of the aperture gap portion 19 by designing in a manner such that the aperture gap portion 19 is not overlapped. When the number of the aperture 11 is one and the aperture 11 is shifted by the shifting apparatus or the like, it is possible to avoid shading the reproduction beam 9 because of the aperture gap portion 19 if the size of the aperture gap portion 19 is known beforehand.

Figure 53:
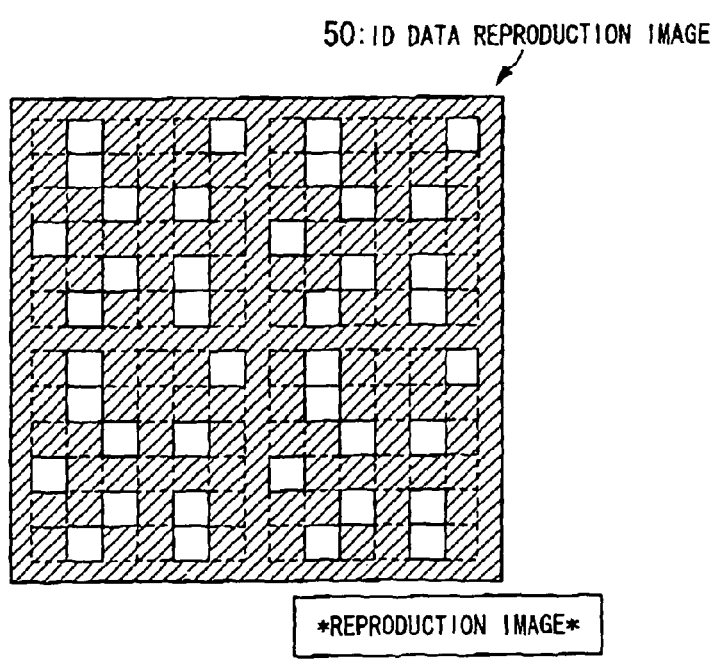
FIG. 53 is a figure showing a reproduced image of ID data of the fourteenth embodiment of the present invention.

FIG. 53 is a figure showing the ID data reproduction image formed on the photodetector 7, and the brightness/darkness of the light is formed while corresponding to the recording mark 45 in one-to-one relationship without being shaded by the aperture gap portion 19.

The ID data reproduction image 60 is divided into four parts, however, it is possible to combine the ID data reproduction image 50 on the photodetector 7 into one image shown in FIG. 47 and to recognize it as one ID by using, for example, an image processing technology.

Upon combining into one image, instead of using the image processing technology, it is possible to form the diffraction grating layer for recording data 43 so as to form one image shown in FIG. 47 and, in this case, there is an advantage because it is possible to reduce time and processing load for combining.

<A Fifteenth Embodiment>

Figure 54:
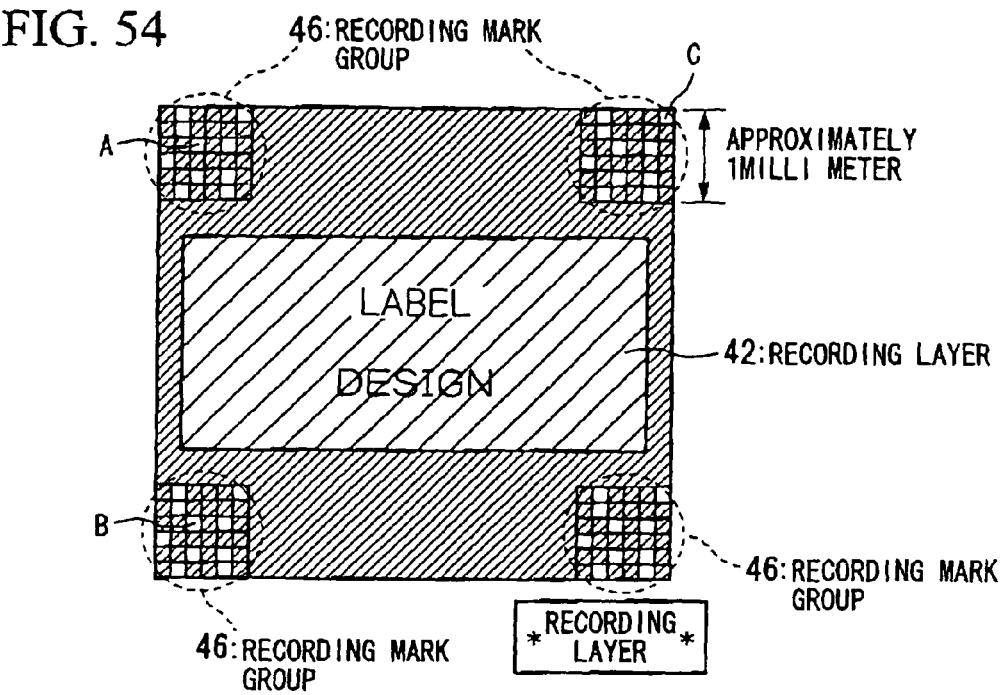
FIG. 54 is a FIG. 1) showing a recording layer of the fifteenth embodiment of the present invention.
Figure 55:
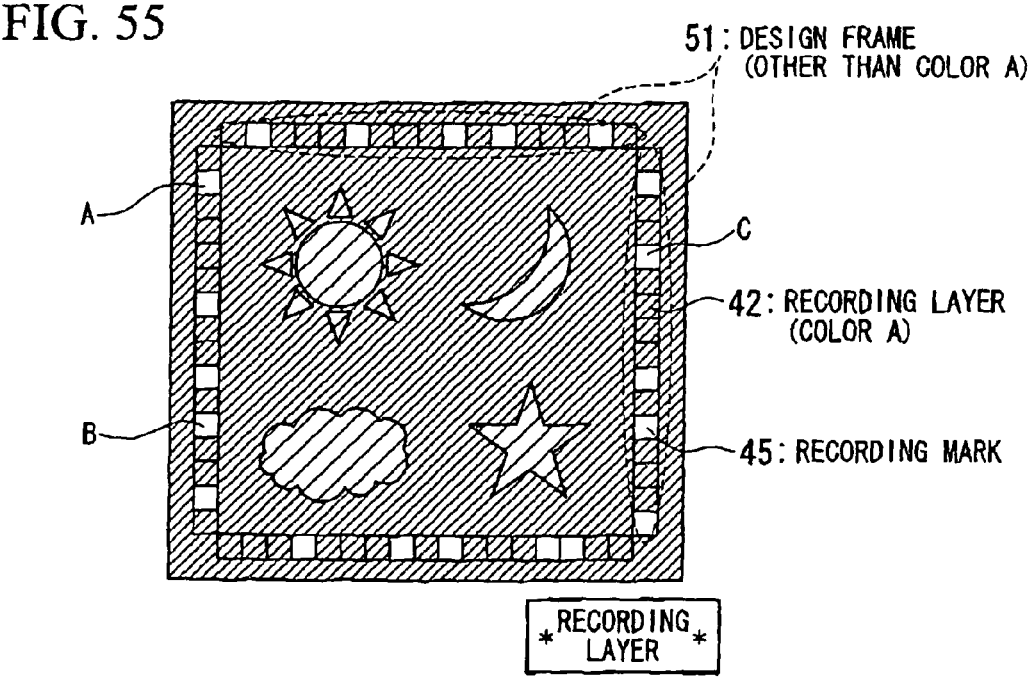
FIG. 55 is a FIG. 2) showing a recording layer of the fifteenth embodiment of the present invention.

A medium 1 of this embodiment is explained in reference to FIGS. 54 and 55. When a label or the like is designed on a portion where the presence and the position of the recording mark 45 on the recording layer 42 are corresponding to the shading portion above, the medium 1 of this embodiment is characterized by setting the recording mark appropriately at an inconspicuous portion on the recording layer 42 in order not to disturb the designed position.

FIG. 54 is a figure showing a case of setting the recording mark 45 at four corners in order to make the recording mark group 46 inconspicuous.

In this case, when the recording mark size is approximately a square with 0.1 mm edges and one hundred recording marks constitute one recording mark group 46, there are recording mark groups 46 that are approximately a square with 1 mm edges at four corners of the recording mark 42. Then, it depends on a size of the medium 1 however it is possible to design on a center of the medium 1 without disturbing the design almost at all.

Technically, it is easy to form the recording mark 45 that is a square having 0.1 mm edges and the recording mark group 46 that is a square having 1 mm edges on the recording layer.

When the reproduction beam 9 in this figure is formed on the photodetector 7, it is possible to form the ID data reproduction image 50 shown in FIG. 47 on the photodetector 7 by designing the diffraction grating layer for recording data 43. Then, the recording mark groups A, B, C in FIG. 54 correspond to A', B', C' in FIG. 47 respectively.

A dividing number of the recording mark group 46 can be set to be from 1 to a number of all the recording marks regardless of a total number of the recording marks. A color of the recording layer 42 before forming the recording mark 45 can be any colors if it absorbs the light. It is appropriate that the recording mark 45 on the recording layer is constructed to be a portion of a design upon setting it.

FIG. 55 is a figure showing a case in which the recording mark 45 is set in a design frame 51 for containing a design on the recording layer 42. A material applied to the recording layer 42 can be any colors if it does not transmit the reproduction beam and absorbs the laser upon recording, therefore, it does not disturb the design because it is possible to use as a portion of the design by changing the color of the recording layer 42 at the design frame 51 to a desired color.

When the reproduction beam 9 in this figure is formed on the photodetector 7, it is possible to form the ID data reproduction image 50 shown in FIG. 47 on the photodetector 7 by designing the diffraction grating layer for recording data 43. In this case, the recording marks A, B, C in FIG. 55 correspond to A', B', C' in FIG. 47 respectively.

As described above, it is possible to obtain the ID data reproduction image 50 shown in FIG. 47 by combining after reproducing in accordance with the image processing technology.

<A Sixteenth Embodiment>

Referring to FIGS. 56-60, the medium 1 of this embodiment is explained. The medium 1 of this embodiment operates a conversion on ID data constituted from a presence of brightness/darkness and a position of a predetermined reproduction beam in accordance with a predetermined regulation.

It is characterized by providing a recording mark 45 on a recording layer 42 based on the converted ID data. As the predetermined regulation, for example, there are regulations such as inverting upside down or right and left like a surface of a mirror, inverting the presence of the recording mark 45 or shifting a predetermined distance upward/downward.

Figure 56:
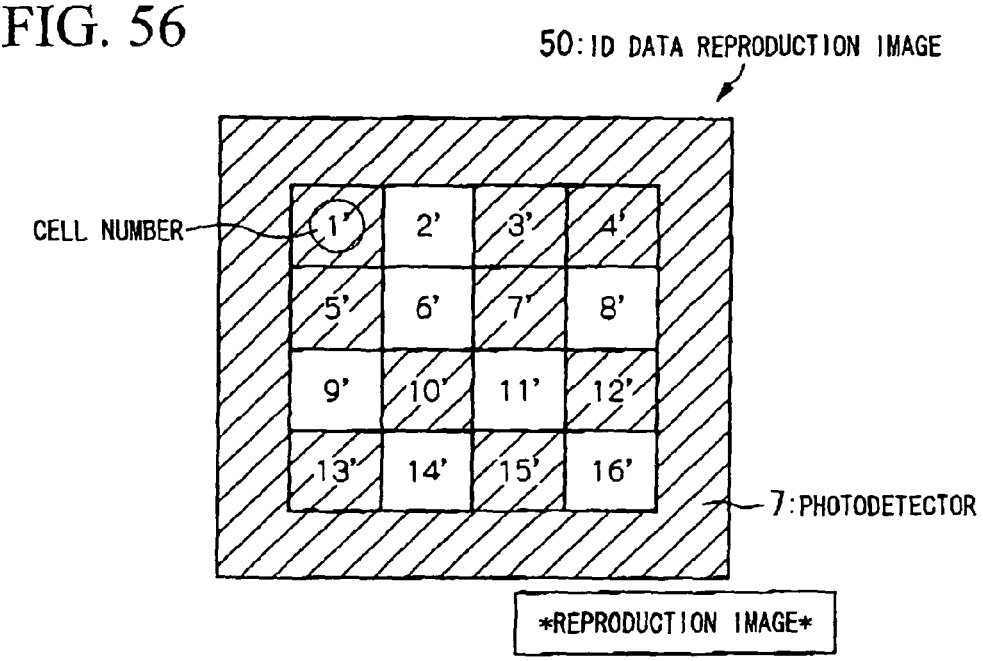
FIG. 56 is a figure showing a reproduced image of ID data of the fifteenth embodiment of the present invention.

FIG. 56 is a figure showing the ID data reproduction image 50 formed on the photodetector 7. In FIG. 56, 1'-16' are cell numbers of the ID data reproduction image 50.

Figure 57:
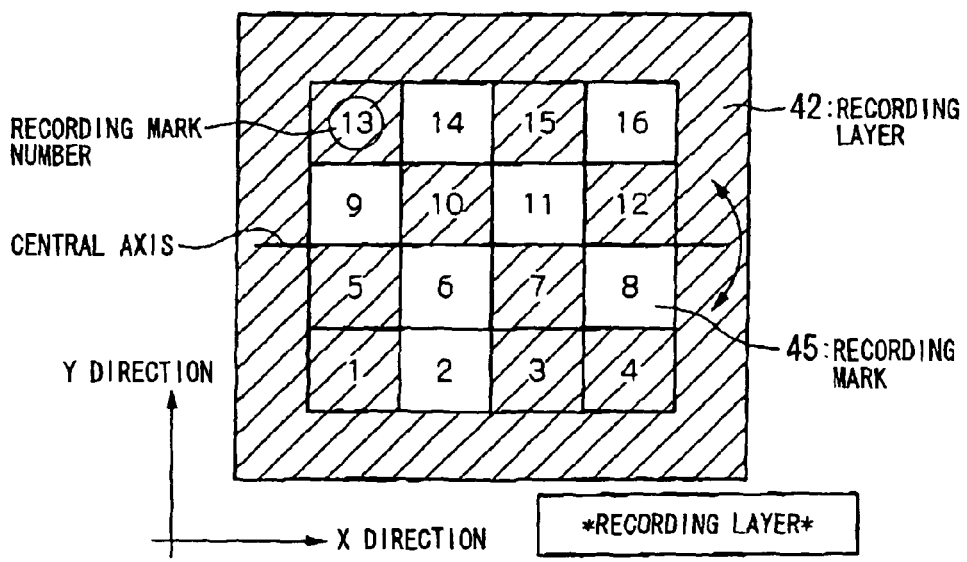
FIG. 57 is a FIG. 1) showing a recording layer of the sixteenth embodiment of the present invention.

FIG. 57 is a top view of the recording layer 42 shown from the photodetector 7 when the recording mark 45 is provided, with respect to the presence of brightness/darkness and the position of the light of the ID data reproduction image 50 in FIG. 56, at a position inverted upside down like a surface of a mirror based on a central axis along with X. 1-16 in this figure that are the recording marks 45 are formed corresponding to the positions of 1'-16' of the ID data reproduction image 50 because of the diffraction grating layer for recording data 43.

Figure 58:
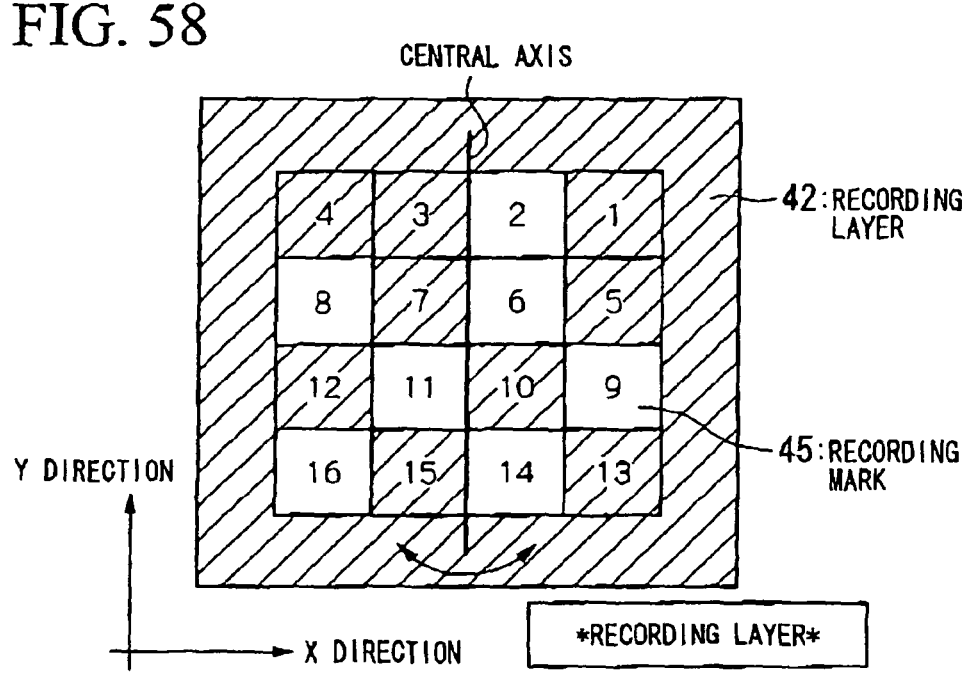
FIG. 58 is a FIG. 2) showing a recording layer of the sixteenth embodiment of the present invention.

FIG. 58 is a top view of the recording layer 42 shown from the photodetector 7 when the recording mark 45 is provided, with respect to the presence of brightness/darkness and the position of the light of the ID data reproduction image 50 in FIG. 66, at a position inverted right and left like a surface of a mirror based on a central axis along with Y. 1-16 in this figure that are the recording marks 45 are formed at corresponding positions of 1'-16' of the ID data reproduction image 50 because of the diffraction grating layer for recording data 43.

Figure 59:
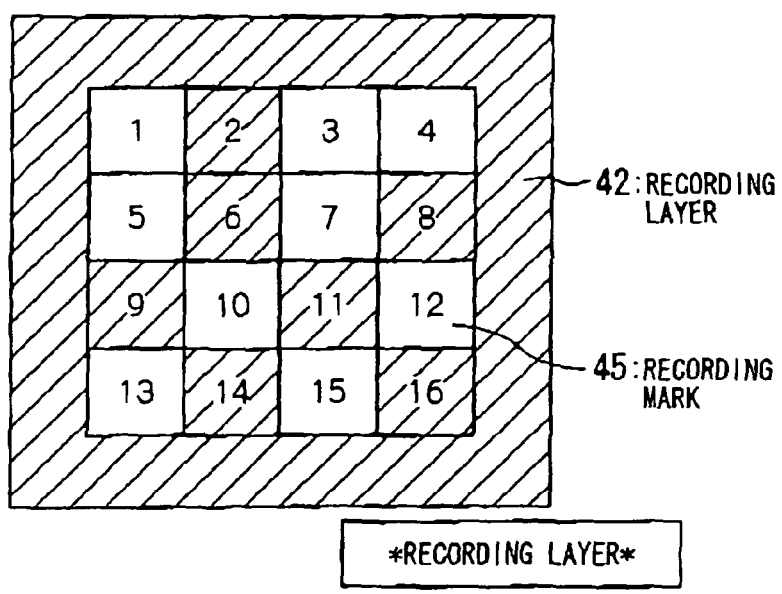
FIG. 59 is a FIG. 3) showing a recording layer of the sixteenth embodiment of the present invention.

FIG. 59 is a figure on the recording layer 42 shown from the photodetector 7 when the recording mark 45 is set by inverting the presence of brightness/darkness in FIG. 56. In this case, there is a mark for a recording mark corresponding to a cell No. 1 and there is not a mark for a recording mark corresponding to a cell No. 2.

When there is no recording mark 45 in the recording layer 42, the reproduction beam 9 is not transmitted, therefore, there is not the ID data reproduction image 50 formed on the photodetector 7 and it is not possible to obtain the ID data reproduction image 50 generated by inverting the recording mark 45. However, it is already known that it is not possible to invert the ID data only when there is no recording mark 45, therefore, it is possible to detect without contradiction by providing a especial operation if the reproduction beam 9 is not transmitted.

Figure 60:
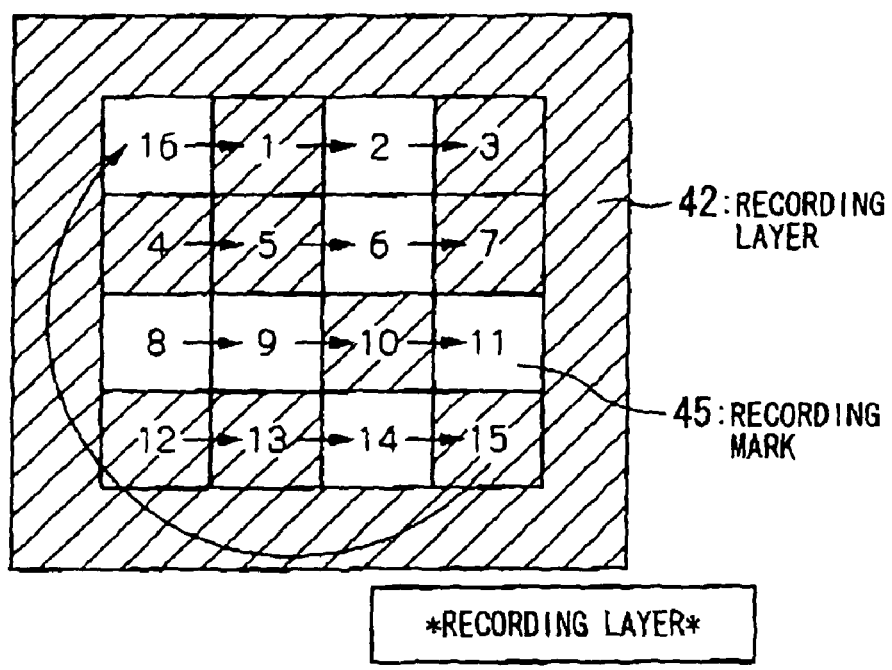
FIG. 60 is a FIG. 4) showing a recording layer of the sixteenth embodiment of the present invention.

FIG. 60 is a figure for an explanation of a case in which the recording mark is provided at a position that is obtained by shifting the presence of brightness/darkness and the position of the light of the ID data reproduction image 50 in FIG. 56 upward/downward for a predetermined distance. The recording mark is provided so as that a cell No. N on FIG. 56 corresponds to the N±n-th recording mark on the recording layer 42 in FIG. 60.

In a regulation of shifting, N is from 1 to a total number of all recording marks, n is from 1 to N−1, and when N+n reaches to the maximum number $N_{max}$ of a number of the recording mark (No. 16 in this figure), it becomes $N+n-N_{max}$. For example, when n=14, the cell No. 1 of the ID data reproduction image corresponds to the recording mark No. 15 and the cell No. 10 corresponds to the recording mark No. 8. When the cell of N-n reaches at 1, it becomes $N_{max}+N-n$. While N and n are in the above described range, any values follow the above described regulation.

<A Seventeenth Embodiment>

Figure 61:
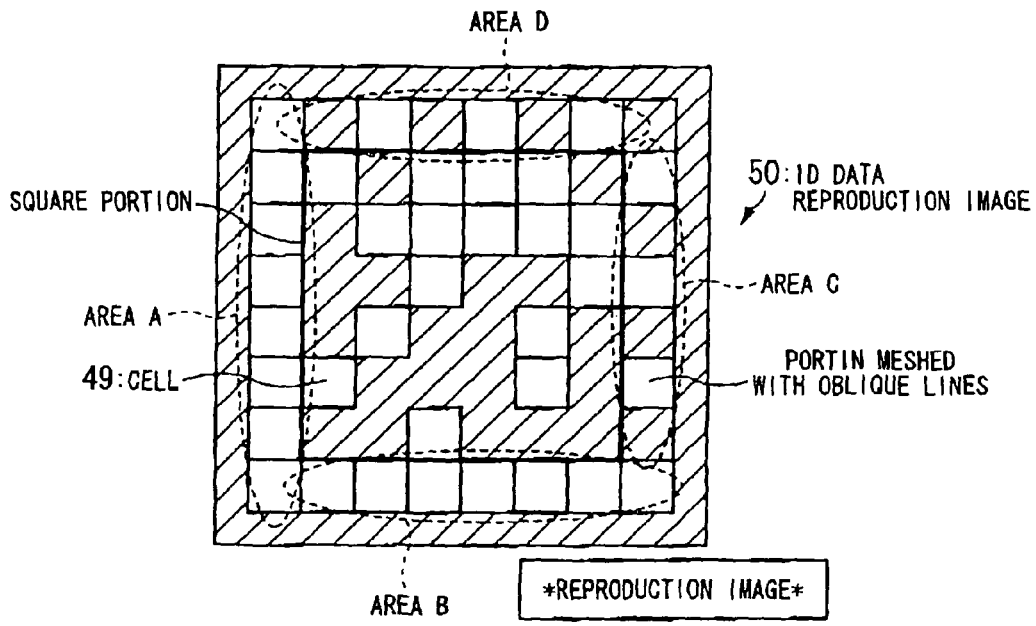
FIG. 61 is a figure showing a reproduced image of ID data of the sixteenth embodiment of the present invention.
Figure 62:
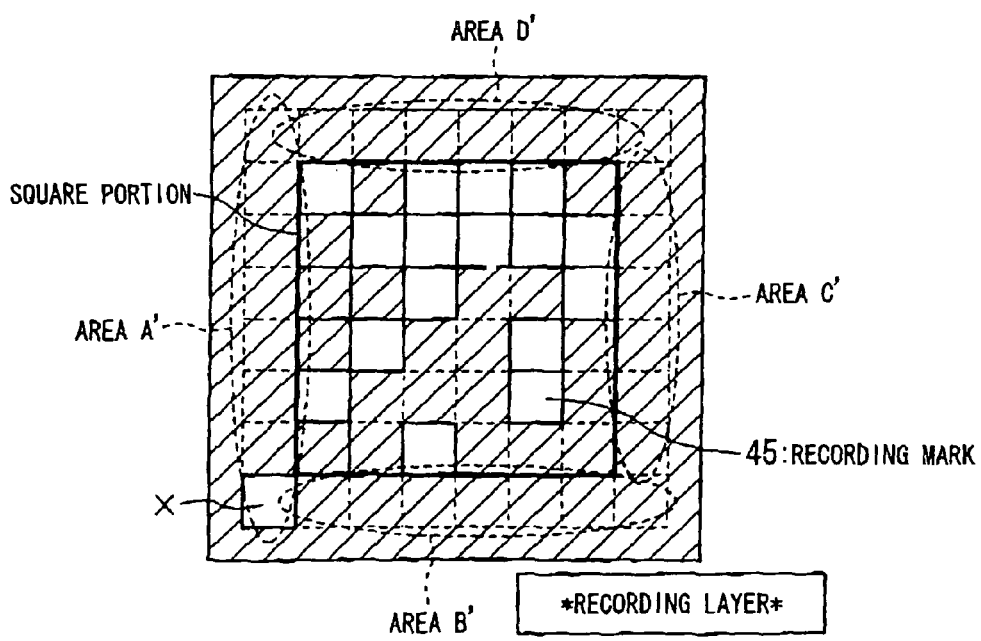
FIG. 62 is a FIG. 1) showing a recording layer of a seventeenth embodiment of the present invention.
Figure 63:
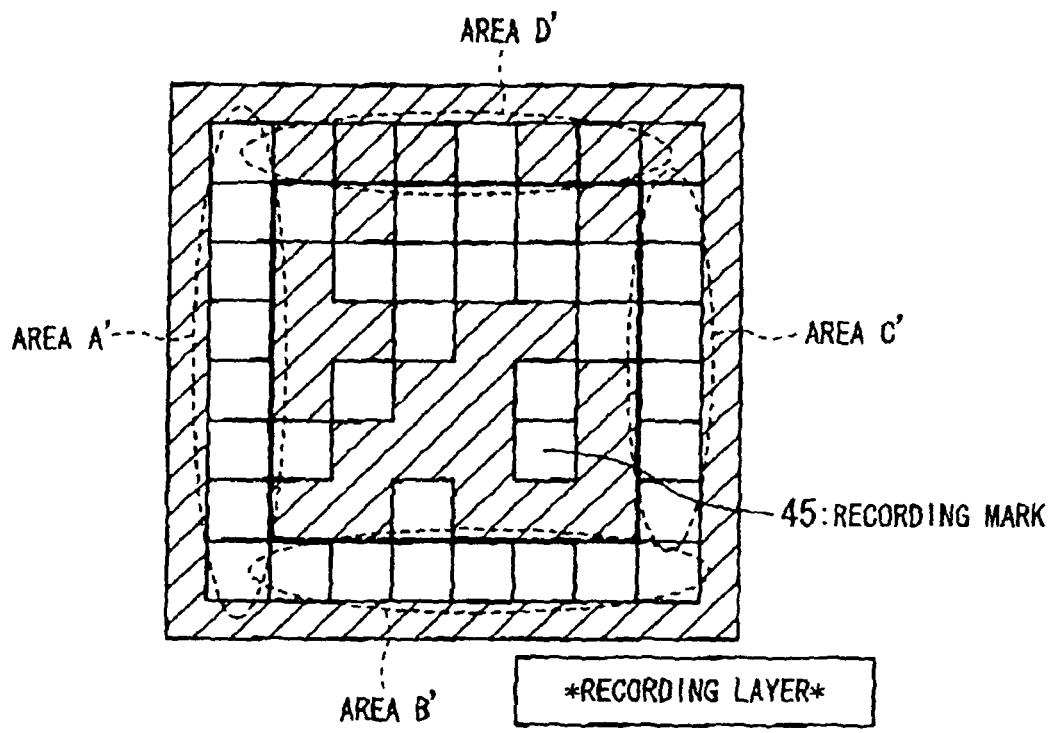
FIG. 63 is a FIG. 2) showing a recording layer of a seventeenth embodiment of the present invention.

Referring to FIG. 61-63, a medium 1 of this embodiment is explained. The medium 1 of this embodiment includes a portion in which a presence and a position of a recording mark on a recording layer 42 correspond to a presence of brightness/darkness and a position of the light on a photodetector 7 with a relationship of one-to-many, many-to-one or many-to-many, and is characterized by providing the recording mark so as that the presence of brightness/darkness and the position of the light on the photodetector 7 does not match to the presence and the position of the recording mark on the recording layer 42 necessarily therefore it is difficult to be recognized by eyes.

FIG. 61 is a figure showing the ID data reproduction image 50 on the photodetector 7. On the other hand, FIG. 62 is a figure showing an example of an arrangement of the recording mark 45 on the recording layer 42. In FIG. 61 and 62, with respect to a square portion enclosed by a square, the presence of brightness/darkness and the position of the light on the photodetector 7 correspond to the presence and the position of the recording mark 45 with one-to-one relationship.

Other than the square portion, "X" that is the recording mark 45 in FIG. 62 corresponds to the brightness/darkness of all the cells in areas A, B, C, D in FIG. 61 with a relationship of one-to-many, therefore, it is very difficult to realize the ID data reproduction image of FIG. 61 by seeing the recording mark 45 in FIG. 62.

FIG. 63 is a figure showing another example of an arrangement of the recording mark 45 on the recording layer 42 in this embodiment. In this figure, a square portion enclosed by a square corresponds to the presence of brightness/darkness and the position of the light of the ID data reproduction image 50 in FIG. 61 with one-to-one relationship. Areas A' and B' correspond to areas A and B in FIG. 61 with one-to-one relationship.

However, an area C' corresponds to an area C in FIG. 61 with many-to-many relationship, and an area D' corresponds to an area D in FIG. 61 with one-to-many relationship.

An concrete example of this embodiment can be suggested in a case in which, for example, the ID data reproduction image 50 in this figure follows the existing and regulated two dimensional code (for example, QR code (registered trademark), MaxiCode, VeriCode (registered trademark), DataMatrixCode, AztecCode and the like). In the regulated two dimensional code, there are portions of the cell defined in each regulation such as a position detection pattern.

The defined cell portions should exist if they have same kind of cords and number of cells of the code is same, regardless of information that the codes include. Therefore, in order to apply the regulated two dimensional code as the ID data reproduction image 50, regardless of the arrangement of the recording marks, it is necessary to design the diffraction grating layer for recording data 43 so as to correspond to the defined cell portion.

In the fourteenth-seventeenth embodiments above, it is possible to set the correspondence relationship between the presence and the position of the recording mark 45 and the presence and the position of brightness/darkness of the light on the photodetector 7, as shown in the sixteenth embodiment, one-to-many, many-to-one or many-to-many.

<An Eighteenth Embodiment>

This embodiment is related to a design method of information data.

<A Design Method of Information Data in the Prior Art Related to the Eighteenth Embodiment>

Figure 64:
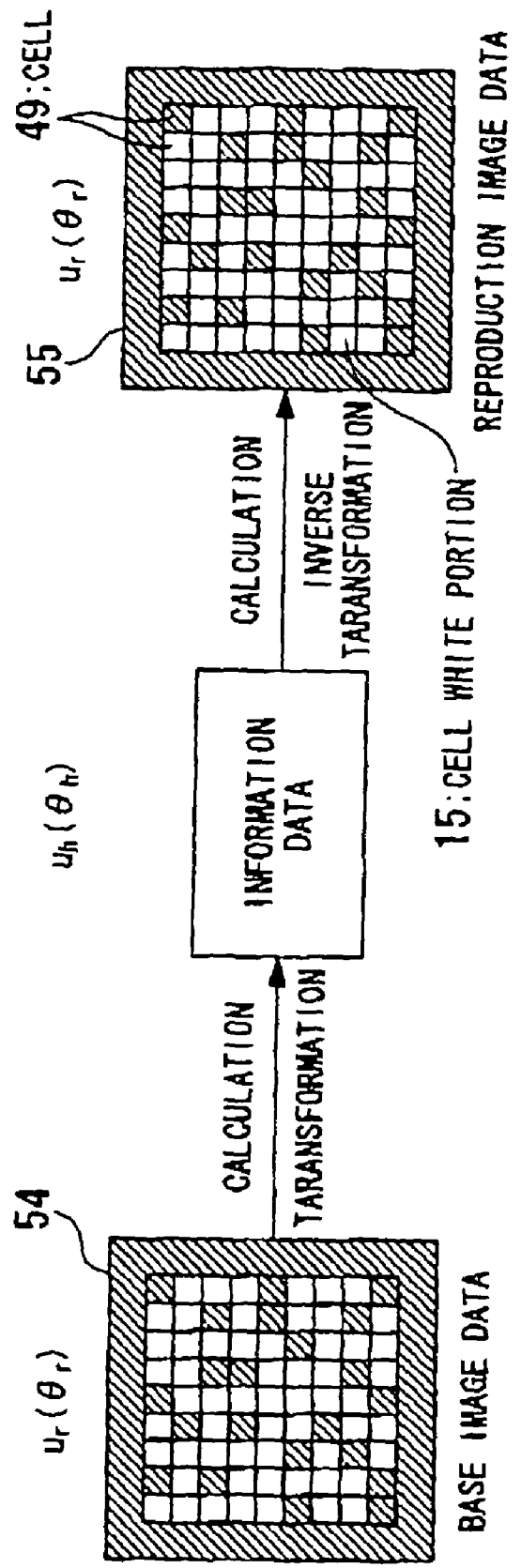
FIG. 64 is a figure showing a calculation method of data for information in the prior art.

A method of the prior art is explained below in which, using the prior art, above described data for recording on the diffraction grating layer for recording data 43 in the media 1 shown in FIG. 51 is formed so as that a reproduction beam 9 is formed into an image on the photodetector 7. An example of calculation method of a bumpy form on the diffraction grating layer for recording data 43, that is information data, is shown in FIG. 64.

In this figure, base image data 34 is data of an image that is desired to be reproduced and reproduction image data 55 is data of image of a reproduction result. The incident light 8 comes into a core layer 2 adjacent to the diffraction grating layer for recording data 43, and is guided. A function $u_h(\theta_h)$ ($u_h$ corresponds to holographic data) expresses a wave surface of the reproduction beam 9 on the diffraction grating layer for recording data 43 diffracted and dispersed in accordance with the bumpy form of the diffraction grating layer for recording data 43.

$u_h$ is a function that distributes two-dimensionally on the diffraction grating layer for recording data 43, and $\theta_h$ is a parameter indicates a strength and a phase of the wave surface function. Similarly, $u_r(\theta_r)$ is a wave surface function of an image formed on the photodetector 7. $u_r$ is a function that distributes two dimensionally on the photodetector, and $\theta_r$ is a parameter indicates a strength and a phase.

$u_h$ applies $u_r$ as a base image (an image desired to be reproduced) data 54. Theoretically, in accordance with an analysis of the wave optics, it is possible to calculate it, in other words, by operating a surface integral upon a product between $u_r$ and a transfer function g on the photodetector 7, that is "$u_h = \iint u_r * g\, dxdy$". With respect to the bumpy form on the diffraction grating layer for recording data 43, if $u_h$ is obtained, it is possible to form based on it so as to make the distribution because of the bumpy form on the diffraction grating layer for recording data 43 $u_h$.

Conversely, when the reproduction image data 66 ($u_r$) is calculated from the information data ($u_h$), it is possible by operating the reverse calculation (inverse transformation) of the above described calculation (transformation). Here, the transformation and the inverse transformation are explained. The information data ($u_h$) on the diffraction grating layer for recording data 43 obtained by transforming the base image data is expressed in general as a function spread infinitely on a surface of the diffraction grating layer for recording data 43. Therefore, the reproduction image data ($u_r$) is transformed to be same as the base image data by operating the surface integral and operating the inverse transformation on the information data ($u_h$) spread infinitely. However, optically (conventionally), the diffraction grating layer for recording data 43 is not spread infinitely, therefore, a recorded data area obtained by the transformation is limited because of areas such as the medium, the aperture, the recording mark and the like.

In such a manner, not as an infinite area, by operating the surface integral and the inverse transformation in a limited and finite area, similar to conventional phenomena, the reproduction image data ($u_r$) is calculated and reproduced as a different thing from the base image data. In other words, when an area for the surface integral upon the inverse transformation is limited to be finite in reference to a real system, it is possible to describe mathematically so as to repeat or describe the real optical phenomena. The inverse transformation (and the transformation) means operating the surface integral in a finite area in accordance with a real system below.

It is possible to check whether or not $u_h$ is accurately transformed by comparing the reproduction image data after the transformation above and base image data.

<A Problem for a Information Data Design Method in a Prior Art Related to the Eighteenth Embodiment>

For example, when a size of the recording mark 45 of the medium 1 in FIG. 51 is small, or when interference is caused, with respect to each cell 49, among multiple bright spots from the diffraction grating layer for recording data 43, noises and the like are added to the reproduction image data 55 and it does not match to the base image data 54, therefore, for example, it is difficult to decode the reproduction image data 55.

<A Information Data Design Method in the Eighteenth Embodiment>

Figure 65:
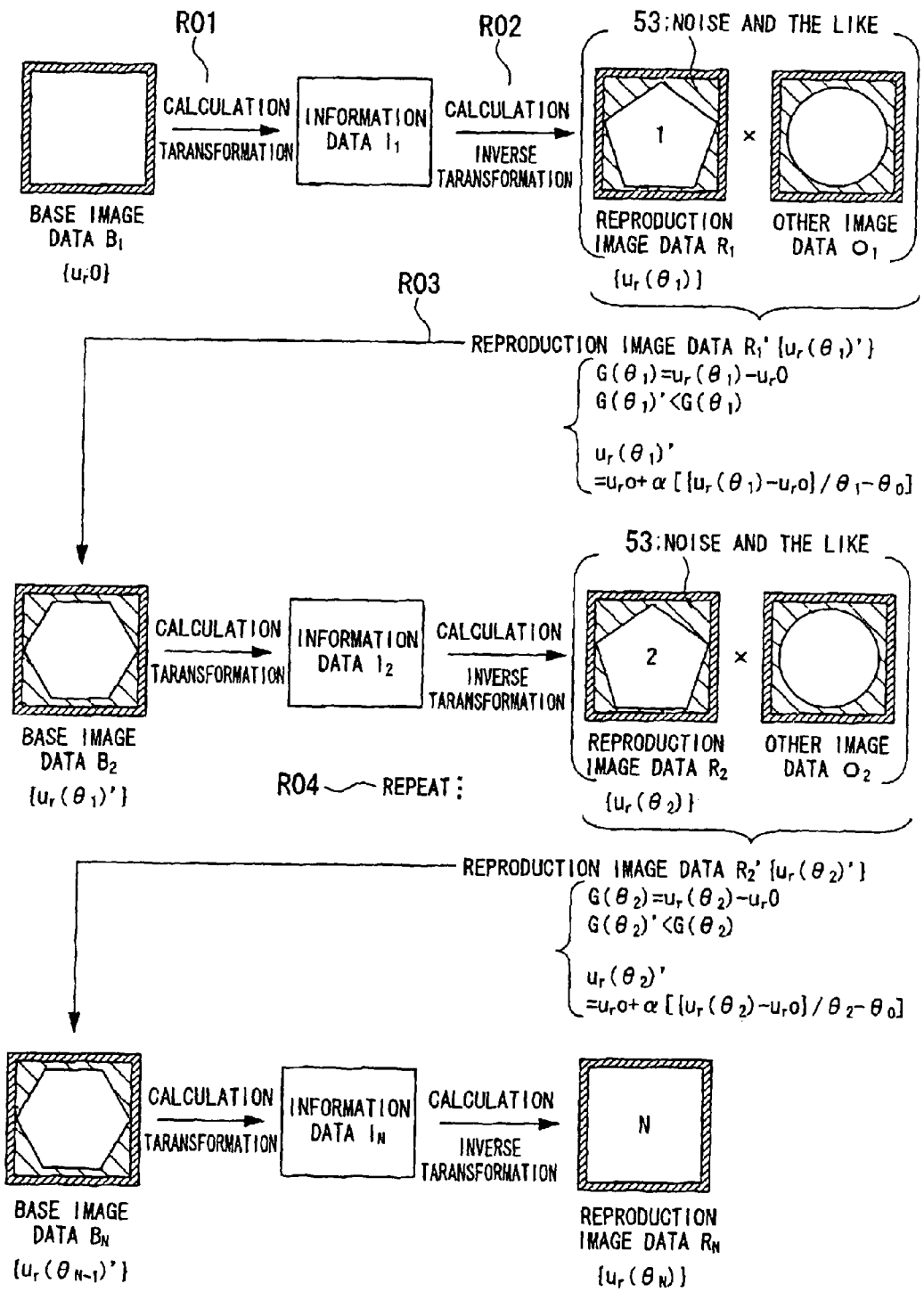
FIG. 65 is a figure showing a calculation method of data for information of an embodiment of the present invention.

The information data design method for solving the problem above is explained below. A information data design method of the diffraction grating layer for recording data of the laminated holographic medium is a method in which the information data is holographic data obtained by operating a hologram calculation applying the reproduction image data as the base image data. In FIG. 65, a operation flow is shown from a point of view of one cell white portion 15. Noise and the like 53 is a noise due to a light interference and the like.

First, the base image data $B_1\{u_r,o\}$ that is the reproduction image data I transformed to the information data $I_1$ (step R01 in FIG. 65). The inverse transformation is operated upon the information data $I_1$ and the reproduction image data $R_1\{u_r(\Theta_1)\}$ is obtained (step R02 in FIG. 65). Other image data $O_1$ is image data such that a difference $\{G(\Theta_1)'\}$ between reproduction image data $R'_1\{u_r(\Theta_1)'\}$, which is obtained by combining the reproduction image data $R_1$ and the image data $O_1$, and base image data $B_1$ is smaller than a difference $\{G(\Theta_1)\}$ between reproduction image data $R_1$ and base image data $B_1$. Combined image data of the image data $O_1$ and the reproduction image data $R_1$, that is $R'_1\{u_r(\Theta_1)'\}$ is new base image data $B_{12}$ (step R03 in FIG. 65).

The combining operation above is repeated at least one time (step R04 in FIG. 65) so that a difference between reproduction image data $R_N$ and the base image data $B_1$ is small enough. Data of information $I_N$ before operating the inverse transformation upon the reproduction image data $R_N\{u_r(\Theta_N)\}$ that is finally obtained, can be applied to the information data recorded on the diffraction grating layer for recording data 43 $\Theta_m$ is a parameter showing a strength and a phase of the wave surface function $u_r$ or the reproduction image data. A difference $G(\Theta_m)$ between the reproduction image data $\{u_r(\Theta_m)\}$ and the base image data $B_1$, and the reproduction image data $\{u_r(\Theta_m)'\}$ are calculated in accordance with following formulas.

$$G(\Theta_m) = u_r(\Theta_m) - u_r o \quad (1)$$

$$u_r(\Theta_m)' = u_r o + \alpha * [\{u_r(\Theta_m) - u_r o\}/\Theta_m - \Theta_0] \quad (2)$$

"$\alpha$" in the formula (2) is selected so as to satisfy $G(\Theta_m)' < G(\Theta_{m-1})'$ and m is an integer (1, 2, 3, ... ) showing a repeating number of the combining operation.

There is other information data design method such as a case including steps of, obtaining the information data by operating the hologram calculation with respect to the base image data that is the reproduction image data; applying the image data obtained by reversing the gradation (for example, when the image data has 256 gradations (0-255), a gradation value n is transformed to 255−n) of the reproduction image data that is obtained by operating a hologram inverse calculation on the information data as the base image data; and operating the hologram calculation again in order to obtain the information data. There is other information data design method such as a case including steps of; adjusting the reproduction beam outgoing from the diffraction grating layer for recording data that constructs the reproduction image data, that is, the distance between the bright spots on the photodetector. The same effects and advantages can be obtained in both cases.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. For example, with respect to the reproduction steps of the information data in the reproduction apparatus, it is appropriate to regulate positions in the medium where the diffraction grating layer for recording data and the recording layer are set beforehand by establishing a regulation of the medium. For example, it is appropriate that the positions can be the furthest point from the photodetector (at the bottom layer), or a position apart a predetermined distance from the photodetector. It is appropriate that a side of the reproduction apparatus 5 shown in FIG. 16 and so on recognizes the position above by memorizing.

It is appropriate that, just after setting the medium 1 into the reproduction apparatus 5 shown in FIG. 16 and so on, or just after turning on the reproduction apparatus, firstly the optical head 6 is shifted so as to radiate the incident light 8 into the core layer 2 adjacent to the diffraction grating layer for recording data 43, the recorded information data is reproduced, the reproduction image data that is obtained is decoded by using a signal processing circuit or a signal processing software, and the information recorded in each medium is obtained. It is appropriate that the obtained information is stored in a memory and is used if necessary, or that the incident light 8 is radiated into the core layer 2 adjacent to the diffraction grating layer for recording data 43 again and the information is obtained.

When the reproduction image data is picked up in reproduction steps, the reproduction image is picked up as a whole, partially picked up and combined in an image, or picked up per each cell and combined in an image. It is appropriate that, to the photodetector 7, the photodetector 7 is fixed or shifted along with one or two axis in a surface. It is appropriate that the apertures 11 of the aperture mask 10 are fully opened at one time or partially opened/closed one by one.

INDUSTRIAL APPLICABILITY

It is possible to record the information data easily to the laminated holographic medium of the present invention after it has been produced or while it is being produced. It is possible to reproduce the recorded information data easily by using the reproduction apparatus or in accordance with the reproduction method. Moreover, the recording layer to which the information data us recorded is formed by adhering or the like after recording the information data specific to each laminated holographic medium such as the identification number, therefore, it is possible to write the information data easily on the recording layer and to increase the freedom of selecting materials and processing applied to the recording layer. It is possible to record the information data specific to each medium and to manage each medium, therefore, an effect or an advantage can be obtained such that it is possible to protect the copy right of the contents stored or recorded in the medium from illegal copying or counterfeiting. In accordance with the present invention, it is possible to record the information data to the authentication sheet of the present invention easily upon producing it by using the production apparatus and the production method of the present invention. It is possible to reproduce the recorded information data easily by using the reproduction apparatus or in accordance with the reproduction method.

The invention claimed is:

1. A production method of the laminated holographic medium comprising the steps of:
providing an identification information recording medium by combining a recording layer which is arranged on an exterior surface of the recording medium, a gap layer, a first core layer, a first diffraction grating layer for recording data and a first cladding layer;
recording information data on the recording layer by radiating a beam directly onto the recording layer without passing through another layer of the recording medium, where the recording is in a form of a recording mark transmittance or non-transmittance of light indicating the information data in accordance with a presence of a hole or a degree of transmittance of the light;
providing a ROM type recording medium by combining a second cladding layer, a second core layer and a second diffraction grating layer; and
combining the identification information recording medium and the ROM type recording medium.

2. A laminated holographic medium produced by using a production method according to claim 1.

3. A laminated holographic medium according to claim 2, further comprising: a reflection layer, wherein
the first diffraction grating layer, the recording layer and the reflection layer are arranged in an order of the first diffraction grating layer, the recording layer and the reflection layer.

4. An authentication sheet production method comprising steps of:
providing an identification information recording medium by combining a recording layer which is arranged on an exterior surface of the recording medium, a gap layer, a first core layer, a first diffraction grating layer for recording data and a first cladding layer; and
recording information data on the recording layer by radiating a beam directly onto the recording layer without passing through another layer of the recording medium, where the recording is in a form of a recording mark transmittance or non-transmittance of light indicating the information data in accordance with the presence of a hole or a degree of transmittance of the light.

5. An authentication sheet produced by using a production method according to claim 4.

* * * * *